United States Patent
Danis

(10) Patent No.: US 9,060,057 B1
(45) Date of Patent: Jun. 16, 2015

(54) SYSTEMS AND METHODS FOR CALLER ID AUTHENTICATION, SPOOF DETECTION AND LIST BASED CALL HANDLING

(71) Applicant: Serdar Artun Danis, Randolph, NJ (US)

(72) Inventor: Serdar Artun Danis, Randolph, NJ (US)

( * ) Notice: Subject to any disclaimer, the term of this patent is extended or adjusted under 35 U.S.C. 154(b) by 0 days.

(21) Appl. No.: 14/180,611

(22) Filed: Feb. 14, 2014

Related U.S. Application Data

(63) Continuation-in-part of application No. 13/854,988, filed on Apr. 2, 2013, now abandoned, which is a continuation-in-part of application No. 13/787,889, filed on Mar. 7, 2013, now abandoned.

(51) Int. Cl.
*H04M 1/56* (2006.01)
*H04M 15/06* (2006.01)
(Continued)

(52) U.S. Cl.
CPC ..... *H04M 3/42059* (2013.01); *H04L 29/06782* (2013.01)

(58) Field of Classification Search
CPC ............ H04M 3/382; H04M 3/42025; H04M 3/42034; H04M 3/42085; H04L 63/02; H04L 63/08; H04L 63/083; H04L 63/0869; H04L 63/101; H04L 63/14; G06F 31/31; G06F 21/33; G06Q 20/4014
USPC ............. 379/142.01, 142.03, 142.05, 142.06, 379/142.17, 245, 246, 247, 93.02, 100.05, 379/111, 112.01, 112.07, 112.08, 133, 134, 379/142.04, 196, 201.01, 201.02, 201.07, 379/201.08; 713/182, 183, 184; 455/414.1, 455/415; 726/2, 3, 5, 6, 7
See application file for complete search history.

(56) References Cited

U.S. PATENT DOCUMENTS 6,324,271 B1 * 11/2001 Sawyer et al. ........... 379/142.05
6,633,756 B1 10/2003 Tett
(Continued)

OTHER PUBLICATIONS

Author: Eric Rescorla Title: Secure Caller-ID Fallback Mode, draft-rescorla-stir-fallback-00 Date: Jul. 13, 2013 URL: http://tools.ietf.org/id/draft-rescorla-stir-fallback-00.txt Publication Country: US.
(Continued)

*Primary Examiner* — Binh Tieu

(57) ABSTRACT

Systems and methods for caller id authentication, spoof detection and list based call handling are disclosed. The caller ID authentication is performed by an authentication device connected to the calling party telephone transmitting the source and destination telephone numbers of the call to an authentication server. The called party authentication device extracts the caller ID of the incoming call and transmits the caller ID of the caller and the telephone number of the called party to the authentication server. The authentication server analyzes the transmitted information from both devices and replies with the authentication status of the caller ID to the called party authentication device. Other embodiments are disclosed where the authentication server is not available and caller ID authentication is performed in a peer-to-peer manner. In another embodiment, the concepts of active and passive certification passwords are used to maintain the integrity of the system. Other embodiments allow for authenticating blocked caller ID's, reveling blocked caller ID's, VoIP implementations, legitimate caller ID spoofing, and placing a blocked caller ID on private white or black lists. Another embodiment combines the described caller ID authentication system within a call handling system utilizing internal, global and private white and black lists. Applications of caller ID authentication methodology to other forms of communication source address authentication, such as email, SMS, and postal mail are envisioned.

20 Claims, 37 Drawing Sheets

(51) Int. Cl.
*H04M 3/42* (2006.01)
*H04L 29/06* (2006.01)

(56) References Cited

U.S. PATENT DOCUMENTS

| | | | |
|---|---|---|---|
| 6,731,731 B1 * | 5/2004 | Ueshima | 379/196 |
| 6,993,658 B1 | 1/2006 | Engberg | |
| 6,996,217 B2 | 2/2006 | Goldman | |
| 7,113,577 B2 | 9/2006 | Cook | |
| 7,222,158 B2 | 5/2007 | Wexelblat | |
| 7,295,660 B1 | 11/2007 | Higginbotham | |
| 7,385,992 B1 | 6/2008 | Koch | |
| 7,756,930 B2 | 7/2010 | Brahms | |
| 7,912,036 B2 | 3/2011 | Moore | |
| 8,072,967 B2 | 12/2011 | Rosenberg | |
| 8,103,246 B2 * | 1/2012 | Singhal | 455/411 |
| 8,150,005 B1 | 4/2012 | Sayko | |
| 8,220,030 B2 | 7/2012 | Singhal | |
| 8,238,532 B1 | 8/2012 | Cox | |
| 8,254,541 B2 | 8/2012 | Cai | |
| 8,300,782 B2 | 10/2012 | Milton | |
| 8,300,791 B2 | 10/2012 | O'Sullivan | |
| 8,406,223 B2 * | 3/2013 | Battistello et al. | 370/352 |
| 8,498,392 B2 * | 7/2013 | Wishart | 379/142.05 |
| 8,537,994 B2 * | 9/2013 | Hillier | 379/142.05 |
| 8,681,780 B2 * | 3/2014 | Andrews et al. | 370/352 |
| 2005/0190904 A1 | 9/2005 | Anupam | |
| 2006/0233160 A1 * | 10/2006 | Kawanishi et al. | 370/352 |
| 2007/0003036 A1 | 1/2007 | Daniels | |
| 2007/0016796 A1 | 1/2007 | Singhal | |
| 2007/0071200 A1 | 3/2007 | Brouwer | |
| 2007/0143422 A1 | 6/2007 | Cai | |
| 2007/0206748 A1 | 9/2007 | Cassanova | |
| 2008/0181379 A1 * | 7/2008 | Chow et al. | 379/142.05 |
| 2008/0181380 A1 | 7/2008 | Gustave | |
| 2008/0187119 A1 | 8/2008 | Vinokurov | |
| 2009/0022150 A1 | 1/2009 | Rosenberg | |
| 2009/0046839 A1 | 2/2009 | Chow | |
| 2009/0168755 A1 | 7/2009 | Peng | |
| 2011/0019807 A1 | 1/2011 | Deng | |
| 2011/0026699 A1 | 2/2011 | Amir | |
| 2011/0211572 A1 | 9/2011 | Campion | |
| 2011/0283349 A1 | 11/2011 | Wu | |
| 2012/0051267 A1 * | 3/2012 | Ma et al. | 370/259 |
| 2012/0287823 A1 | 11/2012 | Lin | |
| 2013/0036458 A1 | 2/2013 | Liberman | |
| 2013/0036459 A1 | 2/2013 | Liberman | |

OTHER PUBLICATIONS

Author: Eric Rescorla Title: STIR Out-of-band Mechanism, draft-rescorla-stir-fallback Date: Jul. 30, 2013 URL: http://www.ietf.org/proceedings/87/slides/slides-87-stir-5.pdf Publication Country: US.

Author: Hadriel Kaplan Title:stir input drafts Date:Jun. 13, 2013 URL: http://www.ietf.org/mail-archive/web/stir/current/msg00234.html Publication Country:US.

* cited by examiner

SYSTEMS AND METHODS FOR CALLER ID AUTHENTICATION, SPOOF DETECTION AND LIST BASED CALL HANDLING

CROSS-REFERENCE TO RELATED APPLICATIONS

This application is a continuation-in-part of U.S. application Ser. No. 13/854,988, filed on Apr. 2, 2013, currently pending, which is a continuation-in-part of U.S. application Ser. No. 13/787,889 filed on Mar. 7, 2013, currently pending. The patent applications identified above are incorporated herein by reference in their entirety to provide continuity of disclosure.

BACKGROUND OF THE INVENTION

1. Field of the Invention

This invention generally relates to the field of telecommunications and in particular to systems and methods that are able to both authenticate correct and true caller ID information, and detect fraudulent and spoofed caller ID information. The invention also uses authenticated caller ID information in conjunction with lists such as whitelists and blacklists for the purpose of call allowance and blockage.

2. Background

Caller ID (caller identification, CID), also called calling line identification (CLID), calling number delivery (CND), calling number identification (CNID) or calling line identification presentation (CLIP), is a telephone service, available in analog and digital phone systems and most voice over Internet Protocol (VoIP) applications, that transmits a caller's number to the called party's telephone equipment during the ringing signal, or when the call is being set up but before the call is answered. Where available, caller ID can also provide a name associated with the calling telephone number. The information made available to the called party may be displayed on a telephone's display, on a separately attached device, or be processed by an attached computer with appropriate interface hardware.

Caller ID may be used to display a caller's telephone number (and, in association with a database, name) on a called user's telephone. This works in most countries; although systems are incompatible, each country will have appropriate equipment. A modem can pass CLID information to a computer for purposes of call logging or blocking, but this can be problematic as modems in different countries have different systems, causing hardware or software incompatibilities. However, many modems are designed and programmed to handle multiple signaling methods and can be configured to use the local standard.

In the United States, caller ID information is sent to the called party by the telephone switch as an analogue data stream (similar to data passed between two modems), using Bell 202 modulation between the first and second rings, while the telephone unit is still on hook. If the telephone call is answered too quickly after the first ring, caller ID information will not be transmitted to the recipient. There are two types of caller ID, number only and name+number. Number-only caller ID is called Single Data Message Format (SDMF), which provides the caller's telephone number, the date and time of the call. Name+number caller ID is called Multiple Data Message Format (MDMF), which in addition to the information provided by SDMF format, can also provide the directory listed name for the particular number. Caller ID readers which are compatible with MDMF can also read the simpler SDMF format, but an SDMF caller ID reader will not recognize an MDMF data stream, and will act as if there is no caller ID information present, e.g. as if the line is not equipped for caller ID.

Caller ID forging, or spoofing, is the practice of causing the telephone network to display a number on the recipient's Caller ID display that is not that of the actual originating station. The term is commonly used to describe situations in which the motivation is considered malicious by the speaker or writer. Just as e-mail spoofing can make it appear that a message came from any e-mail address the sender chooses, Caller ID spoofing can make a call appear to have come from any phone number the caller wishes. Because of the high trust people tend to have in the Caller ID system; spoofing can call the system's value into question.

There are both legitimate and illegitimate reasons for caller ID spoofing. Some of the legitimate reasons for spoofing caller ID information are for example, calls from a large company, especially with multiple branches, where sending the main number makes sense. A hospital might have the primary number 555-1000, with perhaps 250 lines inside the main building, and another 100 at the clinic five miles away. While some of the phones will have 555-10XX numbers, many won't have any identifiable line. Having all calls come from 555-1000 lets the recipients know it's a hospital call. As another example, a company with a toll-free telephone number may prefer the caller ID to display this number. In another example, a call center making calls on behalf of many clients may prefer the caller ID to display a different number for each client's calls.

Some of the illegitimate reasons for caller ID spoofing can be where a telemarketer is making calls that it is not authorized to make, such as calling a number on the National Do Not Call Registry. The Do Not Call Registry is maintained by the FTC that allows consumers to register their phone number and is intended to give consumers an opportunity to limit the telemarketing calls they receive. Any telemarketer who violates the Do Not Call Registry can be fined. Another instance of illegitimate caller ID spoofing can be where an individual wishes to impersonate another entity, such as a bank, to acquire sensitive information from the called party through deception.

Invention Objectives

It is an objective of this invention to authenticate caller ID. An authenticated caller ID is where the information supplied by the caller ID is determined to be correct and true. Another objective of this invention is to detect a spoofed caller ID. A spoofed caller ID is where the information supplied by the caller ID is determined to be incorrect and fraudulent. Another objective of this invention is to determine a caller ID as irresolute if it cannot be determined that a caller ID is authenticated or spoofed. It is an objective of this invention to provide caller ID authentication utilizing systems and methods which are cost effective, which are not technically complex and which can be added to any telephone system. It is an objective of this invention to leverage authenticated caller ID's into a call handling system. The call handling system utilizes local, global and private lists for call handling.

Description of Prior and Related Art

With respect to the disclosed invention, a relatable prior art is U.S. Pat. No. 7,113,577 by Cook et al, herein incorporated by reference in its entirety. The system architecture disclosed in FIG. 1 of the '577 patent is similar to the system architecture in this invention disclosure. FIG. 1 describes a system where the caller and the called parties both have access to a PSTN and a data network. The parties initiate a telephone call over the PSTN and are able to access an "information server" over the data network. In this disclosure, the caller and called parties also have access to the PSTN and an authentication device connected to the party phones provides access to the data network. Also in this disclosure, the authentication devices access an authentication server, similar to the information server described in the '577 patent. In the patent, " . . . the information server further receives a caller system identifier and a called system identifier from the caller system". Similarly in this disclosure, the authentication device of the caller transmits the caller number and the called number to the authentication server. There are also other similarities that the '577 patent discusses, such as the information server pushing information to the called party instead of the called party pulling information from the information server. The patent also discusses where an information server is unavailable and the method of the patent is conducted in a peer-to-peer manner. Those concepts are similar to concepts that will be disclosed in this document.

The patent is mainly summarized as " . . . An information server according to one embodiment of the invention comprises a communication interface configured to communicate over a communication network and a processing system connected to the communication interface. The processing system is configured to receive one or more digital content sets, receive a caller system identifier and a called system identifier from the caller system, select a digital content set from among the one or more digital content sets using the caller system identifier and the called system identifier, and provide the selected digital content set to a called system corresponding to the called system identifier prior to the caller system establishing a communication channel to the called system . . . . For example, the digital content set may include text/graphics identifying the caller as an officer or representative of an institution, or such as a doctor affiliated with a certain hospital, wherein both the doctor and the hospital are identified by the digital content set, etc. In addition, the digital content set may identify a family member or acquaintance who is using a public telephone . . . ". Thus, the patent is mainly concerned with providing digital content to the called party based on the caller party.

Despite the similarities of the '577 patent to this invention disclosure, the '577 patent does not consider or disclose a way of authenticating a received caller ID as true and non-fraudulent. The patent never contemplates using the information server for the purpose of tracking calls placed by the caller and where the called party can inquire this tracking information. In the patent, the called party never contacts the information server for the purpose of cross checking the received caller ID against the information sent from the caller party to the information server. The patent does not disclose any method of detecting a spoofed caller ID. Thus, the '577 patent does not introduce a method of caller ID authentication, as will be described in this disclosure. However, the building blocks of the '577 patent are sufficiently similar, that any system utilizing the '577 patent may be easily be modified to make use of the methods proposed in this disclosure to authenticate caller ID.

Other known methods of caller ID authentication and spoof detection are inadequate and cumbersome. Such examples of caller ID authentication systems are described in U.S. Pat. No. 8,254,541 by Cai et al, U.S. Pat. No. 7,912,036 by Moore, U.S. Pat. No. 7,385,992 by Koch et al, U.S. Pat. No. 8,238,532 by Cox et al, and United States Patent Applications 2009/0046839 by Chow et al, 2005/0190904 by Anupam et al, herein incorporate by reference in their entirety. As will be elaborated, none of the known prior art systems utilize a combination of an authentication device coupled with an authentication server, where the calling authentication device transmits the source and destination of the call to the authentication server. And none of the prior art systems describe a system where caller ID is authenticated by the called authentication device; by transmitting the call source and destination to the authentication server for authentication. As will be explained in greater detail, the embodiments of the current invention do not rely on the underlying telephone system to feature the methods described in this invention disclosure to authenticate caller ID's. The caller ID authentication system described herein may be added on to any telephone system through a combination of hardware and software at various points throughout the telephone network; such as at the household NID level, integrated into household phones, integrated into smartphones operating systems, installed as smartphone software applications, and integrated into VoIP systems. Thus, the proposed methods of caller ID authentication may be rolled out over a period of time and in a staggered fashion.

The eventual benefit of caller ID authentication is call handling based on the authenticated caller ID information. Examples of call handling systems are described in U.S. Pat. No. 7,295,660 by Higginbotham et al, U.S. Pat. No. 7,222,158 by Wexelblat, and United States Patent Applications 2007/0143422 by Cai, 2011/0283349 by Wu, 2007/0071200 by Brouwer, 2011/0026699 by Amir et al, herein incorporated by reference in their entirety. Any call handling system must first authenticate caller ID, otherwise, the concept of a call handling system becomes moot. If a problematic telemarketer is banned from initiating further calls to a customer by being placed on a blacklist and all that is needed to circumvent the blacklist is for the telemarketer to spoof its' caller ID, then for all intensive purposes, the notion of a blacklist is pointless. None of the known prior art systems incorporate the disclosed caller ID authentication system within a call handling system.

In conclusion, none of the prior art demonstrates a method of authenticating and classifying caller ID as authenticated or spoofed. And if the caller ID cannot be determined to be authenticated or spoofed, it is classified as irresolute. None of the prior art demonstrates a method where the caller sends a message with the source and destination of the call to an authentication server. And where the called party can query the authentication server to crosscheck the received caller ID against the caller message received by the server. None of the prior art demonstrates other aspects of the invention, such as where the authentication server pushes the received message from caller to the called party, where the called party uses the pushed message to authenticate caller ID. None of the prior art demonstrates the aspect of the invention where the caller ID authentication is done in a peer-to-peer fashion, without the need for an authentication server. None of the prior art introduces the concept of certification within a caller ID authentication system. The concept of certification allows for the authentication server to certify that the authentication device transmitting a message containing a source telephone number in fact possesses ownership over the source telephone. None of the prior art combines such caller ID authentication within a call handling system, where the call handling system is separated into local, global and private call lists.

SUMMARY OF THE INVENTION

It is to be understood that both the following general description and the following example descriptions are explanatory only and are not restrictive of the invention as claimed.

In one embodiment of the proposed caller ID authentication and spoof detection method and system, a calling party and the called party have installed a caller ID authentication device that monitors all incoming calls and caller ID's and outgoing dialed numbers. Such an authentication device can be in the form of a software application, if the party is using a cellular smartphone. If the party is using a landline, the authentication device can be implemented at the telephone providers switching system. Or the landline party can install an authentication device at the phone line coming into the residence.

The authentication device is able to communicate with an authentication server. When a calling party, which is at the phone number 555-1000 for example, dials a number, such as 555-2000, the authentication device is able to intercept this number. As the call is being connected, the authentication device transmits the calling party's own number and dialed number to the authentication server. When the called party receives the call and the caller ID information of the calling party, the called party's authentication device immediately contacts the authentication server. The called party's authentication device inquires the authentication server if a call has been placed to the called party's number, which is 555-2000, from the calling party's phone number obtained from the caller ID, which is 555-1000. If the authentication server responds in the affirmative, then the authentication device determines that the received caller ID is authentic. If the authentication server responds in the negative, the authentication device determines that the received caller ID is not authentic. If the authentication server indicates the calling party does not currently have the caller ID authentication device installed, the authentication device at the called party determines the caller ID can't be authenticated. The authentication device can then inform the called party of the calling party's caller ID authentication status through various methods, one example of which is modifying the caller ID transmitted to the called phone.

In another embodiment, the authentication server certifies authentication devices in order to prevent an authentication device from fraudulently updating or inquiring the authentication server. Such certification is done by the authentication device contacting the authentication server, transmitting the phone number of authentication device and requesting a password. The authentication server then dials the received phone number of the authentication device and transmits the certification password. The authentication device now must use the received password each time it contacts the authentication server. Thus, the authentication server can be assured that the certified authentication device is at the appropriate phone number and is not fraudulently stating a different number from the one it is connected to.

In another embodiment of the invention, the authentication device is able to authenticate blocked caller ID's. In another embodiment, the authentication device is able to authenticate customized caller ID's that do not disclose the phone number of the caller. In yet another embodiment, the authentication device is able to authenticate customized VoIP caller ID's.

In another embodiment of the invention, the authentication device is able to handle and filter incoming calls. The authentication device maintains an internal whitelist and an internal blacklist. The internal whitelist is populated automatically by the authentication device. The internal whitelist is populated with telephone numbers that the user of the authentication device receives calls from and numbers that the user dials on a regular basis. The internal blacklist is populated by the user with a dialed star code after or during a call from an unwanted number. The authentication device thus uses these lists for call handling. Any incoming call with it's' telephone number on the internal whitelist is allowed to ring and contact the user of the authentication device. Any incoming call with a telephone number on the internal blacklist is prevented from ringing the user's phone. Any number that is not on the internal whitelist or blacklist is treated as a gray number. The handling of incoming calls from gray number can be determined and customized by the user. The user is also able to customize how calls are handled based on the combination of the authentication status of the incoming calls caller ID and which internal list the incoming calls' telephone number is on.

In another embodiment, each authentication device uploads their internal lists to a global list server. The global list server can preferably be the same server used for caller ID authentication or a separate server. The uploaded internal lists are aggregated by the global list server. The global list server maintains a global whitelist and a global blacklist. If a phone number is on a certain number of authentication devices whitelists, the global list server adds that number to the global whitelist. Likewise, if a phone number is on a certain number of authentication devices blacklists, the global list server adds that number to the global blacklist. Thus, when a call is received, the authentication device can allow or drop the call if it is on the internal whitelist or internal blacklist. If the number is not contained on any internal lists, the device can inquire the global list server and allow or drop the call if it is on the global whitelist or global blacklist. If a number is not on any list, the call is handled as a gray number.

In yet another embodiment, the global list server contains a private whitelist and blacklist for each authentication device. If a called user who is using an authentication device receives a call from a caller with a blocked caller ID and who is also using an authentication device, the called party has the ability to add the blocked caller ID to the private whitelist or blacklist. Since the authentication device of the caller with a blocked caller ID is sending to the authentication server the phone number of the caller and if the global list server has access to the authentication server, that phone number may be added to the private whitelist or blacklist of the called party. Once on the private whitelist or blacklist, if the same caller calls again, when the called authentication device contacts the authentication server to authenticate the blocked caller ID, the authentication server can query the global list server and indicate that the called party that the calling number is on user's private whitelist or blacklist. Thus the authentication device of the called party may handle calls from blocked caller ID's.

The concept of certification is extended to passive certification. Passive certification allows for computing of the certification password through calls made and received by the authentication device. The certification password is updated to include the caller ID information sent to the authentication server. Through such a system, the certification password is changed on each call and the old certification password invalidated.

In another embodiment, the concepts of revealing caller ID's to certain or all parties are disclosed. The concept of caller ID revelation is then applied to VoIP calls. The concepts of caller ID authentication is discussed as they relate other forms communications, such as SMS source address authentication, email source address authentication, and postal mail source address authentication.

BRIEF DESCRIPTION OF THE DRAWINGS

The same reference number represents the same element or the same type of element on all drawings.

DETAILED DESCRIPTION OF THE INVENTION

This disclosure of the invention is submitted in furtherance of the constitutional purposes of the U.S. Patent Laws "to promote the progress of science and useful arts" (Article 1, Section 8). The accompanying drawings, which are incorporated in and constitute a part of the specification, illustrate embodiments of the invention and together with the general description, serve to explain the principles of the invention. All publications, patents, patent applications, and references cited in this specification are incorporated herein by reference in their entirety.

The invention disclosure is separated into Sections and Subsections. The Section and Subsection titles are followed by the figures those sections reference, if any. The Section may be referenced with the notation "Section (1)". A Subsection would be referenced by the notation "Section (1-a)", which would be a reference to the first Section (1) "Caller ID Authentication Device Implementations" and the Subsection (a) "Residential Landline Implementation", which is the first Section and Subsection below.

Figure 1A:
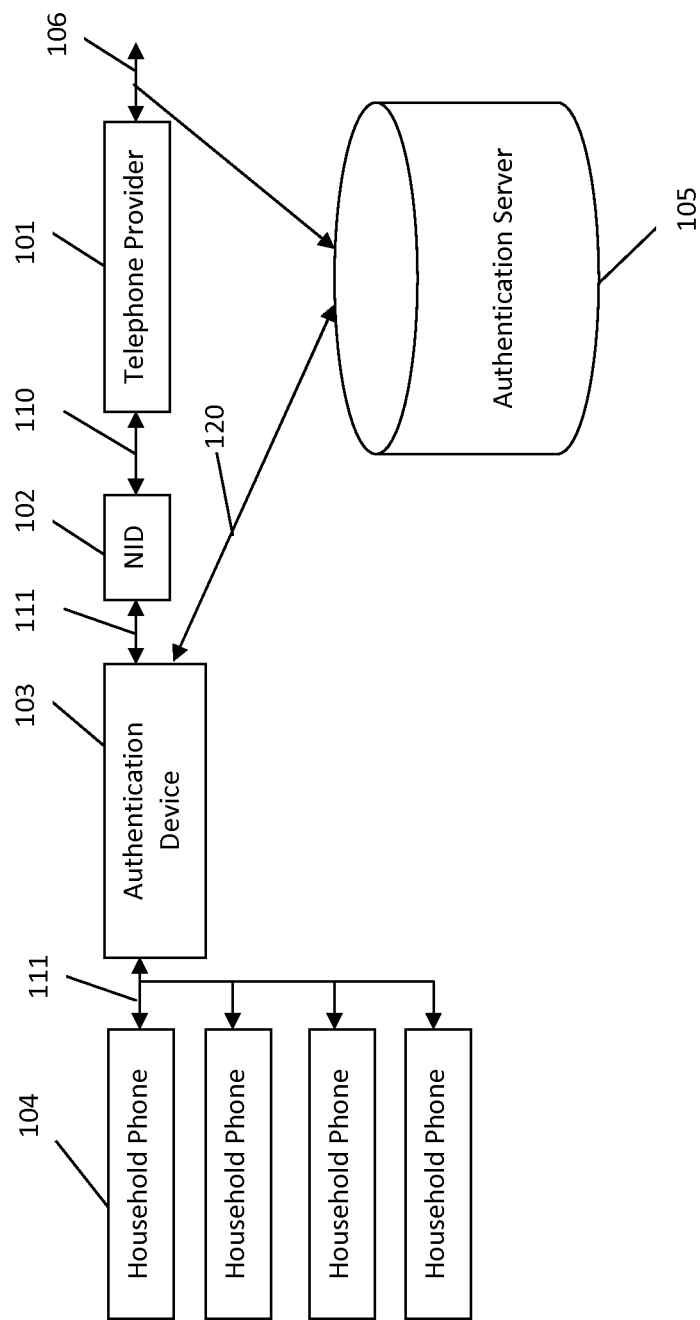
FIG. 1A represents a simplified block diagram of a landline communications network utilizing the caller ID authentication device within a residential setting in an exemplary embodiment of the invention.

1) Caller ID Authentication Device Implementations (FIG. 1A-FIG. 2B)

a) Residential Landline Implementation (FIG. 1A)

The block diagram of FIG. 1A shows one implementation of the invention embodiment. The block diagram of FIG. 1A shows the caller ID authentication device 103 connected to a residential household telephone system. The household telephones 104 are serviced by a telephone service provider 101. Telephone service providers may consist of companies such as Verizon, AT&T, and the like. The telephone service provider provides telephone service through a communication medium 110, such as twisted pair, fiber optic, or a coaxial system. The communication medium 110 is usually referred to as the local loop. The telephone service provider provides telephone service to the residence through public switched telephone network (PSTN) 106. The telephone service provider communication medium 110 is connected to the residence through a Network Interface Device (NID) 102. The NID serves as a demarcation point between the telephone service provider's local loop 110 and the residential premises wiring 111. The residential premises wiring 111 usually consists of a twisted pair or a pair of copper wires which provide analog voice service to the household phones 104. The caller ID authentication device 103 is connected between the NID and the household line. The caller ID authentication device may employ any of the described embodiments mentioned in this document. The authentication device is able to connect to an authentication server 105. The authentication server can consist of any server system known in the art and any required data storage and retrieval systems such as a database. The authentication server also has access to the PSTN 106. The connection to the authentication server 120 from the authentication device can be cellular, DSL, coaxial and the like. The connection to the authentication server may be done through the same residential wiring 111, for example if the household is served by a DSL service, and the authentication device contains an integrated DSL modem. Alternatively, the caller ID authentication device can connect to the Internet through a Wi-Fi or an Ethernet connection, made available by the residence. Preferably, the authentication server is accessible from the Internet with connection to the authentication server 120 being a broadband Internet connection which also serves the residence. However, it should be clear that the connection to the authentication server can be made on any medium which supports transmission of data.

Alternatively, each household phone 104 can have an authentication device 103 integrated within. For example, a household corded or cordless phone can come equipped with an authentication device integrated into the phone by the manufacturer. The authentication device could have access to the authentication server through the residence wireless internet access, an Ethernet cable, a coaxial cable or through the residential telephone line itself. If there are more than one household phones, each authentication device of each phone may act independently, or they may form a master and slave relationship. That is, each authentication device may transmit and receive from the authentication server independently. Or one authentication device may declare itself to be a master device, and can route information to and from other slave authentication devices to the authentication server on behalf of those devices.

The installation of the authentication device to the residence can be performed by the telephone service provider by sending a technician to the residence and the technician installing the authentication device between the residence wiring and the NID. Alternatively, the telephone service provider can make available for purchase self install kits for the residential customers. In which the residential customers would perform a similar installation procedure as the technician.

The authentication device may consist of a hardware solution, such as an electronic device with one phone jack for receiving the telephone line from the NID. And another phone jack for connecting to the premises phone line. Thus, the authentication device would be able to relay calls to and from the telephone network to the household and provide all the functionality required by the embodiments presented. The authentication device would also contain an Ethernet port for connecting to the internet. Alternatively, the authentication device may contain a Wi-Fi card for connecting to the residence wireless internet connection. Or the authentication device may contain an integrated DSL modem. The DSL modem would access the DSL internet connection through the same phone jack connected to the NID line.

Figure 1B:
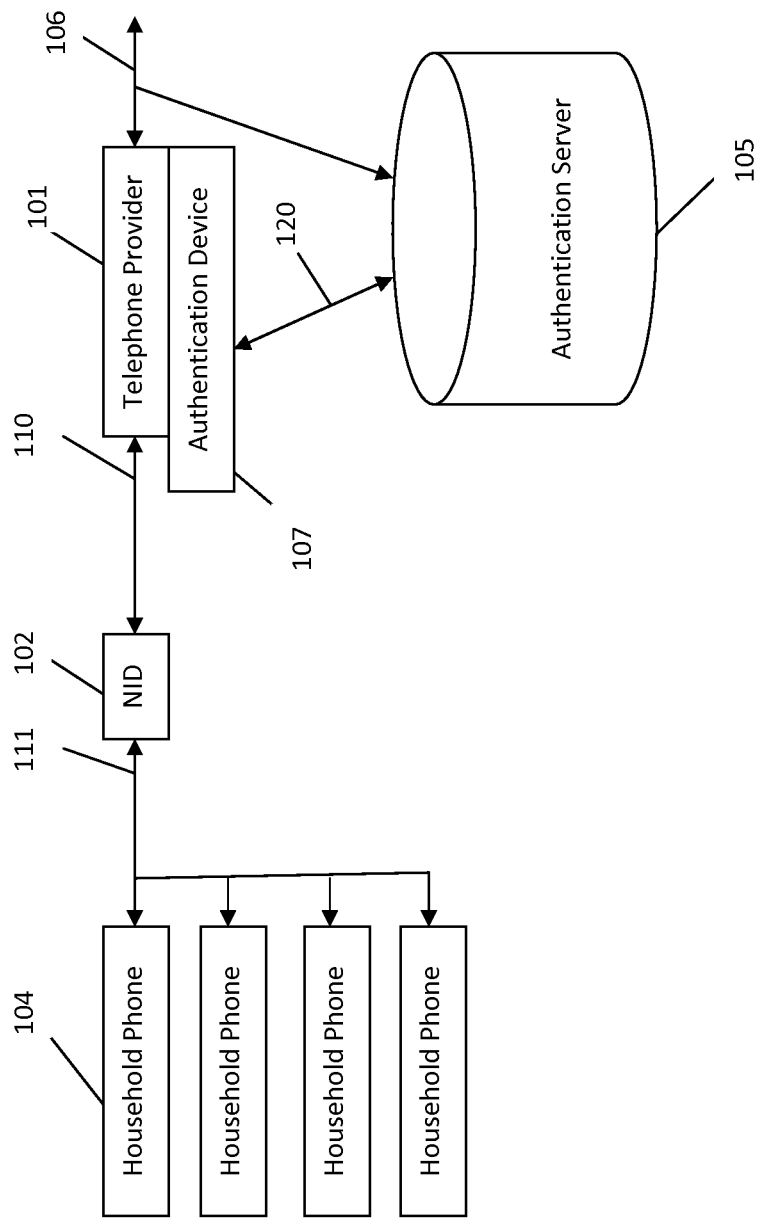
FIG. 1B represents a simplified block diagram of a landline communications network utilizing the caller ID authentication device within the telephone service provider in an exemplary embodiment of the invention.

The authentication device may also be integrated into an Intelligent Network Interface Device (iNID). Such as setup would allow for the hardware and software required for implementing the following embodiments to be integrated into the NID itself.

b) Telephone Service Provider Implementation (FIG. 1B)

The block diagram of FIG. 1B shows the same type of authentication device as was described in FIG. 1A. However, the authentication device 107 is implemented at the telephone service provider instead of at the household residence. The block diagram shown in FIG. 1B is similar to the one shown in FIG. 1A, except the authentication device is implemented at the telephone service provider. The telephone service provider may implement the caller ID authentication device through any combination hardware or software required to perform the functions of the authentication device as will be described. Thus, all the customers serviced by the telephone service provider may utilize the functions of the authentication device, without each individual customer having to install the device.

The authentication device may also be implemented as software within PBX systems. An example of such a software system is the Asterisk PBX system (www.asterisk.org). The authentication device would be implemented as software, since such an Asterisk system would already contain most or all the necessary hardware for connecting to an authentication server, handling incoming and outgoing calls in accordance within the embodiments described herein. Readers are encouraged to consult appropriate Asterisk documentation at asterisk.org website (www.asterisk.org/community/documentation) and consult the book "Asterisk: The Definitive Guide, 3rd Edition" by Leif Madsen (cdn.oreillystatic.com/books/9780596510480.pdf), herein incorporated by reference in its entirety.

c) Cellular and Smartphone Implementation

In the cases where the caller ID authentication is wished to be provided for cellular phones, such as Apple or Android smartphones and the like, the caller ID authentication device can consist of software routines integrated into the phone operating system (OS) or the authentication device can be integrated into the hardware of the cellular phone device. Alternatively, the caller ID authentication software may be downloaded and installed as an application, from an appropriate application store such as Apple App Store or Google Play App Store if present, by the cellular phone owner. The caller ID authentication software, either integrated into the OS or downloaded, would be able to carry out the embodiments of the invention described herein. The caller ID authentication software would be able to contact the authentication server through the cellular phone data connection. The cellular data connection could be obtained the by cellular customer through subscribing to the appropriate cellular data service, or the cellular telephone provider may offer the data connection to the authentication server free of charge for caller ID authentication purposes. The caller ID authentication software would also be able to change caller ID information, or instruct the caller ID information to be displayed in a certain color for authenticated caller ID's, for example.

Figure 2A:
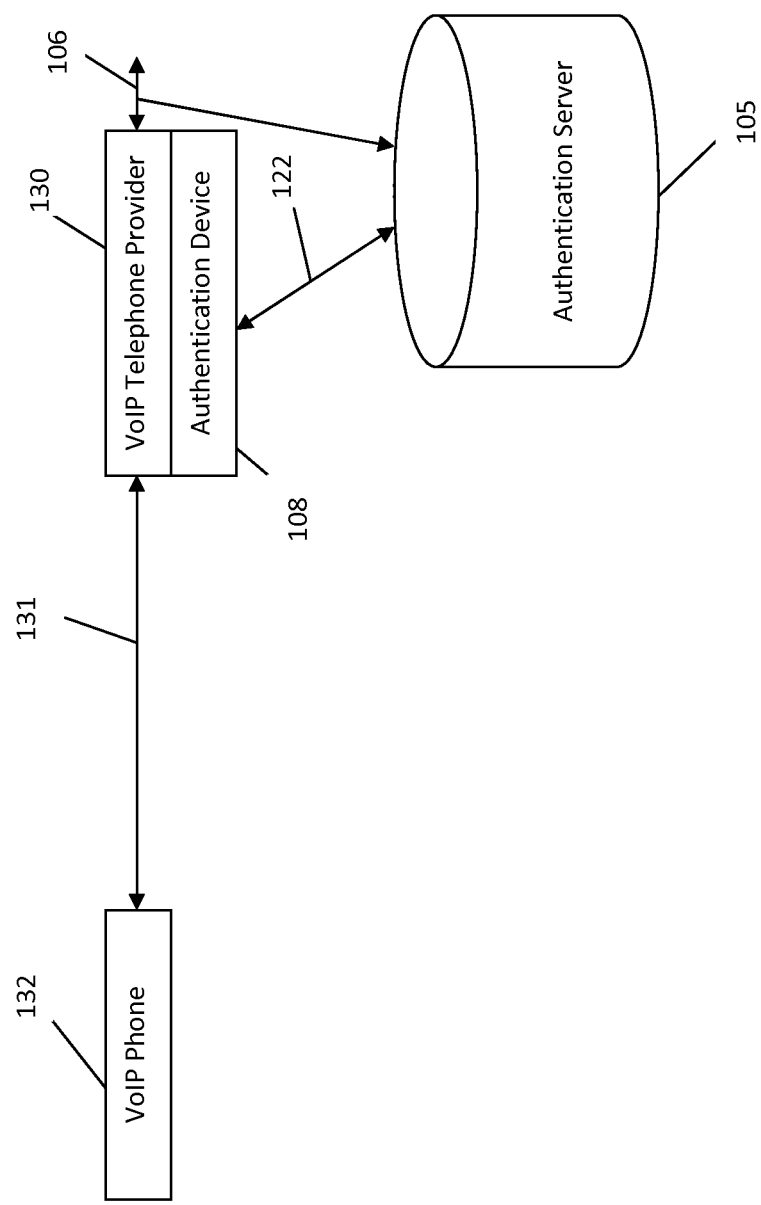
FIG. 2A represents a simplified block diagram of an embodiment of the invention implemented on a VoIP system where the authentication device is implemented at the VoIP provider.
Figure 2B:
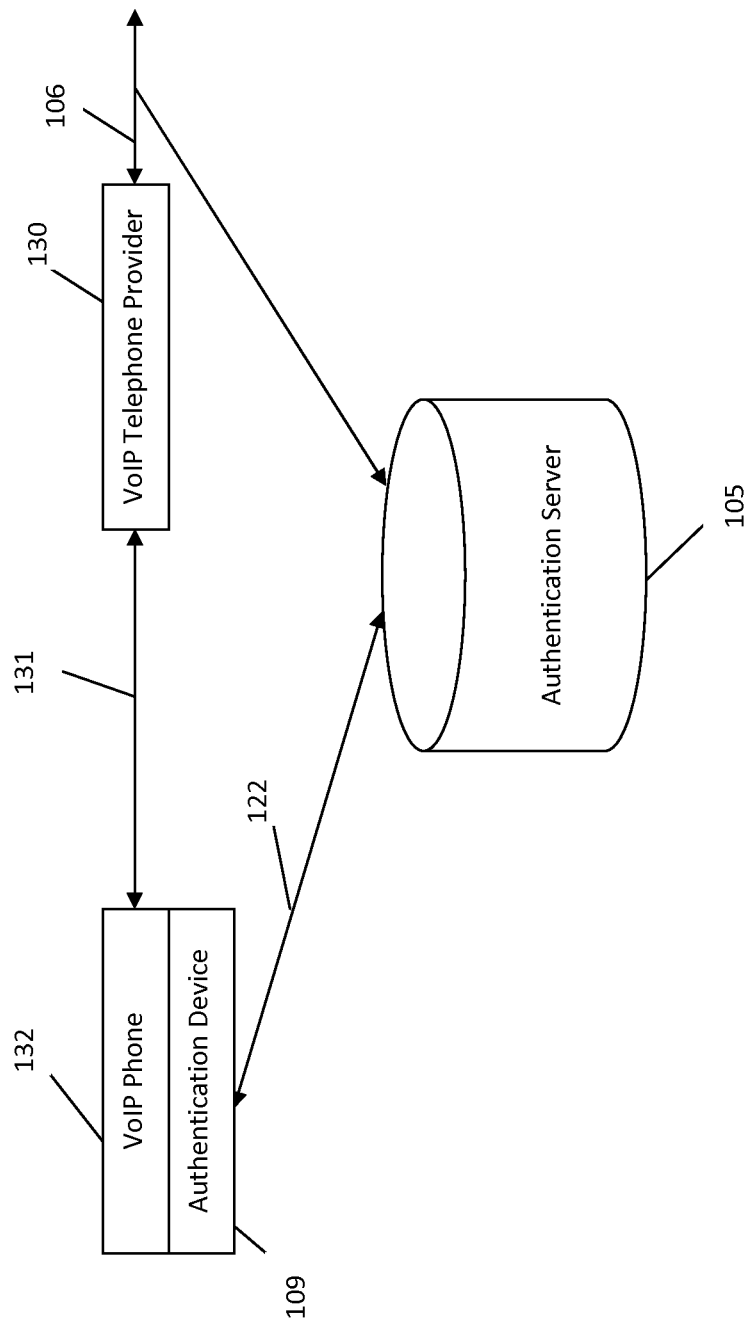
FIG. 2B represents a simplified block diagram of an embodiment of the invention implemented on a VoIP system where the authentication device is implemented at the customer.

Alternatively, the authentication device can be implemented at the telephone service provider of the cellular customer, similar to the system shown in FIG. 1B.

d) VoIP Implementations (FIG. 2A-FIG. 2B)

The block diagram of FIG. 2A shows one example of an embodiment of the invention implemented on a VoIP system. The block diagram shows a VoIP provider 130 implementing an authentication device 108. A VoIP provider may consist of companies such as Vonage, Skype, and the like. Such VoIP providers allow its' customers to use a computer phone software or a physical phone type device connected to an internet connection to call phones on the telephone network 106. The VoIP customers usually are not assigned a phone number, but may be in some instances. Thus, most VoIP customers are mainly concerned with ability to connect to customers on PSTN networks, and not mainly interested in receiving calls. Again, this not always the case. VoIP customers such as on the Skype provider may receive calls from other VoIP customers who do not have a phone number. One Skype customer may simply contact another Skype customer through their Skype username, and none of the parties may possess a phone number. In FIG. 2A, the VoIP customer may or may not possess a phone number. The VoIP customers with a VoIP phone 132, which may be in the form of a hardware phone or a software phone program running on a computer, connects to the VoIP provider over a connection 131. The connection 131 is usually an internet connection. The VoIP provider may implement the authentication device as a combination of hardware or software. The VoIP authentication device connects to an authentication server 105 through a data connection 122. Data connection 122 is preferably an internet connection. The authentication server also has access to the PSTN 106. The authentication device for the VoIP provider might have its' own phone number. As will be elaborated later, the concept of certification of an authentication device requires the authentication device to be connected to a phone number. In previous implementations shown in FIG. 1A and FIG. 1B, the authentication devices had a phone number which was the same phone number of the customer. However, in a VoIP system, the VoIP customer might not possess a phone number, thus the authentication device of a VoIP system will in most cases require its own phone number.

If the VoIP customer has his own phone number, the authentication device may be implemented at the customer end, as is shown in FIG. 2B. The customer VoIP phone 132 may be in the form of phone software running on the customers PC. The authentication device 109 may thus simply be in the form of a software add-on or plug-in running alongside the phone software. Alternatively, the authentication device functionality may be integrated within the phone software. If the VoIP customer is using hardware phone connected to the internet through a VoIP adapter (not shown), then the authentication device may be integrated into the VoIP adapter.

2) Caller ID Authentication Device Functional Overview

This section and the next section describe and elaborate some of the functionalities of the authentication device and the authentication server. These two sections are provided mainly as reference. Certain readers who are versed in the field of telecommunications may choose to skip to Section (4), and refer to these sections at a later time.

The caller ID authentication device is able to perform some or all of the following functions depending on the embodiment of the invention;

a) Intercept outgoing calls and extract outgoing dialed numbers, b) Present interactive voice response (IVR) to the user of the device for presenting the device settings to the user and allowing the changing of those settings, c) Pass through voice communication d) Access a data network e) Access an authentication server over the data network f) Intercept incoming calls g) Selectively ring the user phone h) Extract caller ID from an incoming call i) Communicate with the authentication server for the purpose of caller ID authentication j) Modify caller ID presented to the user to notify the user of the caller ID authentication status, and/or notify the user of the caller ID authentication status through other means k) Maintain internal database of whitelisted and blacklisted telephone numbers l) Implement logic to autonomously place telephone numbers on the internal whitelist m) Implement logic to allow the user to manually place telephone numbers on the internal blacklist n) Handle incoming calls according to the list the incoming telephone number is contained in o) Access a global list server p) Upload contents of the internal list to the global list server q) Check the telephone number of an incoming call against the global list server for call handling purposes r) Evaluate calls for certain criteria for the purpose of automated blacklisting of incoming calls However, not all functionalities stated may be required in all implementations and in all embodiments. The authentication device with the required functionalities may be realized in hardware or software, or combinations thereof, by a person skilled in the art. The authentication device may be required to perform other functionalities in certain embodiments, than are disclosed in this section. Some of the functionalities will be elaborated in this section, while other functionalities will be explored later in this document in more detail through disclosure of the invention embodiments.

a) Intercept Outgoing Calls and Extract Outgoing Dialed Numbers,

For outgoing calls from the user phone to the telephone network, the caller ID authentication device is able to extract dialed numbers by the user. The device may immediately pass through the dialed numbers by the user to the telephone network, or delay them. The purpose of delaying passing dialed numbers to the telephone network is twofold. If the user dials a star code that is specific to the authentication device functionality or settings, the star code would not be passed to the telephone network and the device can respond appropriately, through voice menu prompts for instance. Another benefit of delaying passing the dialed numbers is to give the caller ID authentication process a time buffer. If a user dials a valid telephone number, for example a ten digit number, the device may delay passing these numbers to the telephone network, for example by half a second to two seconds. The device can then use this delay to contact the authentication server and relay the dialed numbers. This delay would allow more time for the authentication server to be updated. The device can then put the call through. The delay would allow the authentication process to be perceived by the user as being more transparent and closer to real-time functionality.

The authentication device may drop outgoing calls and may play voice menu to the user For example, if a user on a residential phone dials *17, the authentication device may disconnect the call from the telephone network, pick up the call and play a voice menu to the user.

b) Present Interactive Voice Response (IVR) to the User of the Device for Presenting the Device Settings to the User and Allowing the Changing of Those Settings Interactive voice response (IVR) is a technology that allows a computer to interact with humans through the use of voice and DTMF tones input via keypad. In telecommunications, IVR allows customers to interact with a company's host system via a telephone keypad or by speech recognition, after which they can service their own inquiries by following the IVR dialogue. IVR systems can respond with prerecorded or dynamically generated audio to further direct users on how to proceed. IVR applications can be used to control almost any function where the interface can be broken down into a series of simple interactions.

Similarly, the customer may access the authentication device settings through voice prompts or IVR or through an Internet interface. In the case of voice prompts, the residential customer can dial a star code, such as *09. The authentication device can intercept the dialed numbers and immediately answer the call with a voice menu. The voice menu can then allow the customer to modify or set the options of the authentication device. The authentication device settings can also be controlled over the internet. A connection to the authentication device can be made over the Internet and the settings can be modified. Alternatively, the authentication device can store its settings on an Internet server. The customer can then connect to the Internet server where the settings are stored and make changes, ideally through a graphical interface. Once the changes are made, the authentication device can download the changed settings from the server and apply the changes to itself. If the authentication device is installed at the telephone service provider as was shown in FIG. 1B, the provider can allow changes to be made through the internet or through voice prompts, in a similar fashion. If the authentication device is installed on a smartphone, the settings can be modified through the smartphone application.

c) Pass Through Voice Communication

Once a call is connected, the authentication device passes through all voice communications.

d) Access a Data Network

The authentication device has an onboard communication module. The communication module can be any such module known in the art that allows access to any known wired or wireless data network. Such a communication module may be an Ethernet networking card, telephone modem, DSL modem, cellular modem, Wi-Fi card, and the like.

e) Access an Authentication Server Over the Data Network

For both outgoing and incoming calls, the authentication device is able to contact an authentication server.

Once the authentication device is installed, the authentication device may need to contact the authentication server to request certification password and send heartbeat messages to indicate that it is installed at a particular number. The number of the phone the authentication device is connected to can be directly inputted into the authentication device by the installer. For example, if the authentication device is installed at a landline, then the phone number can be inputted into the authentication device through the voice menu and prompts. Or the phone number can be inputted through an internet connection. If the authentication device is installed at a cellular phone, then the phone number can be inputted into the software application through the settings menu of the application.

Alternatively, the authentication device can discover the phone number the device is connected to autonomously. For example, the authentication device can dial an Automatic Number Announcement Circuit (ANAC) phone number and determine its' own phone number. If the authentication device is installed at a cellular phone, the device may discover the cellular phone number through the operating system.

Once the authentication device knows the phone number it is connected to, it may contact the authentication server and send a heartbeat message to indicate that it is installed at the particular number. The authentication server can then use this information to determine if a particular phone at a particular phone number has an authentication device installed or not installed. The installation status of the authentication device is used to determine and differentiate between cases; where the authentication device is installed and not currently placing calls, and where the authentication device is not installed. This determination becomes important where one caller is trying to spoof the caller ID of another caller. Such cases will be explained through examples later. The contents of the heartbeat message can consist simply of the phone number the authentication device is connected to. The authentication server can thus store the phone number in the heartbeat message. The heartbeat message can be sent at regular intervals, such as hourly, every 2 hours or daily. The heartbeat message received at the authentication server may be time stamped by the server. The time stamping would allow for the server to determine if the authentication device has transmitted the heartbeat message in the predetermined time interval, such as hourly, every 2 hours or daily. If not, the authentication server may determine that the authentication device has stopped functioning. As will be elaborated, the status of the authentication device will be utilized by the server for caller ID authentication and spoof detection.

f) Intercept Incoming Calls

In addition, the caller ID authentication device may intercept, mute, or drop incoming calls from the telephone network. As was explained previously, the authentication device is installed before the customer phone and all calls pass through the authentication device before reaching the customer phone. If a call is received by the authentication device, the authentication device may intercept the call and play a message to the caller, without ringing the household phones. Alternatively, the authentication device may ask the caller to verify they are human, as will be explained in later embodiments. In another embodiment, the authentication device may take a message from the caller, without ringing the household phones. In another embodiment, the authentication device may pick up and immediately hang up the incoming call, without ringing the customer phone. In another embodiment, the authentication device may play a tone to the incoming call, such as a tone to indicate that the line is disconnected, without ringing any of the household phones.

g) Selectively Ring the User Phone

In other embodiments of the invention, the caller ID authentication device is able to drop calls without ringing the customer phone or the cellular phone it is connected to, based on white and black lists maintained by the authentication device and the global list server. Besides the modifications described, the authentication device passes through all voice calls to and from the household phones transparently.

h) Extract Caller ID from an Incoming Call

The authentication device is able to extract caller ID information from an incoming call. In most embodiments, the device of the called phone will not pass through the incoming call ring until the caller ID is extracted and authenticated. In most embodiments, the device of the called phone rings the called phone after the caller ID is authenticated and the authentication status is shown to the user, such as through modified caller ID information.

i) Communicate with the Authentication Server for the Purpose of Caller ID Authentication The authentication device implements logic to communicate with the authentication server and transmit and receive messages for the purpose of caller ID authentication.

j) Modify Caller ID Presented to the User to Notify the User of the Caller ID Authentication Status, and/or Notify the User of the Caller ID Authentication Status through Other Means For incoming calls from the telephone network to the user phone, the caller ID authentication device is able to intercept, extract, modify and transmit the caller ID information received from the telephone service provider. The caller ID authentication device for instance might receive from the telephone service provider a call with a caller ID in the form of "John Smith 555-1000". The caller ID authentication device might then change this caller ID to "[A] John Smith 555-1000". The added "[A]" prefix signifying that the caller ID has been authenticated, as will be elaborated and explained later in this document. Once the caller ID has been intercepted and modified if need be, the authentication device can then pass the caller ID information to the called phone. The customer phone can then display the caller ID information passed by the authentication device. The customer phone can also be manufactured to take advantage of such modified caller ID information. For example, if a caller ID has the prefix "[A]", the caller ID display can light up in a green color. If the modified caller ID has the prefix "[S]" to indicate a caller ID that is spoofed, the caller ID display can light up in a red color for example. Likewise, the customer phones can ring in a different ring tone depending on the caller ID prefix received.

As was explained previously, the caller ID information is relayed to a phone between the first and second rings. This causes several problems with respect to caller ID authentication. If the called authentication device wishes to modify the received caller ID with a prefix to indicate the authentication status, it must do so within the first and second ring. Unfortunately, this might not be possible. The called authentication device receives the caller ID of the incoming call within the first and second ring. Thus, the authentication device must extract the caller ID information, contact the authentication server to authenticate the caller ID, receive a response from the server and send the modified caller ID to the called phone in the time between the first and second ring. The time between the first and second rings might not be sufficient to carry out the steps of caller ID authentication and caller ID modification by the authentication device. Therefore, the called authentication device in most cases might need to delay the ringing of the called phone for a certain period of time to provide a time buffer for the purpose of caller ID authentication.

For instance, the authentication device might receive a first ring of an incoming call. The authentication device might delay the first ring and not transmit the ring to the called phone. Between when the first and second ring comes, the authentication device will have already received the caller ID information from the telephone service provider. The authentication device can then contact the authentication server, authenticate the caller ID and modify the received caller ID to indicate its' authentication status. Once the caller ID is authenticated the authentication device can then ring the household phone a first time, send the modified caller ID, and ring it a second time. Depending on the connection speed of the medium 120 or 122 to the authentication server and the overall time required for the authentication server to respond, the delay maybe one or two rings. If the delay required is a single ring, the authentication device begins ringing the household phone on the second ring received from the telephone service provider. If the delay required is two rings, then the authentication device begins ringing the household phones on the third ring received from the telephone service provider. And so on for additionally needed rings. Rings can also be delayed on a time basis. Such that the authentication device begins ringing the household phones, 5 seconds for example, after receiving the first ring from the telephone service provider. Solutions to overcome the delayed ringing will be explored later in this document.

k) Maintain Internal Database of Whitelisted and Blacklisted Telephone Numbers

The authentication device maintains an internal database of phone numbers. These phone numbers may then be used for the purpose of call handling.

l) Implement Logic to Autonomously Place Telephone Numbers on the Internal Whitelist The authentication device implements logic to autonomously place telephone numbers of incoming calls on the internal whitelist.

m) Implement Logic to Allow the User to Manually Place Telephone Numbers on the Internal Blacklist The user may also place the telephone number of an incoming call to the internal blacklist through star codes.

n) Handle Incoming Calls According to the List the Incoming Telephone Number is Contained in The authentication device may then use the internal whitelist and blacklist to handle incoming calls. The handling of incoming calls may also take into account the authentication status of the incoming caller ID.

o) Access a Global List Server

The authentication device may contact a global list server. The global list server may be implemented within the authentication server.

p) Upload Contents of the Internal List to the Global List Server

The authentication device can upload the contents of the internal lists to the global list server.

q) Check the Telephone Number of an Incoming Call Against the Global List Server for Call Handling Purposes The authentication device may contact the global list server and check the incoming caller ID against the global list server for the purpose of handling such calls.

r) Evaluate Calls for Certain Criteria for the Purpose of Automated Blacklisting of Incoming Calls The authentication device may also evaluate calls according to certain metrics, such as call duration, which party talked, which party talked the most, voice recognition, etc. These metrics may then be used to autonomously place the telephone number of the incoming call on the internal blacklist or identify such calls as potential blacklisted calls.

3) Authentication Server Functional Overview

The authentication server may be implemented in hardware or software, or combinations thereof known in the art. The authentication server is able to receive communication from authentication devices installed at each user's phone. The authentication server contains logic to analyze the communications it receives. The authentication server has a database to store and process received information. The server is able to reply to inquiries made by the authentication devices. The server is able to dial phone numbers, connect to authentication devices over the telephone network, and send data on the telephone system through any available means, such as modem, DTMF tones, or through a computerized voice. The server may also maintain call handling lists on behalf of the authentication devices. The server may aggregate call handling lists of authentication devices. These and other functionalities will be elaborated in following embodiments.

The authentication server may have a static point of contact, such as a static IP address. Conversely, the authentication server may have a dynamic point of contact, such as a dynamic IP address. In cases of a dynamic point of contact, the dynamic contact point of the authentication server would be registered with a central service, such as a DNS type service. Through a DNS server, the authentication devices may look up the dynamic IP address through a previously known authentication server domain name. Similar schemes may be used on other types of telecommunication systems in which the authentication devices and authentication server resides.

Figure 3A:
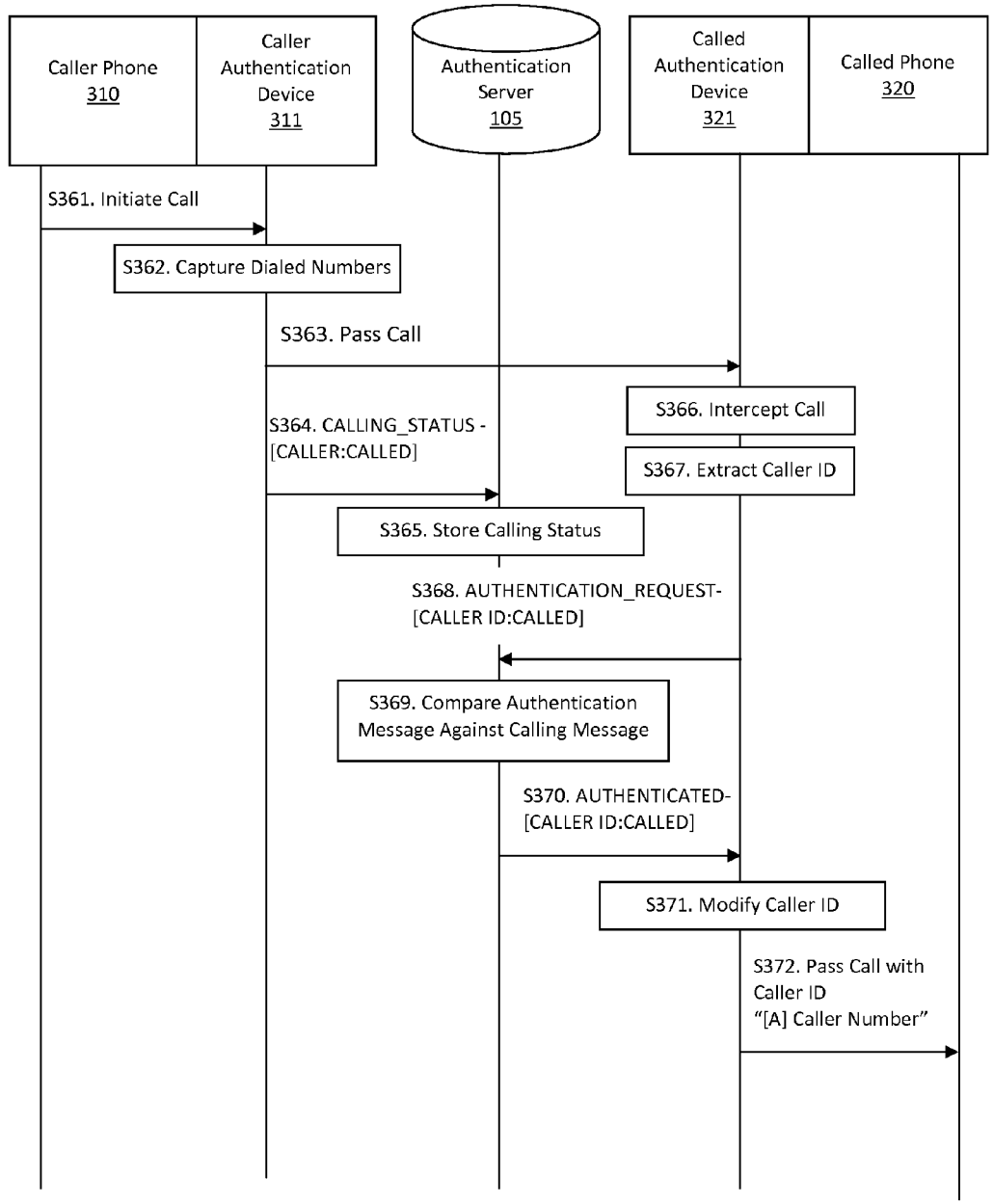
FIG. 3A represents the flowchart and messaging diagram the caller ID authentication device at both the caller and called party uses to authenticate caller ID.
Figure 3B:
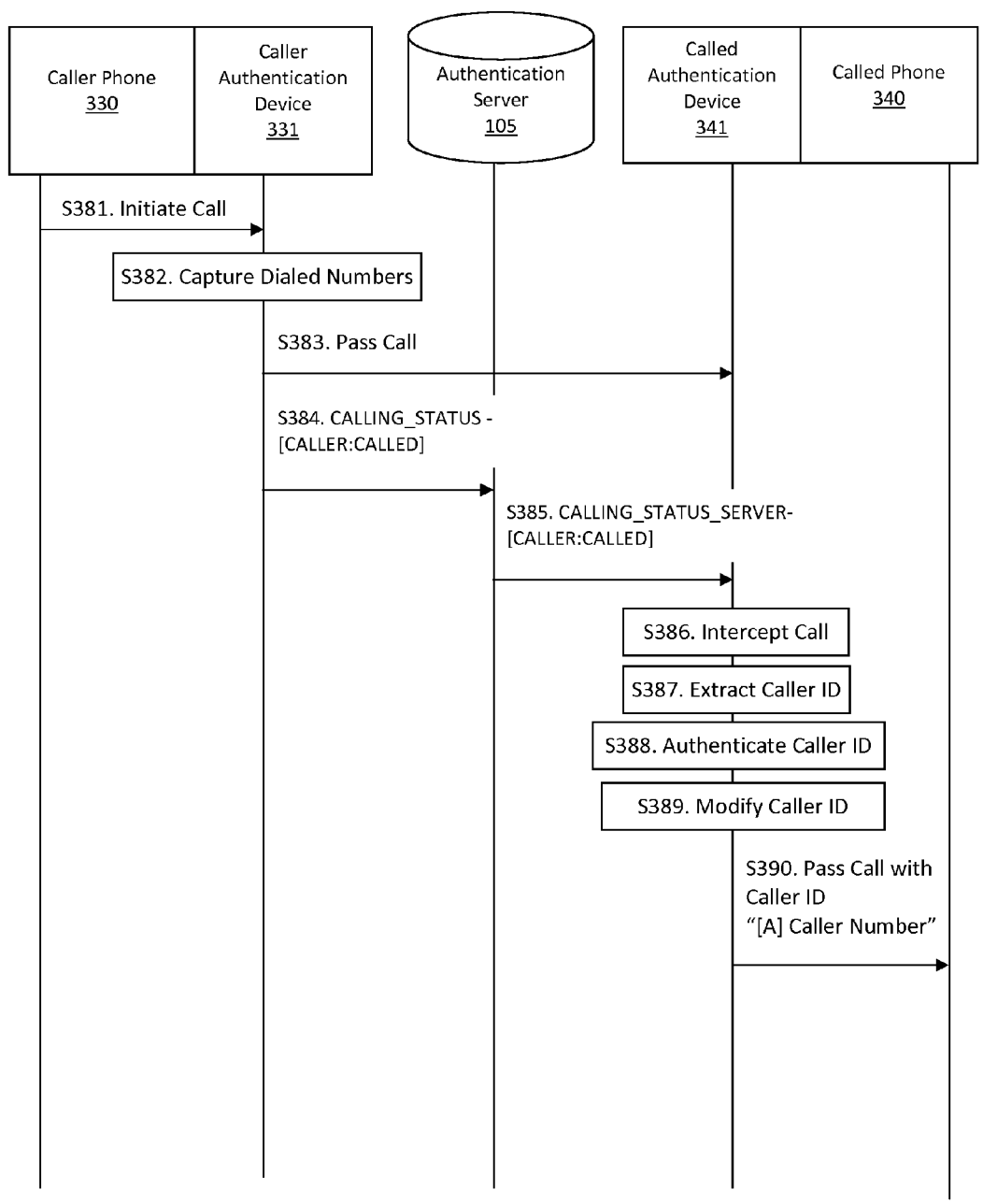
FIG. 3B illustrates the sequence where the authentication server initiates contact with the called phone authentication device instead of the authentication device initiating contact with the server.

4) Caller ID Authentication Device Operational Overview (FIG. 3A-FIG. 3B)

a) Called Authentication Device Contacts Server Variation (FIG. 3A)

FIG. 3A represents the flowchart and message diagram the caller ID authentication device, at both the caller and called party, uses to authenticate caller ID according to an embodiment of the invention. In FIG. 3A, both the caller and the called parties have a caller ID authentication device installed. In most instances, in order to authenticate, both caller and called parties will be required to have implemented or installed the caller ID authentication devices at their ends. Situations where only one party has the caller ID authentication device implemented will be elaborated later and solutions explored. The heartbeat message sent by the authentication devices will not be explicitly shown or elaborated in this embodiment and will be explained in more detail in other embodiments, such as in Section (5-b).

In FIG. 3A, the sequence of events is shown where the caller phone 310 is calling the called phone 320. The caller and the called phones might both be on a traditional landline phone system. In such a case, the authentication device of the caller 311 and the authentication device of the called 321 might be implemented as was described in Section (1-a) or (1-b), or any combination thereof. Such as, the caller 310 might have installed the authentication device 311 between his phone and the NID. And the authentication device 321 of the called phone 320 might be implemented at the telephone service provider. Alternatively, either or both parties could be using a cellular phone, and the authentication device might consist of a computer program integrated into the phone OS or a downloadable application. The authentication server 105 can consist of any server and accompanying database and logic known in the art and which can be reached by the authentication devices.

The caller 310 in FIG. 3A initiates a call by dialing a number (Step S361). Before the dialed number is passed to and connected by the telephone service provider, the authentication device is able to intercept and capture the dialed numbers (Step S362). The device may either collect the dialed numbers and only pass them to the telephone network when a valid telephone number is entered; or the device may pass through and capture the dialed numbers transparently. As soon as the number is dialed and the call is placed to the called phone 320 through the PSTN (Step S363), the authentication device of the caller 311 contacts the authentication server 105 (Step S364). The authentication device of the caller transmits the caller's phone number and the phone number of the called phone, hereafter referred to as the calling status message. For example, the transmitted calling status message to the authentication server from the caller authentication device can be in the form of "CALLING_STATUS-[Caller:###-###-####, Called:###-###-####]", where the # signs are numbers which together signify a telephone number. The calling status message contains the information that the "Caller" at the following phone number is currently calling the "Called" party at the following number. The transmitted information can be in the form of regular text data, or could be encrypted before transmission. The transmitted information could also be in any other format. Thus, the authentication server receives and stores the information that the caller's phone number is calling the called phone number (Step S365). When the call from the caller reaches the called phone 320, the authentication device of the called phone 321 intercepts the call (Step S366). The call is not allowed to ring the called phone. The authentication device of the called phone receives and extracts the incoming caller ID information (Step S367). The caller ID information contains the number of the caller phone, however, the information within the caller ID is assumed not to be reliable and may have been spoofed. Thus, the authentication device of the called phone contacts the authentication server 105 (Step S368). The authentication device of the called phone inquires the authentication server as to whether the caller phone as indicated by the caller ID is calling the called phone number. The called phone number is the phone number that is currently connected to the authentication device of the called phone. Such an inquiry, hereafter referred to as an authentication request message, may be in the form of "AUTHENTICATION_REQUEST-[Caller:###-###-####, Called:###-###-####]", where the # signs are numbers which together signify a telephone number. The transmitted information contains an authentication request that the "Caller" at the following phone number is currently calling the "Called" party at the following number. As was previously discussed, the "Caller" number is the number obtained by the authentication device through the received caller ID. The "Called" number is the number that the authentication device is currently connected to and is currently authorizing caller ID's for. The transmitted information can be in the form of plaintext data, or could be encrypted before transmission. The transmitted information could also be in any other format. The authentication server looks up if there has been a calling status message received where the caller and the called parties are identical to the parties in the authentication request message (Step S369). If so, the authentication server replies with indication that the caller phone is currently is indeed calling the called phone (Step S370). The authentication server reply, hereafter referred to as the authenticated message, can be in the form of "AUTHENTICATED-[Caller:###-###-####, Called:###-###-####]". Once the caller ID is checked against the authentication server, the authentication device allows the call to ring the called phone. The authentication device modifies caller ID information (Step S371) and passes the modified caller ID to the called phone (Step S372). If the caller ID is determined to be authenticated, the caller ID is prefixed with the text "[A]". The user of the called phone can thus see the authentication status of the caller ID.

As will be elaborated in later examples, the authentication server may determine the caller ID as being spoofed. Such a spoof determination can be made if the authentication server did not receive a calling status message from the caller authentication device. Another method of spoof determination can be where the calling status message was sent from the caller authentication device, but the calling status message indicated a called number different from the called number which is contained in the authentication request. If the authentication server determines the caller ID to be spoofed, the server reply can be in the form of "SPOOF_VERIFED-

[Caller:###-###-####, Called:###-###-####]", hereafter referred to as spoof verified message. If the caller ID is determined be spoofed, the authentication device can modify the caller ID by prefixing it with the text "[S]".

In this embodiment, the authentication status of the caller ID was passed to the called customer through a modified caller ID. The notification of the caller ID authentication status is not limited to modifying the caller ID of the called phone. Other means of notifying the customer of the caller ID authentication status are possible; such as a distinctive ring, changing the color of the caller ID display, changing the display color of the smartphone, etc.

The authentication server may time stamp received messages. Such time stamping would allow messages to be in effect for a certain period of time. For example, the calling status message may be time stamped by the server. The calling status message can then be set to expire after a certain period of time. After the calling status message has expired, the server can determine that the calling party has most likely ended the call initiation to the called party and the called party will not be sending an authentication request. Alternatively, the authentication device may send a message that the call has ended and to expire certain messages sent from the authentication device. The server may also expire matching calling status and authentication request messages once the caller ID has been determined to be authentic. Expiring a message may consist of marking the message as expired or deleting the message from the server records. The advantage marking a message as expired and not deleting the message will become apparent when the concept of auditing authentication devices is explained.

It should be noted that some terminology used in this document may vary or be used interchangeably with others; however, those skilled in the art should be able to comprehend the subject matter without any explicit definitions of such terminologies. For example, with respect to this section, Section (4-a), the terms caller and called phones were used to signify the two parties involved in the call. The terms such as source caller, source number, origin number, and source phone may refer to and identify aspects of the calling party. Similarly, destination phone, destination caller, and called phone may refer to and identify aspects of the called party. Thus, such terminologies may be used interchangeably throughout this document. As such, all interchangeable terminologies known in the art may not be explicitly defined.

b) Server Contacts Called Authentication Device Variation (FIG. 3B)

The authentication device of the called phone contacting the authentication server requires the decoding of caller ID information after the first ring. As was discussed, this might induce a delay in ringing the called phone and as a result, the caller may hang up if the delay is too long. To alleviate this problem, once the authentication server receives information from the caller authentication device, the authentication server may contact the authentication device of the called party instead of waiting for the called phone authentication device contacting the server. Each authentication device may store its' own internet IP address corresponding to it's telephone number, with the authentication server. The authentication server may thus contact the appropriate authentication device at this IP address. Such an IP address, or other contact address, can be transmitted to the server alongside a heartbeat message, as will be elaborated in later embodiments. Once the authentication server contacts the authentication device of the called party, the server can transmit that the caller at a certain number is calling. The authentication device can then store this information. When the call is received at the called phone, the authentication device can intercept the call, extract the caller ID, match the caller ID of the caller to the one transmitted from the server, and put the call through with the modified caller ID information to indicate authentication status. It should be clear that such a system would reduce delay of ringing the called phone and may in fact remove any delays. If the called authentication device receives the caller number from the server before the called phone starts ringing, the authentication device will not need to delay the ringing of the called phone. The authentication device may pass through the first ring in real time, extract the caller ID after the first ring, check that the caller ID matches caller's telephone number received from the server, modify the caller ID information, send the modified caller ID to the called phone, and pass through subsequent rings to the called phone.

The server may send a password when contacting the called party authentication device to prove that the server itself is authentic, and not being impersonated. The sent password may be the same certification password sent to the authentication device by the server, as will be elaborated in later embodiments. The sent password may alternatively be a hash of the certification password. The hashing function may consist of MD5, SHA 256, and the like. The authentication device may then verify the received password and authenticate the server as trustworthy.

This variation can also be interpreted as the push variation. In Section (4-a), the called authentication device contacted or pulled the authentication status of the caller from the server. In this Section and embodiment, the authentication server will push the authentication status of the caller to the called authentication device.

FIG. 3B illustrates the sequence where the authentication server initiates contact with the called phone authentication device instead of the authentication device initiating contact with the server. The caller phone 330 initiates a call to the called phone 340 (Step S381). The authentication device of the caller phone 331 extracts the dialed numbers (Step S382), passes the call through to the telephone network (Step S383) and sends a calling status message to the authentication server 105 (Step S384). The calling status message contains the information that the caller phone at a particular number is calling the called phone at a particular number. The authentication server receives the information and contacts the authentication device of the called phone 341 (Step S385). The authentication server contains the IP address or other appropriate communication contact address of the authentication device of the called party. The address of the device would be previously transmitted by the device to the server. The transmission from the server to the device, hereafter referred to as the calling status server message, may be in the form of "CALLING_STATUS_SERVER-[Caller:###-###-####, Called:###-###-####]". The authentication device of the called phone receives and stores the message. The authentication device waits to receive a call. It is likely that the calling status message from the server will arrive before or at the same time as the call is received from the telephone network. When the call from the caller is received and intercepted (Step S386), the authentication device does not need to delay the ringing of the phone if the calling status message has already been received. The first ring from the telephone line it passed through to the called phone. The called authentication device extracts the caller ID after the first ring (Step S387). The caller ID number is authenticated and matched against the caller number contained in the calling status server message (Step S388). If the caller ID number is identical to the caller number in the calling status server message, the caller ID is modified to indicate an authenticated caller ID (Step S389) and passed to the called phone before the second ring (Step S390). All subsequent rings are passed to the called phone.

If a call is received by the called authentication device, and the called authentication device was expecting a calling status message, the called authentication device may contact the authentication server. Such a scenario could be the result of a caller with a spoofed caller ID. In such a scenario, the called authentication device would contact the authentication server and request authentication. If the caller hadn't called the called party then the authentication server can reply with a spoof verified message. If the caller had called the called party, then it can reply with an authenticated message.

The following embodiments will mainly be demonstrated using the variation where the called authentication device contacts the server. It should be noted that, where technically possible, the server contacts called authentication device variation may be used instead.

Figure 4:
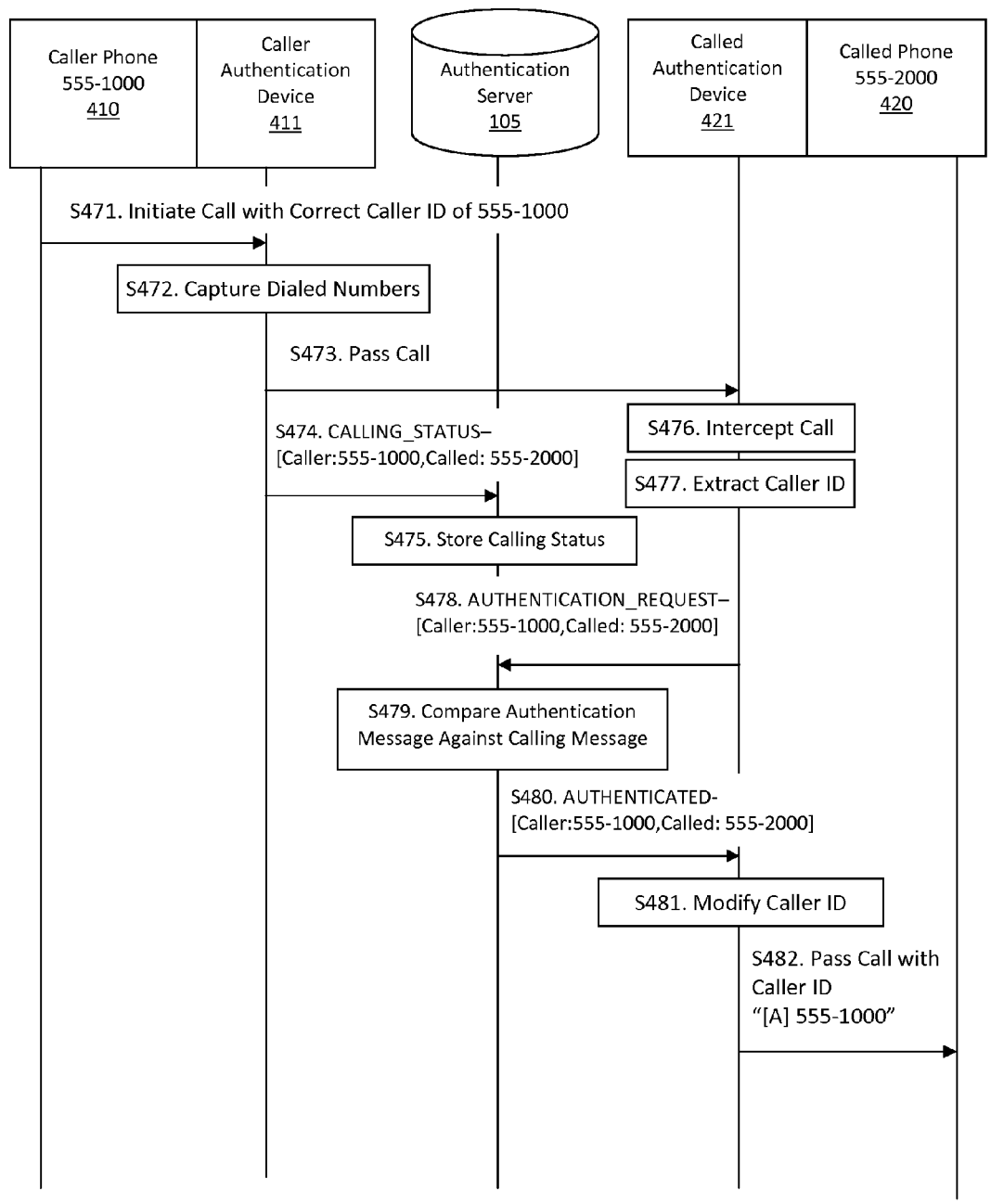
FIG. 4 represents, by way of example, the flowchart and messaging diagram the caller ID authentication device at both the caller and called party uses to authenticate caller ID.
Figure 5A:
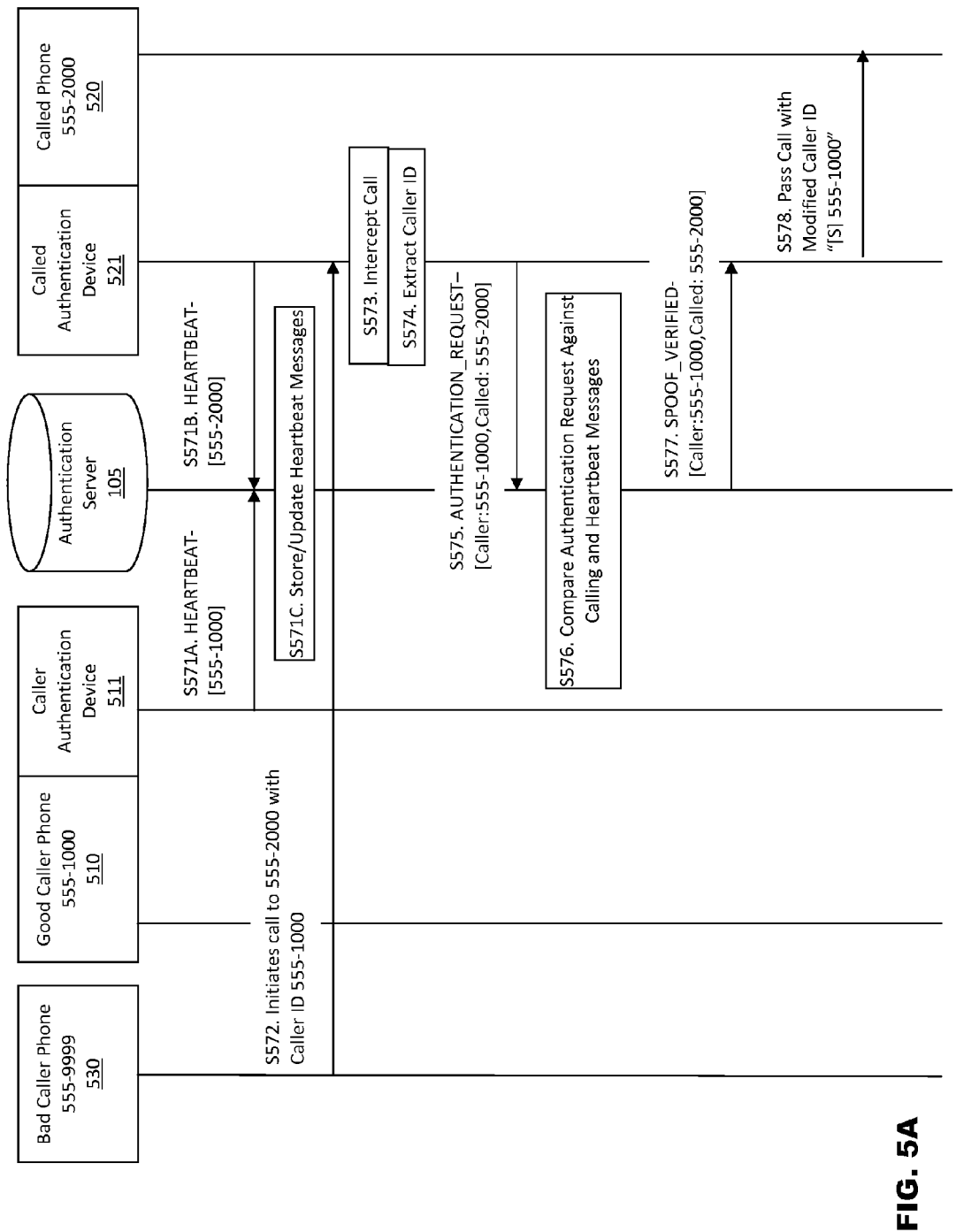
FIG. 5A represents the flowchart and messaging diagram the caller ID authentication device at both the spoofing victim and called party uses to authenticate caller ID.
Figure 5B:
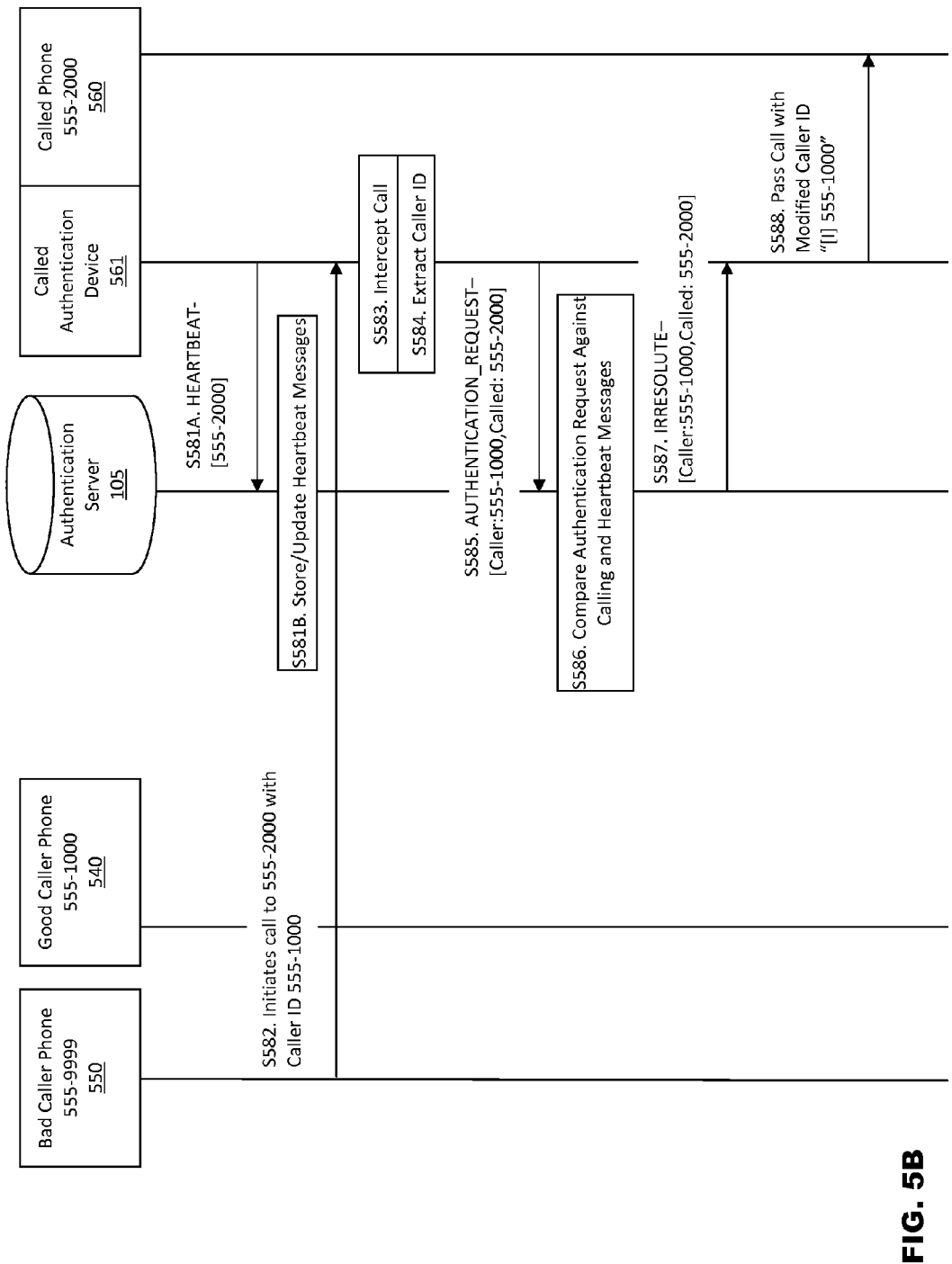
FIG. 5B represents the flowchart and message diagram the caller ID authentication device at the called party uses to determine an irresolute caller ID.

5) Caller ID Authentication Device Operational Examples (FIG. 4-FIG. 5B)

a) Caller Using a Valid Caller ID (FIG. 4)

FIG. 4 represents, by way of example, the flowchart and messaging diagram the caller ID authentication device at both the caller and called party uses to authenticate caller ID, according to one embodiment of the current invention. The caller phone 410 with the phone number 555-1000 initiates a call to the called phone with the phone number 555-2000 (Step S471, S472, and S473). As certain steps are the same in this embodiment as was explained in FIG. 3A, and Section (4-a), they will not elaborated in detail. The caller phone is using the correct caller ID and is transmitting the correct calling ID of 555-1000 to the called phone, that is the caller phone is not trying to spoof or fraudulently change its' caller ID in this example. The caller ID of the calling party sent to the called party is usually determined by the telephone provider of the calling party. Thus, the callers ID provided by the telephone provider is usually the correct caller ID. There may be instances where the caller ID can be set up, changed or modified by the calling party. As soon as the caller phone dials and initiates the call to the called phone, the authentication device of the caller 411 contacts the authentication server 105 (Step S474). The authentication device of the caller transmits to the authentication server that the caller at 555-1000 is calling 555-2000. The calling status massage sent to the authentication server can be in the form of "CALLING_STA-TUS-[Caller:555-1000, Called:555-2000]". The authentication server stores the calling status message (Step S475). The call is received at the called phone 420 and is intercepted by the authentication device of the called phone 421 before the called phone rings (Step S476). The called phone is prevented from ringing by the authentication device of the called phone. The authentication device of the called phone receives the caller ID of the caller phone, which is 555-1000 (Step S477). The authentication device then contacts the authentication server and inquires if the caller phone with the number 555-1000, which is obtained from the caller ID, is calling the called phone with the number 555-2000 (Step S478). The authentication request message sent by the authentication device to the authentication server can be in the form of "AUTHENTICATION_REQUEST-[Caller:555-1000, Called:555-2000]. The authentication server compares the calling status message against the authentication request message (Step S479). Since the caller and called fields match in the calling status message and the authentication request message, the authentication server replies back to the authentication device of the called phone in the affirmative with an authenticated reply message (Step S480). The authenticated message from the authentication server can be in the form of "AUTHENTICATED-[Caller:555-1000, Called:555-2000]". The authentication device modifies the caller ID (Step S481) and rings of the called phone (Step S482). The authentication device of the called phone transmits the updated caller ID of "[A] 555-1000" to indicate that the caller ID has indeed been authenticated. The user of the called phone can now be assured that he is indeed answering a call from 555-1000.

b) Caller Using a Spoofed Caller ID, where the Spoofed Number has an Authentication Device (FIG. 5A)

FIG. 5A represents the flowchart and messaging diagram the caller ID authentication device at both the spoofing victim and called party uses to authenticate caller ID, according to one embodiment of the current invention and by way of example.

In the previous examples outlined in Sections (4-a, 4-b and 5-a), the heartbeat message the authentication devices sent to the authentication server where not explicitly shown. The heartbeat message in those cases was not critical in explaining those embodiments. In this example, the heartbeat message that the authentication devices send to the authentication server is explicitly shown. The heartbeat message is a message sent by the authentication device to the authentication server which indicates to the server that an authentication device is installed and functioning at a particular number. The heartbeat message of the good caller 510 authentication device 511 is sent to the authentication server 105 (Step S571A). The heartbeat message in this example and embodiment only contains the phone number that the authentication device is connected to, namely 555-1000. The contents of the heartbeat message sent to the authentication server can be in the form of "HEARTBEAT-[555-1000]". The authentication server stores, or if already stored, updates its database with the heartbeat message (Step S571C). The authentication server thus contains the information that the number at 555-1000 has an authentication device installed and is functioning. Likewise, the called phone 520 authentication device 521 sends a heartbeat message (Step S571B). And the authentication server is now informed that the number at 555-2000 has an authentication device installed (Step S571C). As will be explained shortly, the heartbeat message will be critical in determining if a certain caller ID information is being spoofed. The heartbeat message may also incorporate the certification password of the authentication device, as will be elaborated later. The heartbeat message can consist of a single message which informs the server that an authentication device is installed at a particular number. Such a single message can be in the form of a certification request, as will be elaborated in later sections. The heartbeat message may also contain any other desirable supplemental information. Supplemental information may include the status of the party the authentication status is connected to. For example, the party status information transmitted to the server may be that the party is not currently calling anyone, the party is taking an incoming call, the party is not home, or similar information. The server may then use this information if need be. The heartbeat message may be time stamped by the server. The server may then determine that an authentication device is not functioning if the next heartbeat message is not received in a certain period of time relative to the previous heartbeat message.

The bad caller 530 with the phone number 555-9999 wishes to call the called party 520 at 555-2000 with a spoofed caller ID of 555-1000. The spoofed caller ID belongs to the good caller 510. The good caller 510 has the caller ID authentication device 511 installed. The bad caller initiates a call to the called party at 555-2000 with a spoofed caller ID of 555-1000 (Step S572). The called party authentication device 521 intercepts the call (Step S573) and extracts the caller ID (Step S574). The called party authentication device receives the caller ID of the bad caller as 555-1000. The authentication device contacts the authentication server and inquires if the caller phone at 555-1000 is calling the called phone at 555-2000 (Step S575). The authentication request message sent by the authentication device to the authentication server can be in the form of "AUTHENTICATE-[Caller:555-1000, Called:555-2000]". The authentication server determines through the previously received heartbeat message in Step S571A that the caller at 555-1000 has an authentication device installed (Step S576). The authentication server also determines that the authentication device has not informed the authentication server of calling the number 555-2000 through a calling status message. Thus, the authentication server determines that the call that the called phone at 555-2000 is receiving has not come from the caller 555-1000. The authentication server responds with a spoof verified message (Step S577). The message sent by the authentication server may be in the form of "SPOOF_VERIFIED-[Caller:555-1000, Called:555-2000]". The authentication device 521 receives the message, and puts the call through by modifying the caller ID with the "[S]" tag to indicate a spoofed caller ID (step S578). The user of the called phone now sees the caller ID "[S] 555-1000" is indeed a spoofed caller ID, and can decide if he wishes to pick up the phone.

It can be seen that the heartbeat message allows for the authentication server to determine a caller ID is being spoofed. The heartbeat message is used to determine that an authentication device is installed at a particular location. And in this example, that the authentication device of the good caller did not indicate it dialed the called number, thus the caller ID received by the called phone was determined fraudulent.

There could be instances where the caller authentication device has indeed sent a calling status message; however, the authentication server has not received the transmission due to a bad connection, network loss, network delay, or the like. To mitigate such situations, the authentication server may contact the caller authentication in cases where an authentication request message is received and a corresponding calling status message has not been sent by the caller authentication device. In such a case, the authentication server may contact the caller authentication device and request it to transmit a calling status message for any calls in progress. The caller authentication device may then retransmit a lost calling status message, or transmit that there are no calls currently in progress. The authentication server may then determine the authentication status of the caller ID. As is apparent to the reader, the authentication server determines that the caller has an authentication device installed through received heartbeat messages or a previously received certification request, as will be elaborated in the next section. If a heartbeat message has not been transmitted within a certain timeframe, the authentication server may also contact the device and request a retransmission of the heartbeat message. Such safeguards would ensure that a call with a legitimate caller ID is not marked as spoofed due to network or equipment malfunctions. The authentication server may also acknowledge received messages to the authentication devices, such that if the authentication device does not receive an acknowledgement from the server, the device may retransmit any messages.

The heartbeat message can be in the form of a single message that indicates to the authentication server that an authentication device is installed at a particular phone number. The authentication device can thus register with the server of its presence and would not need to transmit a heartbeat message at regular intervals. As was described, the authentication server may simply contact the caller authentication device in cases where an authentication request message is received and a corresponding calling status message has not been sent by the caller authentication device. If the authentication server contacts an authentication device for a certain phone number and does not receive a reply for certain amount of time, such as a couple of hours or a day, the server may determine that the authentication device has been removed from the phone number or is simply malfunctioning.

c) Caller Using a Spoofed Caller ID, where the Spoofed Number does not have an Authentication Device (FIG. 5B)

FIG. 5B represents the flowchart and message diagram that illustrates determining an irresolute caller ID, according to one embodiment of the current invention and by way of example. FIG. 5B is similar to the example shown in FIG. 5A, however, in this example the good caller 540 does not have an authentication device installed.

The authentication device 561 of the called phone 560 sends a heartbeat message to the authentication server 105 (Step S581A). Similar to the previous example of FIG. 5A, the heartbeat message from the called phone will not be used to determined caller ID authentication status. It is merely shown in this example to signify that there are no other heartbeat messages, such as from a caller device. The authentication server stores the received heartbeat message (Step S581B).

The bad caller 550 with the phone number 555-9999 wishes to call the called party 560 at 555-2000 with a spoofed caller ID of 555-1000. The spoofed caller ID belongs to the good caller 540. The good caller 540 does not have a caller ID authentication device installed. The bad caller initiates a call to the called party at 555-2000 with a spoofed caller ID of 555-1000 (Step S582). The called party authentication device 561 intercepts the call (Step S583). The called party authentication device receives the caller ID of the bad caller as 555-1000 (Step S584). The authentication device contacts the authentication server and inquires if the caller phone at 555-1000 is calling the called phone at 555-2000 (Step S585).

The authentication server determines that the caller at 555-1000 does not have a caller ID authentication device installed, since a heartbeat message was never received from the authentication device at that number and neither was a calling status message (Step S586). Since the caller at 555-1000 does not have an authentication device installed, it is not clear if this number is indeed being spoofed or not. This call could indeed be coming from the caller at 555-1000, or it could be coming from another caller impersonating 555-1000. The authentication server thus does not have a way of knowing. As a result, the authentication server replies with an irresolute reply (Step S587). The data format of the irresolute reply sent from the server, hereafter referred to as a irresolute message, can be in the form of "IRRESOLUTE-[Caller:555-1000, Called:555-2000]. The authentication device 561 receives the irresolute reply, and puts the call through by modifying the caller ID with the "[I]" tag to indicate a irresolute caller ID (step S588). The user of the called phone now sees the caller ID as "[I] 555-1000" is indeed an irresolute caller ID, and can decide if he wishes to pick up the phone. The user can see that the caller ID in question is has not been authenticated as a true and valid caller ID, and nor has it been determined as a spoofed caller ID.

The significance of the heartbeat message can once again be seen. The lack of a heartbeat message from the caller authentication device allows the authentication server to determine that the caller does not have an authentication device installed. Thus, the authentication server determines that the caller may in fact be calling the called party or may not be calling the called party. Therefore, the authentication server replies with an irresolute reply. The authentication device of the called party can now indicate that the caller ID is irresolute.

Summarizing Sections (4) and (5), the authentication server is able to classify an authentication request as authenticated, spoofed or irresolute. The authenticated classification requires that; the caller phone number transmitted in the calling status message be identical to the caller ID extracted by the called authentication device and transmitted in the authentication request, and the caller destination phone number extracted by the caller authentication device and transmitted in the calling status message be identical to the called authentication device phone number transmitted in the authentication request.

The spoofed classification requires that; the caller phone number transmitted in the calling status message not be identical to the caller ID extracted by the called authentication device and transmitted in the authentication request, or the caller destination phone number extracted by the caller authentication device and transmitted in the calling status message be not identical to the called authentication device phone number transmitted in the authentication request.

The spoofed classification can also occur if the caller identified by the called party is calling another party which is not the called party making the authentication request. Such that; the caller phone number transmitted in the calling status message is identical to the caller ID extracted by the called authentication device and transmitted in the authentication request, and the caller destination phone number extracted by the caller authentication device and transmitted in the calling status message is not identical to the called authentication device phone number transmitted in the authentication request.

The spoofed classification can also result from the authentication server not receiving a calling status message from the caller authentication device indicating a call to the called party, but the authentication server receiving a heartbeat message from the caller authentication device which indicates that the caller authentication device is functioning.

The irresolute classification is the result authentication server determining that the caller party does not utilize an authentication device, such that the authentication device never transmitted a heartbeat message. The irresolute classification can also result from the caller authentication device malfunctioning, and stopping the transmission of heartbeat messages. And, where the caller authentication device does not respond to requests from the authentication server to retransmit heartbeat or calling status messages.

Figure 6A:
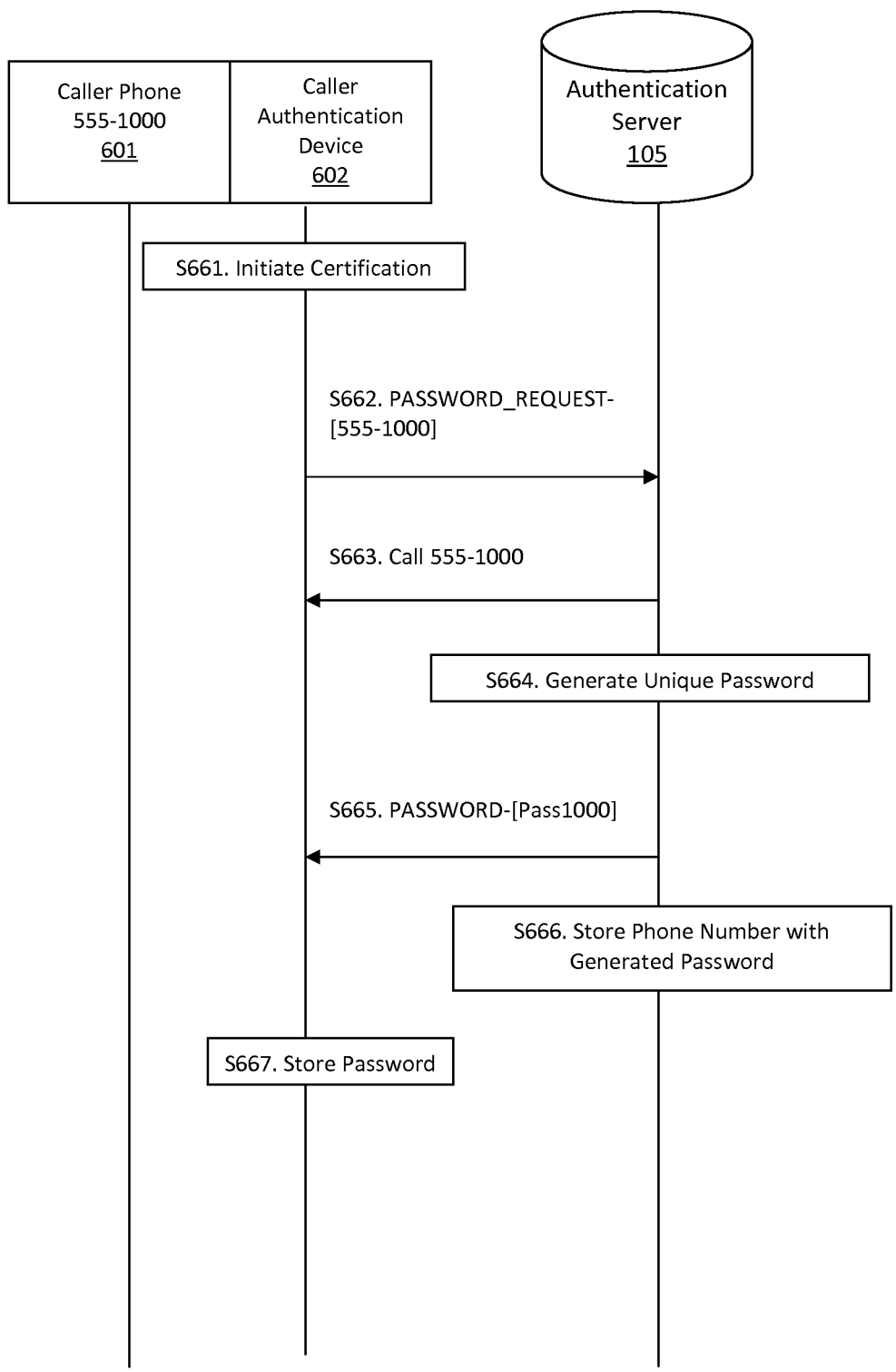
FIG. 6A shows the flowchart and message diagram for one embodiment of the invention that certifies that an authentication device is indeed installed at a particular phone number and is acting on behalf of the phone number.
Figure 6B:
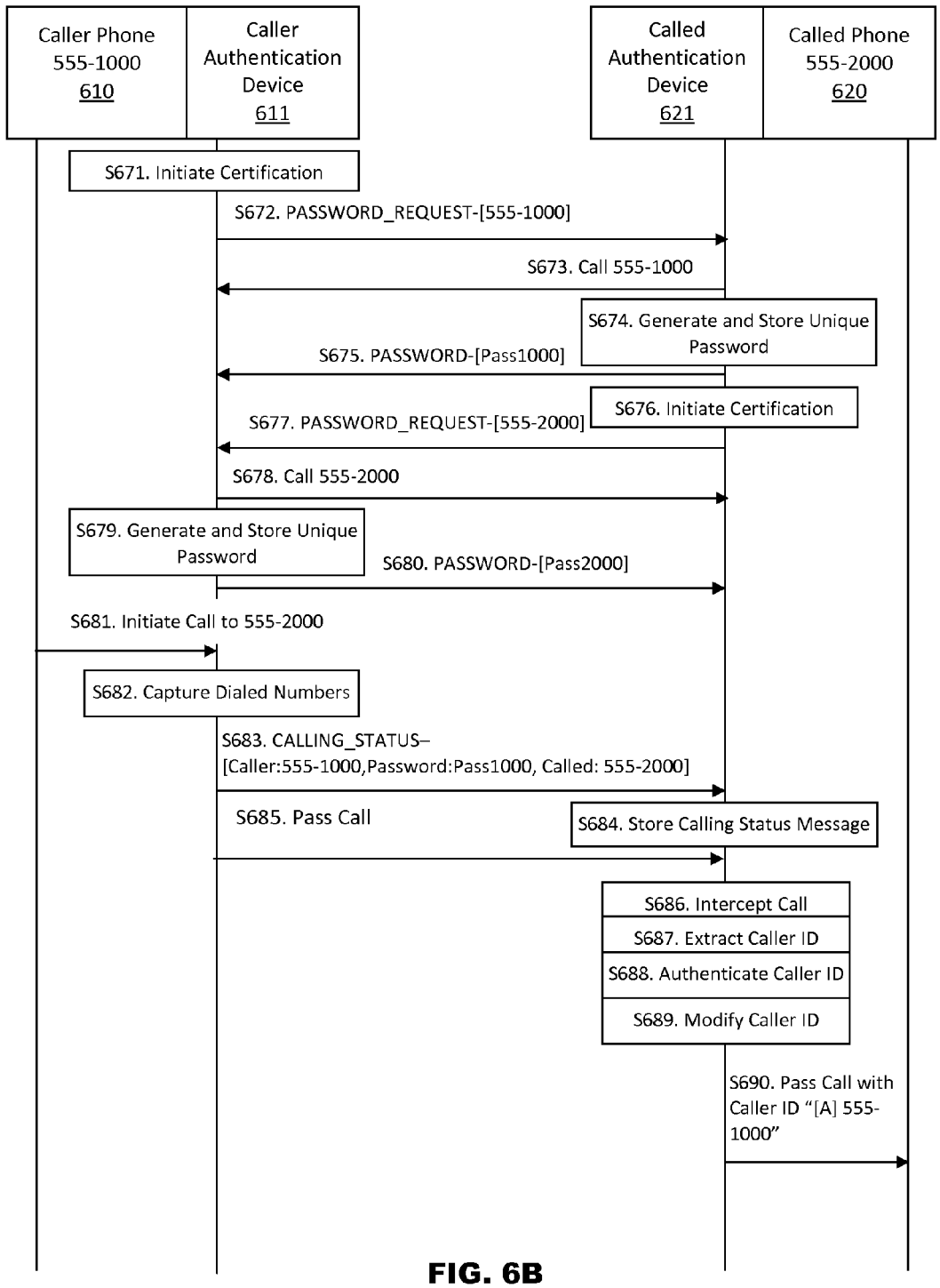
FIG. 6B represents the flowchart and messaging diagram that shows certification and caller ID authentication performed in a peer-to-peer fashion, where calling party forwards the calling status message to the called party.

6) Securing Against Authentication Device Impersonation Through Authentication Device Certification (FIG. 6A-FIG. 6B)

a) Certification Process (FIG. 6A)

One weakness in the previously shown embodiments is the fact that the authentication server relies on the messages it receives from the authentication devices as true. If an authentication device states that the phone number 555-1000 is calling 555-2000, the authentication server accepts this to be true. There could be instances where the authentication device is tampered with and the authentication device itself is modified to impersonate another authentication device installed at another phone number. Thus, there needs to be a way to certify that an authentication device is installed at a particular number.

FIG. 6A shows the flowchart and message diagram for one embodiment of the invention that certifies that an authentication device is indeed installed at a particular phone number and is acting on behalf of the phone number. When an authentication device 602 is initially installed at a phone 601 and it initiates a certification request (Step S661). The certification request may be the result of the device being newly installed on the phone line, or the certification request may be because of the previous password being lost due to a power outage. Or the certification request could be the result of the previous password being compromised. Or the certification request could be initiated at regular intervals for added security. The device contacts the authentication server 105 and transmits a request for a certification password (Step S662). Along with the password request, the authentication device sends its' own phone number. As a practical example, the request for a password transmitted to the authentication server by an authentication device connected to the phone number 555-1000 may be in the form of "PASSWORD_REQUEST-[555-1000]". Hereafter, such a transmission will be referred to as a password request message. The transmission of the message may be over any known medium, for example, over a telephone network, such as through a modem or through a data network, such as through a DSL connection. The authentication server receives the password request message and initiates a telephone call to the phone number contained in the request (Step S663). The call would be connected through the PSTN, or a similar network would be utilized in some fashion to resolve the phone number 555-1000 to the calling party. The authentication device intercepts the call without ringing the phone it is connected to and picks up. The device can blindly determine that the authentication server is calling simply by the fact that a password request message was sent recently. The device can also verify that the authentication server is calling by extracting the caller ID of the authentication server. The device can also authenticate the caller ID of the calling server, by sending an authentication request message to the server. Such safeguards would ensure that the authentication server cannot be impersonated by a third party. The authentication server generates a unique password for the authentication device (Step S664) and transmits it (Step S665) while the call is still in progress. The transmission of the password may be in the form of DTMF tones, assuming the password consists of digits 0-9. The transmission of the password may also be in the form of an authentication server generated computerized voice, where the authentication device is able to decode the spoken password. The transmission of the password can also be in the form of a modem or fax type transmission, where the authentication device possesses circuitry to decode such a transmission. As a practical example, the password transmission from the authentication server to the authentication device may be in the form of "PASSWORD-[Pass1000]". Hereafter, such a message will be referred to as a password message. The authentication server stores the generated password along with the phone number for which it was generated for (Step S666). The authentication device receives the generated password and also stores it (Step S667).

If the certification password is transmitted to a device through DTMF tones generated by the server, the certification password would consist of just digits, such as "1234". Those digits could then be transmitted back to the authentication server as the certification password over any communications medium, such as a cellular data connection, in the form of a data packet which contains those digits. The transmitted DTMF tones could represent upper and lower case characters through an encoding scheme, for instance a transmitted DTMF tone of "26" could represent "a", "27" could represent "A", "28" could represent "b", and so on. So a DTMF certification password of "262728" would be decoded "aAb". These characters can then constitute the certification password transmitted to the server. If the certification password is a fax, the fax can contain letters or characters and the authentication device can use optical character recognition to recognize the letters or characters. The certification password in the form of a fax can be the fax image itself, where the any transmissions to the server would consist of the fax image in any image format, such as GIF, TIFF, JPEG, etc, over any communication medium. The certification password transmitted through a modem interface can consist of characters, images, audio files, etc, which could be sent back to the authentication server over any communication medium and system. The certification password may be prefixed or postfixed with tags, and the authentication device may extract the certification password between such tags. The certification password may be any form of secret which is passed from the server to the device and able to be received at the device connected to the phone number. Another example of such a secret may be a unique encryption key corresponding to the device phone number. The device may then use the unique encryption key to encrypt messages sent to the server, and the server can then decrypt the communication by a corresponding unique decryption key corresponding to the device phone number.

The password generated in this embodiment was "Pass1000". That password was given only as an example, but it should be clear that such a password would likely be insufficient. The password generated by the authentication server must be unique and different, such that no two authentication devices posses the same password. Otherwise, one authentication device might impersonate the other authentication device, if it is discovered that they share the same password. Ideally, the authentication server transmits to the authentication device a password of at least a 10 character alphanumeric password, such as "UxYt6h&2!9". A 10 character alphanumeric password, including symbols, is sufficient to generate at least $4.2 \times 10^{16}$ possible password combinations. Thus, it is relatively easy to generate a unique password for each authentication device connected to $1 \times 10^{10}$ possible phone numbers and that is also resilient to brute force attacks. The length and complexity of the password within the password message may be modified as needed.

The password received by the authentication device can now serve as a certification that the device is indeed connected to and has ownership of the phone number in question. Every time the authentication device contacts authentication server, the device can transmit its assigned password to certify that it is connected to and possesses ownership over the phone number. In the previously given example, the authentication device for the phone number 555-1000 was transmitted the password "Pass1000". The authentication device can now send this password with each transmission to the authentication server to certify that the authentication device is indeed connected to the 555-1000 phone number. If the authentication device for the caller 555-1000 wishes to transmit to the authentication server that the caller is calling 555-2000, the calling status message transmitted to the authentication server can consist of "CALLING_STATUS-[Caller:555-1000, Password:Pass1000, Calling:555-2000]". The authentication server can thus look up the password transmitted to the number 555-1000, verify that it matches the previously generated and stored password "Pass1000", and certify that the transmission is originating from the authentication device connected to 555-1000. If the password "Pass1000" didn't match the password sent to the 555-1000 number, the authentication server can determine that this transmission is fraudulent and simply ignore it. If the authentication device at 555-1000 never requested to be certified, the authentication server could again simply ignore the transmission or reply back instructing the authentication device to re-certify. The reader should note that in the given calling status message example above, the certification password field is inserted after the phone number the authentication device installed at and wishes to certify. Thus, the convention of the phone number of the authentication device followed by the certification password, such as "CALLING_STATUS-[Caller:555-1000, Password:Pass1000 . . . ", will be used throughout this document. Other conventions may be used instead where required and desirable.

It should be apparent to the reader that the certification process described in this embodiment of the invention is sufficient to overcome the possibility of some person or device fraudulently impersonating another authentication device. Only the authentication device connected to a particular phone number is sent a specific password by the authentication server. This password can only be used by the authentication device to transmit messages to the authentication server where the caller number matches its' own number. The authentication device cannot pretend to be a different number since it does not poses the authentication server assigned password for that number. In order to increase security, the authentication device can request a new password daily or weekly.

The certification process can also serve as the heartbeat message. The certification request, the sending of the certification password or the acknowledgement of the receipt of the password can serve as the initial heartbeat message. Thus, once an authentication device is certified, it would serve as registration with the authentication server that the authentication device is installed at a particular phone number. The authentication device may then send heartbeat messages at regular intervals, or omit doing so. In either case, the authentication server would have a record that an authentication device is installed at a particular phone number. If the authentication device is wished to be uninstalled, the user can initiate a uninstall routine on the authentication device, where the authentication device would notify the server that it is being uninstalled. The device could send a un-installation message to the server with the number of the device and the certification password of the device. The server would then delete the stored certification password and all heartbeat messages. Thus, the server would be able to determine that the authentication device is no longer installed at that particular number for future authentication tasks.

Where applicable and unless otherwise stated for subsequent embodiments, the caller authentication device will be assumed to have received the certification password "Pass1000", and the called authentication device will be assumed to have received the certification password "Pass2000" from the authentication server.

b) Caller ID Authentication and Certification without an Authentication Server (FIG. 6B)

There may be instances where the calling and the called party wish to authenticate caller ID, but there isn't access to an authentication server or the authentication server is not present. In such cases, the caller ID authentication can be performed between the two parties in one embodiment of the invention. Such an embodiment can be considered a peer-to-peer method of certification and caller ID authentication. The caller authentication device would transmit a calling status message to the called party over a data network to indicate that the caller is calling the called party. The called party authentication device would receive the message and compare it to the received caller ID information of the incoming call. And thus the called party authentication device can notify to the called customer the caller ID authentication status. The certification process would also be performed between the two parties, without the need for an authentication server. The first party authentication device would contact the second party authentication device and transmit a certification password request. The second party authentication device would call the first party and transmit a certification password. The second party authentication device would then send a request for a certification password to first party authentication device. The first party authentication device would then call the second party and send a certification password. Thus, anytime the first party authentication device transmits to the second party authentication device, it transmits the received certification password from the second party. The second party can thus verify the first party is at the particular phone number. And anytime the second party authentication device contacts the first party device, it can send the received certification password. Clearly, the process of certification and caller ID authentication may take place between more than solely 2 parties. The caller authentication device may have received a certification password from 5 parties ahead of time, for example. Anytime the caller initiates a call to any of the 5 parties, the caller authentication device may transmit the certification password received from the respective party within the calling status message. Thus numerous users may authenticate caller ID's amongst themselves.

Such an embodiment is shown in FIG. 6B. FIG. 6B represents the flowchart and messaging diagram that shows certification and caller ID authentication performed in a peer-to-peer fashion, where calling party forwards the calling status message to the called party. Steps S671 through S680 of FIG. 6B illustrates the self certification process, and steps S681 through S690 illustrate the caller ID authentication process. Similar to the certification processes described previously, the self certification process would be performed once or at regular intervals. The certification process would take place before a call is placed. As was previously demonstrated, the caller ID authentication process requires that only the caller authentication device be certified. The certification of the called authentication device is not critical for caller ID authentication, but will be shown nonetheless. The caller phone authentication device 611 initiates a certification request (Step S671) and contacts the called phone authentication device 621 and requests a certification password (Step S672). The caller device can contact the called device through any transmission medium, such as an internet connection. The caller authentication device may look up the called authentication device contact address through a DNS type system set up for the purpose of authentication device IP address resolution. For example, the caller device can perform a DNS type lookup for the called phone number of 555-2000. The DNS type server would return the IP address for the authentication device 621 of the called phone 620. Such a DNS type lookup system could also be implemented with regards to the embodiment described in Section (4-b). Once the caller device contacts the called device it sends a password request message. As was previously specified, the password request message contains the phone number of the device requesting a password; in this case the phone number is 555-1000. The called authentication device places a call to the caller phone (Step S673). The caller authentication device intercepts the call and picks up. The called device generates a unique password (Step S674) and transmits the password message (Step S675). The called device stores the unique password generated for the caller phone number along with the phone number it was generated for. And the caller device stores the received password for the specific called phone number (not explicitly shown). Thus, when the caller authentication device wishes to send messages, such as a calling status message, to the called authentication device, the caller device can look up the certification password it received from the called device and transmit the certification password with the calling status message. And when the called device receives the calling status message with the accompanying password, it can compare the caller password to the one that it generated during the certification process. In this embodiment, the certification password that the called authentication device generated for the caller device is "Pass1000". Thus, anytime the caller authentication device wishes to transmit a message to the called authentication device, it must send to password "Pass1000" to certify that the caller authentication device is indeed installed at the 555-1000 phone number.

The called device then begins the process of certification with the caller device (Step S676). It should be apparent that the certification process of each device may take place in any order, such that steps S676-S680 could have taken place before steps S671-S675. The called authentication device 621 initiates the certification process and contacts the caller authentication device for the purpose of certification and sends password request message (Step S677). The password request message contains the phone number the authentication device is connected to. The caller device then calls the called phone (Step S678), generates a unique password (Step S679) and transmits the uniquely generated password (Step S680). Thus, both the caller and the called device are certified against each other. If the caller device wishes to contact the called device, the caller device can send the certification password to prove that it is residing at the stated phone number.

Once the caller device is certified, the caller phone 610 may now place a call to the called phone 620. The caller phone initiates a call to the called phone (Step S681). The authentication device captures the dialed numbers (Step S682). However, in this embodiment, the authentication device of the caller phone is delaying the placing of the call. As was previously elaborated, such a delay allows more time for the caller ID authentication to take place. Thus, the authentication device of the caller phone extracts the called phone number and transmits a calling status message to the called phone authentication device (Step S683). The calling status message sent to the called phone device includes the phone number of the caller, the called number, and the caller certification password as proof the device is connected to the caller phone. The caller status message may in the form of "CALLING_STATUS-[Caller:555-1000,Password: Pass1000, Called: 555-2000]". After the caller device transmits the calling status message (Step S683), the call is placed to the called phone (Step S685). The called phone authentication device receives the calling status message and stores it (Step S684). Since the calling status message was transmitted before the call was placed on the telephone network by the caller authentication device, the likelihood of the called party receiving the calling status message before receiving the call is very high. The called party receives the call, which is intercepted by the called party authentication device (Step S686). Since the calling status message was received, the called authentication device is already expecting a call, and allows the call to ring. The called authentication device extracts the caller ID after the first ring (Step S687). The device begins the process authenticating the caller ID (Step S688). First, the certification password received within the calling status message is compared to the certification password transmitted to the caller phone during the certification process. If it is determined that the certification password belongs to the caller device as indicated in the calling status message, the message is determined to be originating from the caller authentication device. The device compares the caller ID of the caller to the caller field of the calling status message received in Step S683. If they match the caller ID is authenticated. The caller ID is modified (Step S689) and the caller ID is transmitted to the called phone before the second ring (Step S690) to indicate the caller ID authentication status to the called customer.

Figure 6C:
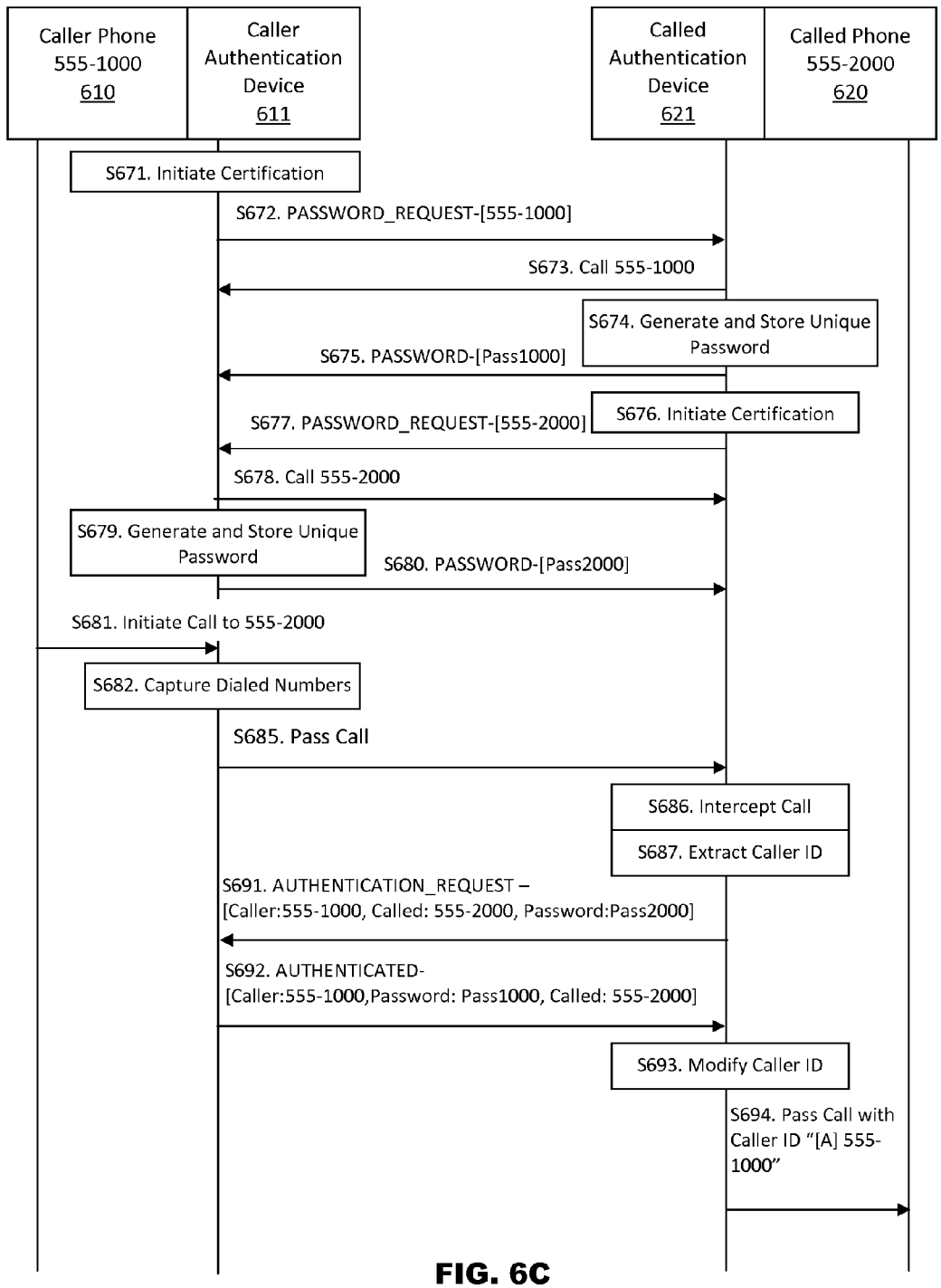
FIG. 6C represents the flowchart and messaging diagram that shows certification and caller ID authentication performed in a peer-to-peer fashion, where called party requests authentication status from the calling party.

If a call is received by the called authentication device, and the called authentication device was expecting a calling status message but did not receive one, the called authentication device may contact the caller authentication device. Such a scenario could be the result of a caller with a spoofed caller ID. In such a scenario, the called authentication device would contact the caller authentication device and request authentication. If the caller hadn't called the called party then it can reply with a spoof verified message. If the caller had called the called party, then it can reply with an authenticated message.

c) Caller ID Authentication and Certification without an Authentication Server—Pull Variation (FIG. 6C)

FIG. 6C shows a variation of the embodiment presented in Section (6-b). In Section (6-b), the calling status message was transmitted by the caller authentication device to the called authentication device. However, there is no requirement for the caller authentication device to transmit a calling status message. The caller device may simply pass the call to the telephone network. Once the called device receives the call, the called device may contact the caller authentication device to authenticate that the caller is calling the called party. In other words, the embodiment presented in Section (6-b) can be considered as peer-to-peer certification and authentication where the authentication status is pushed by the caller authentication device. Whereas, the following embodiment can be considered as peer-to-peer certification and authentication where the authentication status is pulled by the called authentication device.

FIG. 6C represents the flowchart and messaging diagram that shows certification and caller ID authentication performed in a peer-to-peer fashion, where called party requests authentication status from the calling party. In FIG. 6C, a caller 610 with the phone number 555-1000 using an authentication device 611 wishes to call the called party at 620 with a phone number 555-2000 with an authentication device 621. Since in this embodiment, an authentication server is not available, the parties self-certify and self-authenticate. In FIG. 6C, the step S671 through step S682 is executed identically as was explained in FIG. 6B. In FIG. 6C, Step S683 and Step S684 of FIG. 6B is not executed. The caller authentication device does not transmit a calling status message. The caller device merely passes the call to the telephone network (Step S685). The called authentication device intercepts the call (Step S686). The called authentication device may delay ringing of the called phone to provide a buffer for the transmission and reception of messages required for caller ID authentication. The called authentication device extracts the caller ID of the caller (Step S687). Since a calling status message was not received and an authentication server is not available, the called authentication device contacts the caller authentication device. The called device may look up the caller authentication device network address through a DNS type system. The called authentication device transmits an authentication request to the caller authentication device (Step S691). The message may be in the format of "AUTHENTICATION_REQUEST-[Caller:555-1000, Called:555-2000, Password:Pass2000]". The authentication request message requests authentication that the caller at the number 555-1000 has called the party at 555-2000. The caller number was obtained from the extracted caller ID, and the called number is the number of the called party. The password "Pass2000" was the password transmitted by the caller to the called party. It should be clear that in this case, transmission of the password is not critical for the purpose of caller ID authentication since the called device is merely inquiring if the caller device called it. The caller device does not necessarily need to certify the called device. The caller device may simply reply with an answer without certification. One motivation for including the certification password within the authentication request could be to reduce the chance of a rouge device sending random authentication requests and trying to obtain information from caller authentication devices. The transmission of the certification password may also protect against a compromise of DNS system, where the DNS resolves the address of the caller authentication device to an illegitimate party device. Once the caller authentication device receives the authentication request, the device compares the called number of the authentication request with the numbers captured from the caller phone in Step S682. If they match, it replies with an authenticated message (Step S692). If the caller authentication device was not calling the called party, then the transmitted message would have been a spoof verified message. The format of the authenticated message may be in the form of "AUTHENTICATED-[Caller:555-1000,Password: Pass1000, Called: 555-2000]". The message authenticates that the caller with the number 555-1000 is calling the called party at 555-2000. As was previously discussed, the transmitted certification password is not critical in this embodiment, but might be desirable for numerous reasons. Once the called device receives the authenticated message, the device prepares the modified caller ID indicating the authentication status (Step S693). The device rings the customer phone and transmits the modified caller ID (Step S694).

With regards to the embodiments shown in explained in Sections (6-b) and (6-c), it should be noted that to some extent, role of the authentication server is being assumed by the caller authentication device. In the embodiment explained in Section (6-b), the caller authentication device is assuming the role of the authentication server by transmitting calling status messages to the called device. In the embodiment explained in Section (6-c), the caller authentication device is assuming the role of the authentication server by receiving an authentication request and transmitting an authentication reply.

d) Alternate Transmission Methods of the Certification Password i) Transmitting the Certification Password Through Caller ID In Sections (6-a to 6-c), the certification process consisted of a phone call from the certifying entity to the entity wishing to be certified. Such as the certifying device or server placing a phone call to the device wishing to be certified, and transmitting the certification password through the telephone network while the call is in progress by utilizing DTMF tones, computer generated voice, modem or fax transmission, and the like. The device wishing to be certified thus used the received password and transmitted it to the other entity in all communications, through any available transmission means, such as internet, cellular, Wi-Fi and the like, to prove to the other entity the ownership of the phone number in question.

One issue with such a system is the load that would be placed on the telephone network with a large number of users. For instance, if there are millions of authentication devices wishing to be certified, the authentication server would have to call each number, wait for the other entity to pick up the phone, transmit the certification password, hang up, and call the next number. Such a system might be impractical for several reasons, especially if the certification process is performed at regular intervals, such as every night or week, as was previously discussed. The issue becomes even more concerning if the authentication device is in the form of software running on a cell phone with a prepaid plan. Thus, each call from the authentication server to the customer's prepaid cell phone would result in using up a minute of customers air time or maybe more.

To mitigate such issues, instead of transmitting the certification password through the phone call, the certification password can be transmitted through the caller ID system itself. Thus, such a system would not require the authentication device to pick up the phone and wait as the authentication server transmits the password during the call. And since the call is not picked up, the customers would not be deducted minutes from their cell phone plans. Such a system would also be quicker in terms of transmitting passwords.

To transmit the certification password through the caller ID system, the certifying entity would call the entity wishing to be certified, such as the authentication server calling the authentication device, or one authentication device calling another in a peer-to-peer system. However, the certifying entity, such as the authentication server, would modify the caller ID of the call to include the certification password within the caller ID. For instance, if the authentication server wished to transmit the certification password "Password1000" to the authentication device, the password can be placed in the name field of the caller ID. Thus, the caller ID of the call from the authentication server to the authentication device can include the phone number of the server followed by the certification password, as an example the caller ID might be "1-800-555-1000 Password1000". This caller ID would indicate that the calling number is 1-800-555-1000, which would be the number of the authentication server, and the certification password would be "Password1000". Alternatively, the authentication server may omit sending the calling number within the caller ID, and simply transmit the certification password within the calling number field. As an example the caller ID of a call from the authentication server might be "2249850325231". Thus, the certification password for the device would be the numbers in the calling number field of the caller ID, which is "2249850325231". The password within the number field, or name field, of the caller ID can be prefixed or post-fixed with special characters, such as the '#' characters, for example "#2249850325231", "2249850325231#", or "#2249850325231#". Such characters would indicate that a password is being transmitted from the authentication server. Alternatively, the password can be prefixed or post-fixed with special digit sequences, such as the sequence '555', for example "5552249850325231", "2249850325231555", or "5552249850325231555". Since the certification password is contained within the caller ID, the authentication device can simply receive and store the certification password without picking up the phone.

Summarizing such a certification procedure, the authentication device requests a certification password from the authentication server by transmitting a password request message. The message may be transmitted over any medium, such as internet, cellular, or any other communications protocol. The password request message would include, at least, the phone number of the authentication device. The authentication server would receive the password request message. The authentication server would generate a unique password for the authentication device. The authentication server would then place a call to the authentication device over the telephone network. The authentication server would place the call with a modified caller ID which would include the certification password within the caller ID. The certification password could be in the name field of the caller ID, or the certification password can be placed in the number field of the caller ID. The authentication device then receives the call from the authentication server, but does not pick up the call. The authentication device can blindly determine that the authentication server is calling since the password request message was just sent. The authentication device can also determine the server is calling through the caller ID of the call, if the caller ID still contains the telephone number of the server, and is not replaced by the certification password. The authentication device may additionally determine that the server is calling with a certification password by checking for special character or digit prefixes or postfixes within the caller ID. The authentication device extracts the caller ID of the call and stores the password contained within the caller ID. The placement of the password within the caller ID, such as within the telephone number field or name field, can be predetermined or agreed upon. The predetermination can be preprogrammed into the system. Alternatively, the authentication server and authentication device can negotiate the placement when the authentication device sends the password request message. For instance, the password request message from the authentication device to the authentication server can indicate that the certification password should be placed in the telephone number field of the caller ID. Once the authentication device stores the certification password, it can merely wait for the authentication server to end the call. The authentication server can end the call after a predetermined number of rings. Alternatively, the authentication device can transmit to the server, over any available transmission means such as internet, cellular, Wi-Fi, or the like, that it has received the password and that it can end the call, at which point the server would end the call. The authentication device can transmit the received password in all future communications to prove to the server that the authentication device is actually installed and is connected to the telephone number in question. The server can then compare the telephone number of the authentication device transmitted within the message and the corresponding certification password to determine that the authentication device is indeed connected to and has ownership of such number.

The certification password may also be transmitted through multiple calls from the authentication server. Such that the first calls caller ID can constitute the first half of the certification password, and the second calls caller ID can constitute the second half of the certification password.

ii) Other Certification Methods

Another possible method of transmitting the certification password could be performed through a text message. If the authentication device is installed on a cellular phone, the authentication server can transmit the certification password as a text message to the authentication device phone number. Such text messaging protocols may include but not be limited to Short Message Service (SMS), Multimedia Messaging Service (MMS), and Enhanced Messaging Service (EMS). The authentication device can then receive and extract the password from the text message. If the authentication device cannot extract a certification password, such as from an SMS or a computerized voice, due to hardware or software limitations, the user may retrieve the password and manually enter it into the authentication device.

In addition to the certification methods discussed, the certification password may also consist of a password transmitted by postal mail to the customer. The customer may then enter the received password into the authentication device. Thus, the authentication device may use the postal password as proof of the mailing address of the customer. The postal password may also be used in conjunction with the certification password sent by the authentication server to the customer's phone, through the server calling or caller ID methods as previously discussed, Such combinations of postal and telephone certification passwords would serve as proof that the authentication device has ownership of both the customer's phone number and proof of a mailing address. Instances of where such combinations of certification passwords might be desirable would consist of sensitive establishments using an authentication device. For example, it might be desirable for a bank using an authentication device for their toll free customer service telephone number to be certified by both a postal certification password and a certification password transmitted by phone. Thus, an attacker would need both passwords to impersonate the bank. Certification attacks will be discussed in more depth in the next section. Similar to the phone or caller ID transmitted certification passwords, postal certification passwords may be sent at regular intervals. The authentication device may also contact the authentication server to request a postal certification password. The server may then send the request to the appropriate personnel or automated postal mailing system for processing.

Although the preferred embodiment of certification is where the authentication device contacts the server through a data connection to request certification and the authentication server contacts the device through a PSTN to transmit the password, other communications mediums are possible. The certification request made by the authentication device may take place over the telephone network. The device may dial a number which belongs to the authentication server. The server may then pick up the call and receive the request for certification by the device. The device may for instance transmit the appropriate DTMF tones to request a certification password and transmit the phone number of the device also through DTMF tones. The authentication server may then contact the device at the phone number. An advantage to such a system would be where the authentication server may employ more sophisticated forms of caller ID authentication with respect to the call received from the authentication device. Such forms of caller ID authentication may be those which are described in U.S. Pat. No. 8,238,532 and U.S. Patent Application US 2013/0109358. Such caller ID authentication methods employed by the authentication server would add another layer of security and safeguards to the certification process, since the caller ID of the authentication device would be authenticated by the server before sending a certification password back to the authentication device phone number. The authentication server may also require that the caller ID of the device, which is determined to be authentic through such sophisticated means, match the telephone number transmitted within the certification request.

iii) Passive Certification

The certification methods thus described were all examples of active certification. Active certification is defined as the authentication device wishing to be certified receiving the certification password from the certifying device or server.

The concept of passive certification will now be introduced. In a passive certification system, the authentication device does not request or receive a certification password from any entity. Thus, the authentication device does not contact the server and request a certification password. Passive certification still utilizes the concept of transmitting the certification password as proof that the authentication device is connected to the phone number in question. However, the certification password is generated passively.

The passive certification password is generated as a result of the authentication device receiving phone calls which are determined as having authenticated caller ID's. If an authentication device receives a call with an authentic caller ID, it implies that the calling party is using an authentication device and the caller ID matches the calling party telephone number. An authentic caller ID also implies that an authentication server has received a calling status message from the calling authentication device. Thus, the authentication server knows all the calls placed from callers with authentication devices to other called parties, including parties with authentication devices. If the authentication server were to record and store all calls made by all authentication devices, then an authentication device wishing to be certified can send information about the calls it received from callers with authentication devices and use it in place of an active certification password. Instead of using an active certification password to prove that an authentication device is connected to a particular phone number, the authentication device can construct a passive certification password from calling parties caller ID's. For example, an authentication device can construct a passive certification password by taking last digit of the last three received calls with authentic caller ID's. For instance, if the last three authentic received caller ID's were "555-1000", "555-1021", and "555-4028", the authentication device can construct a passive certification password by chaining the last digits together, such as "018". Or, the passive certification password can be the chaining of the last two digits of the last three calls, such as "002128", or it can be the sum of the last digits of the last three calls, such as "9". Or, the passive certification can simply be the chained caller ID's of the last three calls, such as "5551000555510215554028". As can be seen, the construction of the passive certification password may be done in several ways, which can be dependent on several factors such as the last digits of a telephone number of received calls, or sums of digits, etc. However, the passive certification is constructed from the received caller ID's which have been determined to be authentic. The construction of the passive certification password can utilize any aspect of the received caller ID's, including, but not limited to; the digits of the telephone number of caller ID, the characters of the name field of the caller ID, and the time the caller ID was received. The authentication device of the called party can transmit additional aspects of the received caller ID, such as name of the caller, time of the call, or any information contained within the caller ID, for the purpose of having such information available to the authentication server for constructing a new password. Transmission of such information would preferably be done within the authentication request message. The construction of the passive certification password can be preprogrammed into the authentication devices. Or the authentication devices and the authentication server can negotiate a construction on their own. The authentication server may for example instruct the authentication devices to construct the passive certification password as the multiplication product of the last digit of the last 4 calls with authentic caller ID's. The authentication device can then use that construction until instructed otherwise. After the passive certification password is constructed, it can be transmitted to the server during each message.

The only restriction is for the passive certification password to be constructed from caller ID's of callers with authentication devices. Such calls would consist of authenticated caller ID's. Caller ID's which are determined to be spoofed or irresolute would not be used to construct the passive certification password. The reasoning behind this is that the authentication server does not receive a calling status message from spoofed or irresolute calls since those callers are not using an authentication device.

As can be seen, the passive certification password can serve as proof that the authentication device resides at a certain telephone number since only the authentication device at that telephone number would have knowledge of the caller ID's received by that number. The authentication server can then compare the passive certification password against the stored calling status messages, determine that the construction of the passive certification password matches the caller ID's received by the authentication device, and determine that the passive certification password is correct. The passive certification password also is more secure, since it changes every time the authentication device receives a call with an authentic caller ID. The passive certification password also does not need to be renewed at regular intervals because of this fact.

Passive certification can also be combined with active certification. For example, sensitive entities, such as businesses, banks, and so on, can be actively certified. And non-sensitive entities can be passively certified. The active certification of the certain entities would also make the system more robust. If active certified entities called individuals who are using passive certification, the passive certification can be more trusted, since the received caller ID's are of entities with active certification.

Alternatively, an authentication device during initial installation can be actively certified and then switch over to passive certification after a predetermined time or after receiving a predetermined number of authentic caller ID's. Or the authentication device can be actively certified at initial installation and transmit the active certification password alongside the passive certification password. Or the authentication device can be actively certified at initial installation and at regular intervals and transmit the active certification password alongside the passive certification password.

Summarizing the process of passive certification by way of example, an authentication device at the phone number "555-7000" is initially active certified at installation. The active certification password sent by the authentication server is "Password1000". The passive certification password construction is predetermined to be the last 2 digits of the last two received calls with authentic caller ID's. The full certification password is predetermined as the chained active certification password and the passive certification password. Thus, at initial installation, the full certification password for the authentication device is "Password1000", since the authentication device has not received any calls. If the authentication device received a call where the caller was utilizing an authentication device, that caller ID would be authenticated. As an example, the authentic caller ID of the call is given as "555-1027". The certification password would now be "Password100027", which is the active certification password and the chained passive certification password of last two digits of the last two calls. Since the device only received 1 call, it only chains that caller ID's last two digits. If the authentication device transmitted this certification password along with its phone number "555-7000" to the authentication server, such as during a calling status message, the server would first check that the active certification password matches the password sent to the authentication device at the number "555-7000". The authentication server would then check if the passive certification password matches the calling status messages on record. That is, did a caller with a caller ID ending in "27" call the number "555-7000". If so, the certification password is determined to be correct. The server may thus accept any messages from the authentication device, and the server is assured that the authentication device is connected to the phone number "555-7000". Since the certification password is the product of active certification, which was delivered by calling the "555-7000" number, and passive certification, which is the result of the "555-7000" received caller ID's. Thereafter, if the authentication device receives another call with an authentic caller ID of "555-1073", then the full certification password becomes "Password10002773". If the authentication device receives another call with an authentic caller ID of "555-1077", then the full certification password becomes "Password10007377". And so on.

Although not discussed in detail, the passive certification password may also be constructed from the dialed numbers. Since the authentication device is already capturing dialed numbers by the customer, these may be used in conjunction with received caller ID's to construct the passive certification password. However, since the certification password is used to certify that an authentication device is installed at a particular telephone number, the dialed numbers would not ideally be used for such a certification.

iv) Automatic Password Revocation

In another embodiment of the invention, the concept of passive certification is further extended to create a new password on each transmission of a message to the authentication server and revoke the old password.

The authentication device of the caller can construct a new password by incorporating the called number which is contained in the calling status message sent to the authentication server. The construction of the password would be performed according to a predetermined algorithm that incorporates the called number information within the current password. Such construction algorithms of the new password would be similar to the previous examples given, such as summing the last two digits of the called number to the current password. For example if the current password is "1234" and the caller authentication device transmitted to the server a calling status message with the called number "545-0055", the number "55" can be summed with the current password "1234" and the new password would be "1289". The password could only consist of just the last 4 digits of the summation to prevent the password becoming too large. Another example can be where the certification password has two fields, first field being the active certification password and the second field the automatic revocation field, such as "1234:56" and the last two digits of the called party are only added to the last field, such that the new password is "1234:11", and the carry is disregarded. In case of an attack, the two fields would allow for the authentication server to verify that an authentication device is in possession of the active certification password before determining that the revocation field is incorrect and revoking the entire certification password. The authentication server can then use the same predetermined algorithm to construct the new password for the caller authentication device. Similarly, the called authentication device can use the "Caller" number transmitted within an authentication request to construct a new certification password each time it contacts the server. And the authentication server can construct a new certification password for the called authentication device. In automatic password revocation scheme, there would be no requirement that the caller ID of the caller be determined by the server as authentic, as would be performed through an authentication request and authenticated reply.

An advantage such password revocation is that if certification password of a victim is stolen, as soon as the attacker with an authentication device dials a number and sends a calling status message to authenticate a call with the victim's spoofed caller ID, the password of the victim is changed and the old password is revoked. Thus, any call made or received by the victim would result in the authentication server receiving the old password. The authentication server can immediately determine the password has been compromised and instruct the victim authentication device to recertify with a password request. Such an attack can further be mitigated by the authentication devices transmitting heartbeat messages at regular intervals which contain a certification password. The authentication server can then immediately discover if a password is stolen when a heartbeat contains an old password of a victim which is changed by an attacker making a call. Similarly, as soon as the attacker receives a call where the authentication device of the attacker sends an authentication request message, the password of the victim is changed and the old password is revoked.

v) Common-Secret Certification

Another method of certification can utilize a common secret between the user of the authentication device and the server. For instance, if the authentication server belongs to a bank and is certifying calls made from smartphones using the bank software which employs the authentication device, then a common secret certification may be used. An example of a common secret might consist of the customer's credit card number. The customer may enter the credit card number into the authentication device. When a call is made from the customer to the bank, the device may transmit a calling status message with the customer's phone number, and the credit card number as the certification password. The server would then look up the phone number, determine the customer name and verify the credit card number within the certification password field belongs to the customer. The server can then authenticate authentication request received from the bank call center, for example.

A common secret could consist of various secrets that are known between the authentication server and the user of the authentication device, where the server can match the common secret to a specific customer, but would be hard to obtain by an attacker. Such common secrets may include but is not limited to; social security number, birthday, credit card number, credit card PIN, postal mailing address, user biometric information, phone IMEI number, device MAC address, last purchase price made to a credit card, bank account balance, and last statement balance. A common secret would thus identify the customer, but would not necessarily verify the caller ID since the secret is not sent to the device phone number. Therefore, a common secret password may be combined with active or passive passwords to construct the certification password, and both authenticate the customer and the caller ID of the call.

e) Attacks Against Active Certification

This section will explore attacks against the active certification process. Attacks against the passive certification process are very difficult since it would involve tapping into the telephone line of the authentication device and recording each caller ID received. And if an attacker can tap into a line, then the line is already compromised and the attacker can make any calls from that line and achieve impersonation.

The eventual objective of an attack would be to impersonate the caller ID of another customer. For instance, an attacker would want to be able to impersonate a banking institution and use the caller ID of the bank and call customers in the hopes of extracting sensitive banking information. If the bank and the customer both have authentication devices installed, then the attacker can never spoof its caller ID to match the banks caller ID. The reasoning behind this was explained in Section (5-b). And through the process of certification, attacks where the authentication device is hacked to transmit fraudulent messages to the server are eliminated.

Thus, the attacker might resort to certain avenues of attacking the authentication and certification system. Assuming the attacker wishes to impersonate a bank, the first option is for attacker can take an authentication device, and plug it into the banks telephone line. As was explained previously, the authentication device can be in the form of a hardware device which plugs into the phone line, or integrated into landline phones. The authentication device can then contact the authentication server and request a certification password, if the bank's authentication device is actively certified. The server can then call the bank and the attacker authentication device can answer the call and receive the password, or the device can retrieve the password through the caller ID, as was explained previously. The attacker can then remove the device, move to a new location, and call from his new location. This kind of attack would be equivalent to other forms of attack which obtains a certification password from the authentication server. Since the authentication device has the proper certification password, the server will assume that all messages sent from the device as valid and the device is still connected to the banks phone line. And if the attacker can spoof its caller ID to be the banks caller ID then his calls will be authenticated. Each time the attacker makes a call, his authentication device will contact the server and transmit a calling status message with the number of the bank, the certification password of the banks phone number, and the called number. The called party authentication device would then receive the call with the spoofed caller ID to match the bank's telephone number. The called authentication device would contact the server and send an authentication request with the spoofed caller ID of the bank and the called party telephone number. Since the server did receive a matching calling status message with the correct certification password, the server replies that the caller ID is authentic.

There are two safety mechanisms that mitigate this attack. The first is where the bank has its own authentication device installed. If the bank has its own authentication device installed, the process of certification will most likely fail. When the attacker's authentication device contacts the server for a certification password, the server calls the banks telephone number. If the certification password is to be transmitted during the call, then there is a chance that the banks authentication device might pick up the phone before the attackers device, since the caller ID of the call would be the telephone number of the authentication server. If the certification password is to be transmitted within the caller ID, then the bank's authentication device will notice that a certification password being transmitted within the caller ID. The bank's authentication device can notice that a certification password is being transmitted through either the authentication server's telephone number within the caller ID or through the special character or number sequences within the caller ID. If the bank's authentication device does notice a certification password within the caller ID, it can contact the authentication server and indicate that it did not request a certification password. Similarly, if the authentication device of the bank picked up the call from the authentication server and the server began to transmit a certification password, it can also indicate that it did not request a certification password. At which point, the authentication server would be alerted to an attack to the bank's telephone system and can alert the proper personnel. At the same time, the server may invalidate all certification passwords for the bank. In addition, the server may suspend all caller ID authentications for the banks telephone number. The appropriate personnel can then determine the nature of the attack, and once the attack determined to be eliminated, the authentication device of the bank can request a new certification password, and caller ID authentication may resume.

In the unlikely scenario that the attacker is able to obtain the certification password for the bank by plugging in an authentication device, the attack is mitigated in two ways. The first way is through the fact that the bank's device has the old certification password, while the attacker's device has the new certification password. Thus, as soon as the bank's device sends a calling status message, it's going to present the old certification password. At which point the authentication server is going to determine that even though a new certification password was requested and received, the bank is still using the old certification password. At which point, the authentication server would be alerted to an attack to the bank's telephone system and can alert the proper personnel. At the same time, the server may invalidate all certification passwords for the bank. In addition, the server may suspend all caller ID authentications for the banks telephone number. The appropriate personnel can then determine the nature of the attack, and once the attack determined to be eliminated, the authentication device of the bank can request a new certification password, and caller ID authentication may resume. The second way that the attack is mitigated is through the regular updates of the certification password. If certification passwords are updated on a daily basis, then the attacker would have to return to the bank every day, otherwise the certification password would expire and the attacker can't impersonate the bank with the correct certification password. The updating of certification passwords also mitigate attacks where the bank in question does not have an authentication device installed.

If it is discovered that an attacker was able to impersonate the bank, the authentication server would have all calls placed by the attacker on record, through the received calling status messages. Thus, those individuals the attacker called can be contacted by authorities and the attack can be mitigated. If the attacker is still making calls, those calls can be traced, tapped or recorded by authorities. Such factors would deter any attacker trying to compromise the authentication and certification process.

In addition to such safeguards, the authentication server may audit certain authentication devices randomly or when the server determines the authentication device is suspect. An authentication device may be determined suspect if it is making unusual amount of calls, or being placed on a large number of blacklists, blacklists will be described later in this document. The authentication device may be determined suspect by any other known means. The audit may consist of the server transmitting a request to the authentication device to send the last 10, 20, or any number of authenticated caller ID's it received. The audit may consist of the server invalidating the certification password of the authentication device and requesting that the authentication device recertify.

An attacker may also try to brute force the active certification password by transmitting messages to the server with a guessed password until the attacker gets a confirmation by the server that the password is correct. Such an attack is easy to mitigate since every bad guess is registered by the server. The server may block or disregard messages from certain IP addresses after 3 bad passwords attempts, for instance. Since the server is aware of attacks against certain numbers, those numbers could be transmitted stronger passwords by the server in subsequent certification request or the server may require those numbers to recertify in order to receive a stronger certification password.

Unless otherwise stated, for the remainder of this document any reference to certification will consist of active certification as were explained in Sections (6-a to 6-c). However, any form of certification may be substituted and used, where technically feasible.

Figure 7A:
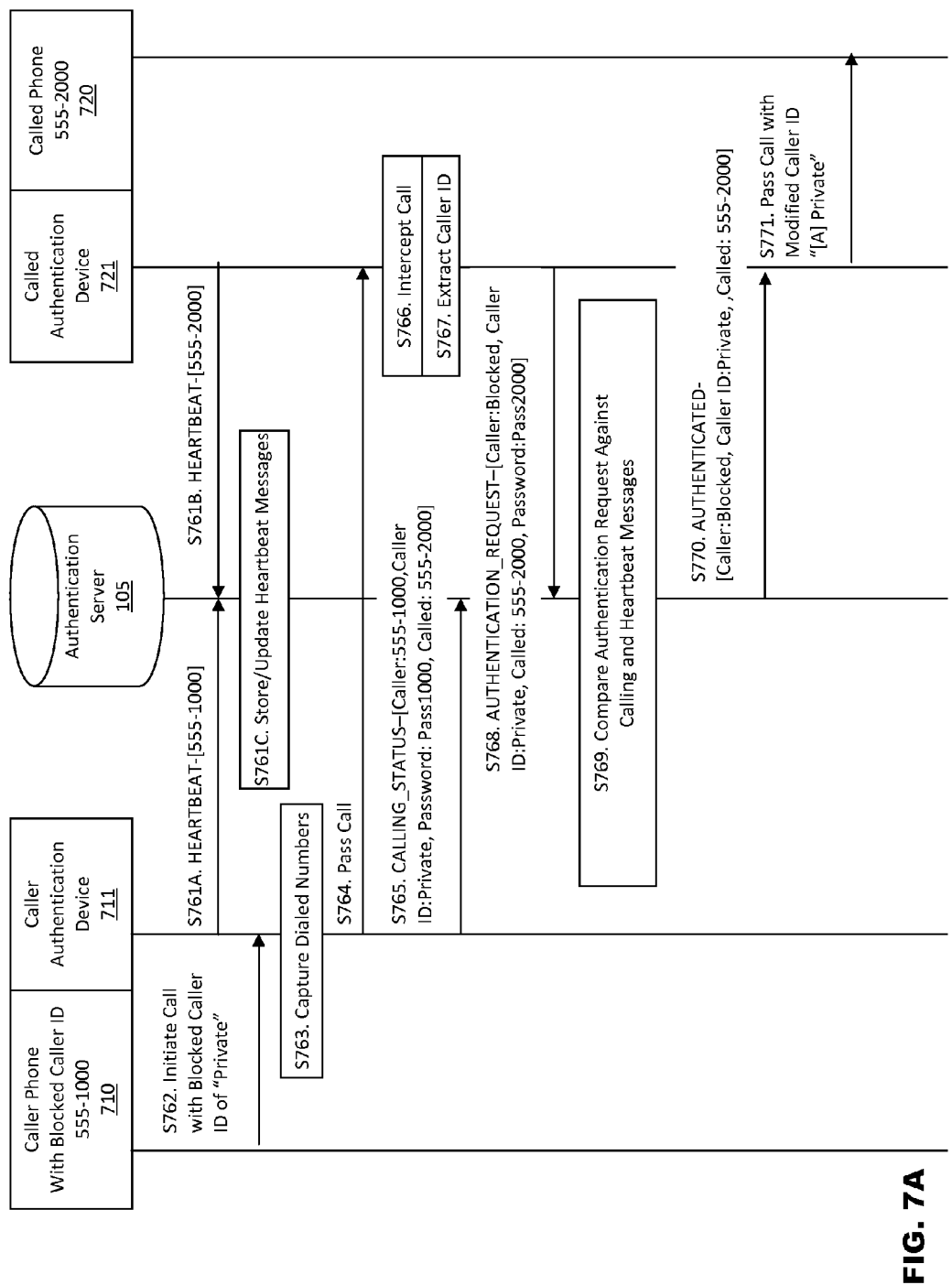
FIG. 7A illustrates the flowchart and messaging diagram for authenticating a caller with a blocked caller ID.
Figure 7B:
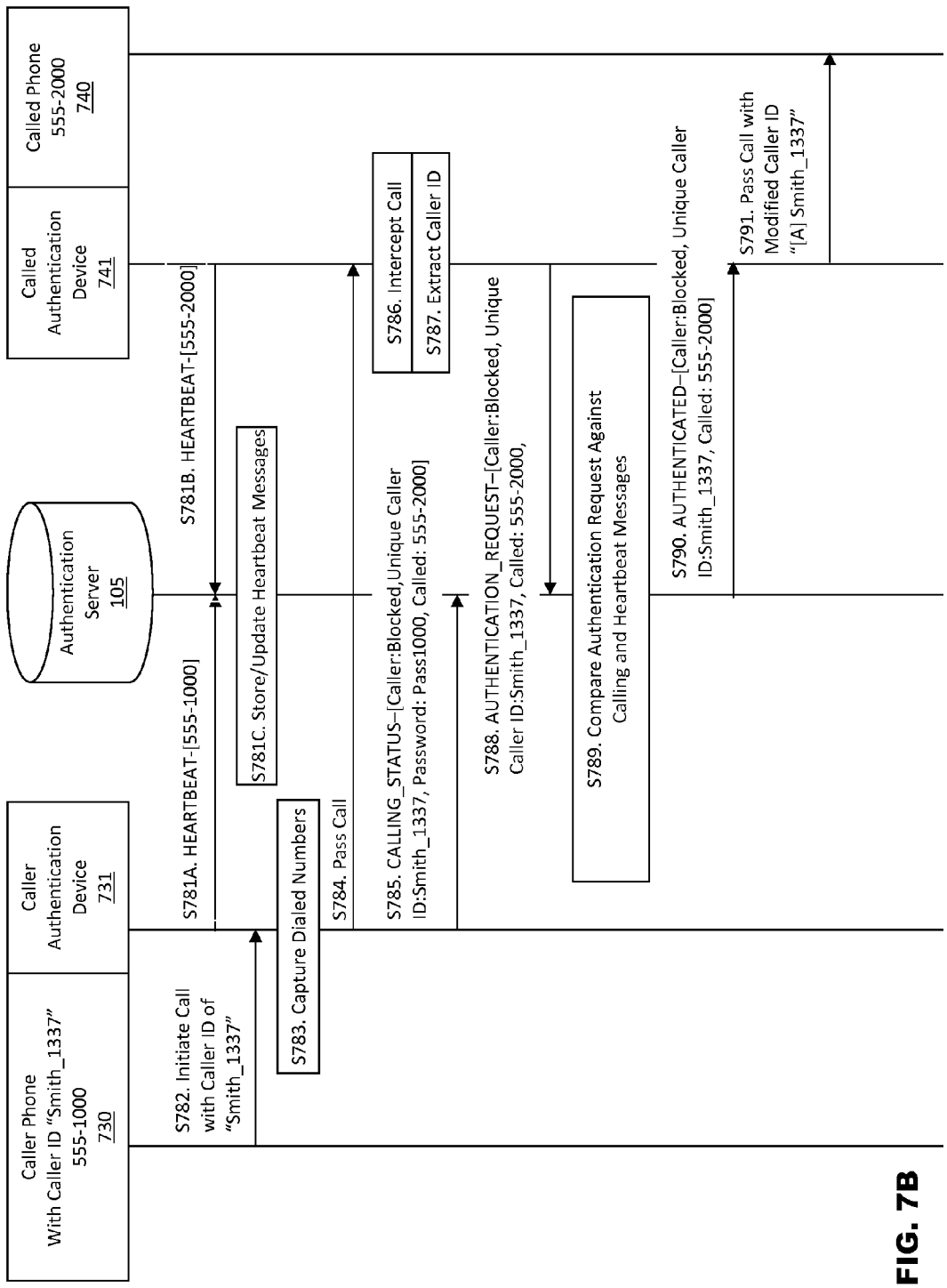
FIG. 7B illustrates the signaling diagram for authenticating a caller with a caller ID nickname.

7) Authenticating Callers with a Blocked Caller ID's (FIG. 7A-FIG. 7B)

a) Authenticating Callers with a Blocked Caller ID (FIG. 7A)

There could be cases where the caller has a blocked caller ID. A blocked caller ID is a caller ID where the number and name of the caller is not disclosed to the called party through the caller ID service. The caller ID of such calls usually displays "Private" as the caller ID or may display other text or no text at all. In one embodiment of the invention, the authentication device is able to authenticate a blocked caller ID. An authenticated blocked caller ID would be where the caller has a blocked caller ID and has an authentication device installed and is indeed calling the called number. The significance of a authenticating a blocked caller ID lies in the fact that the caller is using an authentication device. Most illegitimate telemarketers and individuals with bad intentions would be hesitant to install an authentication device on their line. As will be described in later embodiments, a caller with a blocked caller ID can be put on private and global whitelists and blacklists, which would prevent the caller from initiating further calls to certain or all parties.

FIG. 7A illustrates the flowchart and messaging diagram for authenticating a caller with a blocked caller ID. The caller and the called authentication device both send a heartbeat message to the authentication server (Step S761A and Step S761B). As was explained earlier, the heartbeat message may have been sent when the authentication device was first installed and turned on, and the heartbeat message could be sent at regular intervals thereafter. The heartbeat message along with all other messages sent to the authentication server may also contain the certification password. The authentication server stores the heartbeat messages, and if already stored, updates the storage of the heartbeat messages to signify that the authentication devices are installed at a particular phone number and still functioning. The caller 710 with a blocked caller ID of "Private" initiates a call to the called party 720 at the phone number 555-2000 (Step S762). The authentication device of the caller captures the dialed numbers (Step S763) and passes the call to the telephone network (Step S764). As soon as the caller dials and initiates the call to the called phone, the caller authentication device 711 contacts the authentication server 105 (Step S765). The authentication device of the caller transmits to the authentication server that the caller with the phone number 555-1000 is calling 555-2000 with a blocked caller ID. Revealing the phone number of the caller 555-1000 to the authentication server does not violate the privacy of the caller, since this number will not be revealed to the called party or the called authentication device. The transmitted calling status message sent to the authentication server from the authentication device may be in the form of "CALLING_STATUS-[Caller:555-1000, Caller ID: Private, Password:Pass1000, Calling:555-2000]".

The transmitted data indicates that the caller is calling from the phone number 555-1000 to 555-2000. The field of "Caller ID:Private" signifies the fact that the caller is calling with a caller ID which will show up at the called phone as "Private". The password field signifies that this authentication device of the caller is certified and is sending the received certification password from the server as proof the device is residing at the particular phone number. The authentication server may thus use the phone number 555-1000 in the "Caller" field and the password Pass1000 in the "Password" field and compare it to the certification password sent to the phone number 555-1000 and if they match, the server may thus be assured that the authentication device is actually installed at the phone number 555-1000. The call is received at the called phone line, is intercepted by the authentication device of the called phone 721 (Step S766) and the called phone is prevented from ringing. The authentication device of the called phone extracts the blocked caller ID of "Private" (Step S767). The authentication device then contacts the authentication server and inquires if a caller with a blocked caller ID of "Private" is calling the called phone at the number 555-2000 (Step S768). It is important to note that the called phone does not know the number of the caller phone. The authentication request message sent by the called phone authentication device to the authentication server may be in the form of "AUTHENTICATION_REQUEST-[Caller:Blocked, Caller ID:Private, Called: 555-2000, Password:Pass2000]". The transmitted data requests an authentication by the authentication server for a caller with a blocked number. The transmitted data also states that the caller ID of the caller is "Private". The password field after the called phone number indicates that the authentication device of the called number has been certified. The authentication server receives the authentication request and looks up if a call has been made to the called number of 555-2000 by a caller with a blocked caller ID of "Private" (Step S769). If such a call has been placed, the authentication server replies to the called authentication device in the affirmative (Step S770). Otherwise, the authentication server can reply that the caller ID is irresolute. An irresolute caller with a blocked caller ID would signify that the caller is not using or does not have an authentication device. In the case of a blocked caller ID without an authentication device, the caller ID cannot be determined to be spoofed, since the caller ID is not displaying a phone number of the caller, only displaying that it is "Private". The authentication device of the called phone receives the affirmative reply from Step S770 and puts the call through (Step S771). The authentication device modifies the caller ID of the caller with the prefix "[A]", thus the caller ID that the called phone receives would be "[A] Private".

A blocked caller ID may display any type of text to signify a blocked caller ID or could simply be blank. It should be apparent to the reader that the embodiment thus presented did not rely on the text of the blocked caller ID. The caller ID authentication system would be able to function without any stated text for the caller ID field. The called phone authentication device does not need to supply any caller ID text to the authentication server. The caller authentication device can simply inform that a caller is calling 555-2000 with a blocked caller ID, without any indication of the transmitted caller ID text to the called phone. The called phone authentication device can inquire if any caller with a blocked caller ID is calling the called phone at 555-2000. The authentication server can simply look up if a caller with a blocked caller ID is calling the called party at 555-2000. And the authentication server can inform the called authentication device of the authentication status. A blank caller ID would be an unusual situation, but is presented to further the understanding of the embodiment.

A race condition could take place where there are two callers with blocked caller ID's are calling the same called party at the same time. Such a race condition has 3 possible variations. The first variation is where both callers are not using an authentication device. In such a variation, the authentication server would reply to the authentication device of the called party in the irresolute since the authentication server would never receive a calling status message. The second variation is where both callers are using an authentication device. In such a variation, the authentication server receives a calling status message from both callers and the server would reply with an authenticated reply to the called party authentication device. However, the server cannot determine which party was connected to the called party first. To mitigate such a scenario, the caller authentication device may send a call ended or called party busy message to the server if the caller party is unable to reach the called party. Such a message would ultimately allow the server to determine which party contacted the called party. Determination of the calling party phone number will be required for placing such a number on a private list, as will be elaborated later in this disclosure. The third variation is where one caller has an authentication device and the other does not. In such a scenario, the risk is where the caller without the authentication device connects with the called party, and the server authenticates the blocked caller ID because it received a calling status message from the caller with the authentication device. The risk can be mitigated by a call ended or called party busy message from the caller with the device which is unable to connect.

In addition to the caller party authentication device sending a call connected, call busy or called ended message to the server to signify the progress of the call for the purpose of mitigating race conditions, the called party authentication device may send additional authentication requests before the call is answered, while the call is being answered, and after the call has ended. Likewise, the server may send a message which updates the authentication status of the caller to the called party before, during and after the call. For instance, if one caller without a blocked caller ID without an authentication device calls the called party at the same time as another caller with a blocked caller ID and with an authentication device, the server would be updated with a calling status message. If the caller without an authentication device connected first, the called authentication device would send an authentication request with the blocked caller ID. The authentication server would mistakenly determine the caller ID as authentic and that of the caller party with the authentication device. The called party authentication device would then notify the called party that the blocked caller ID is authentic. If the caller with the authentication device sends a call busy to the authentication server, the authentication server would then be aware of the mistaken authentic determination that the caller with a blocked caller ID without an authentication device has actually connected before the caller with an authentication device. The authentication server may then send an update to the called party authentication device that the previous caller ID determination is invalid, and the new caller ID determination is irresolute. Alternatively, the called party authentication device may check back with the server for any updates to the caller ID authenticity determination before, during and after the call, and notify the user in such cases. The same methodology can be used to differentiate between two callers with blocked caller ID and with authentication devices calling the called party. Thus, if the caller is using a blocked caller ID, the authentication server might instruct the caller authentication device to submit call connected, call busy, or call ended messages. Or the authentication device might be configured to send such messages if the user is using a blocked caller ID. The authentication server might also instruct the called authentication device to re-authenticate after a certain time if a caller with a blocked caller ID is authenticated. At the least, a call busy or call ended message would likely be required for callers with blocked caller ID's to mitigate race issues.

b) Authenticating Callers with a Caller ID Nickname (FIG. 7B)

In another embodiment of the current invention, the authentication system is able to authenticate callers with customized caller ID's or caller ID nicknames. A caller ID nickname would be an alternative to and a method of blocking a caller ID, where the caller is able to block his name and phone number from being displayed to the called party. A caller ID nickname is a nickname chosen by the caller who does not wish to display his name and phone number. The caller ID nickname is displayed on the called caller ID. The caller ID nickname could simply be the caller's real name, for example "John Smith". Or the caller ID nickname could be a fictitious nickname chosen by the caller, for example "Smith_1337". Such caller ID customization would be offered to customers by the telephone service provider for a fee, or for free. The caller ID nickname would either be unique within a telephone service provider or ideally the caller ID nickname would be unique within the entire telephone network employing caller ID nicknames. The caller ID nickname must be unique to prevent two callers from having the same nickname and being able to impersonate each other. Thus, a caller can choose a unique nickname within the telephone network, for example if a caller has chosen the nickname "John Smith", that nickname would be unavailable to every other caller. Each telephone service provider may employ nicknames internally. For example, a caller being serviced by the telephone provider Verizon might chose the nickname "John Smith", where that nickname is unique to the Verizon telephone provider. The Verizon telephone provider would then prefix the telephone provider's unique tag in front of the nickname. If the unique tag for Verizon is "Verizon:", then the full caller ID nickname displayed to called parties would be "Verizon: John Smith". Thus, the nickname "John Smith" would be unique to the Verizon telephone provider, and the full nickname "Verizon: John Smith" would be unique within the entire telephone network and all telephone service providers. For example, another caller may choose "John Smith" within the AT&T telephone service provider. And his full caller ID nickname would be "ATT: John Smith". Thus, those two nicknames would be unique and be uniquely identifiable. As previously stated, ideally the nicknames would be chosen by the telephone customers that are unique to the entire telephone network, instead of being unique to the telephone providers and the telephone provider prefixing their unique tag in front of the nickname.

The concept of caller ID nicknames is analogous to an internet forum username. An internet forum username is a unique name that allows a person to post on an internet forum, instead of using private information such as an email address. Thus, the username allows for someone to post on a forum without revealing personal information and allows for other forum members to uniquely identify the individual through the unique username. The concept of telephone provider prefixes is analogous to the concept of sub-domains in DNS. For example, the blog host blogspot.com is able to host blogs through the use of sub-domains, such as googleblog.blogspot.com. Thus, blogspot.com is similar in concept to the telephone service provider prefix, and the googleblog is similar in concept to a caller ID nickname which is unique to blogspot.com. Thus, the full address googleblog.blogspot.com is unique to all address on the internet.

The nicknames for the entire telephone network would ideally be maintained by a global nickname server. The global nickname server would serve as a clearinghouse and prevent nickname conflicts between two users. Thus, the telephone service provider would allow its' customers to choose nicknames, and the nickname would be checked against the global nickname server to determine that it is unique to all the other nicknames. Once a caller calls a called party and wishes to use a caller ID nickname, the telephone provider looks up the caller nickname, retrieves the unique nickname and transmits the nickname to the called party as the caller ID. Thus the caller ID nickname is used instead of revealing the callers full name and phone number as would be the case of a non-blocked caller ID. In the case of a blocked caller ID, the nickname allows the called party to uniquely identify the call instead of receiving a caller ID of "Private" or a blank caller ID. The called user can use the caller ID nickname to determine if the caller has called before, or if the called party is someone who he talks to on a regular basis. A detailed technical explanation of methods and systems for implementing customized caller ID's or caller ID nicknames is beyond the scope of this invention disclosure. Readers wishing to learn more about technical details of such systems should consult US Patent Applications 2003/0007616, 2002/0080942 and U.S. Pat. Nos. 8,306,202, 8,077,850, 8,290,131, herein incorporated by reference in their entirety. This disclosure will only focus on authenticating such customized caller ID's. In the embodiments explained later, the caller ID nickname will be used for call handling. Caller ID nicknames can also be used for VoIP calls, as will also be explained shortly.

FIG. 7B illustrates the flowchart and signaling diagram for authenticating a caller with a caller ID nickname. The caller and the called authentication device both send a heartbeat message to the authentication server (Step S781A and Step S781B). As was explained earlier, the heartbeat message may have been sent when the authentication device was first installed and turned on, and the heartbeat message could be sent at regular intervals thereafter. The authentication server stores the heartbeat messages (Step S781C). The caller 730 with a caller ID nickname of "Smith_1337" initiates a call to the called party 740 at the phone number 555-2000 (Step S782). This caller ID nickname would be chosen by the caller through his telephone service provider. For every call, the telephone provider would transmit the caller ID of the caller as the appropriate caller ID nickname. In this example, the caller ID nickname of "Smith_1337" is unique to all caller ID nicknames within the telephone network, and no telephone provider prefix need to be affixed. The authentication device captures the dialed digits (Step S783) and passes the call to the telephone network (Step S784). As soon as the caller dials and initiates the call to the called phone, the authentication device of the caller 731 contacts the authentication server 105 (Step S785). The authentication device of the caller transmits to the authentication server that the caller is calling 555-2000 with a caller ID nickname of "Smith_1337". The phone number of the caller may or may not be revealed to the authentication server, in this example, the caller number is not revealed. Revealing the phone number of the caller 555-1000 to the authentication server would not violate the privacy of the caller, since this number will not be revealed to the called party or the called authentication device. The calling status message transmitted to the authentication server from the authentication device may be in the form of "CALLING_STATUS-[Caller:Blocked, Unique Caller ID: Smith_1337, Password:Pass1000, Calling:555-2000]". The calling status message indicates that the caller is calling the phone number 555-2000. The field of "Unique Caller ID:Smith_1337" signifies the fact that the caller is calling with a unique caller ID which will show up at the called phone as "Smith_1337". The password field signifies that this authentication device of the caller is certified. The authentication server verifies that the password of the caller authentication device is correct, and stores transmitted message (Not explicitly shown on figure). The call is received at the called phone line and is intercepted by the authentication device 741 of the called phone 740 and the called phone is prevented from ringing (Step S786). The authentication device of the called phone extracts the caller ID nickname "Smith_1337" (Step S787). The telephone company may transmit an identifier to indicate that the caller ID is a unique nickname, such as through a prefix, for example such as "Unique", and the resultant caller ID would be "Unique:Smith_1337". The receiving telephone may then display or remove the prefix. The authentication device may thus identify unique caller ID's and process them accordingly, including any removal of the prefix before being presented to the called party. In Step S788, the authentication device contacts the authentication server and inquires if a caller with a blocked caller ID of "Smith_1337" is calling the called phone with the number 555-2000. It is important to note that the called phone does not know the number of the caller phone. The authentication request message transmitted by the called phone authentication device to the authentication server may be in the form of "AUTHENTICATION_REQUEST-[Caller: Blocked, Unique Caller ID:"Smith_1337", Called: 555-2000, Password:Pass2000]". The transmitted data requests an authentication by the authentication server for a caller with a caller ID nickname. The transmitted data also states that the unique caller ID of the caller is "Smith_1337". The password field after the called phone number indicates that the authentication device of the called phone number has been certified. The authentication server receives the authentication request and verifies the password of the called authentication device. Then the authentication server looks up if a call has been made to the called number of 555-2000 by a caller with a unique caller ID nickname of "Smith_1337" (Step S789). If such a call has been placed, the authentication server replies to the called authentication device in the affirmative (Step S790). Otherwise, the authentication server can reply that the caller ID is either spoofed or irresolute. If the caller in question with the unique nickname of "Smith_1337" has an authentication device, which is determined to be functioning through a received heartbeat message, and is not calling anyone, then the calling party may be determined to be using a spoofed caller ID. If the caller in question with the unique nickname of "Smith_1337" doesn't have an authentication device, then the caller ID cannot be determined to be spoofed or authenticated, therefore, it would be irresolute. The authentication device of the called phone receives the affirmative reply from Step S790 and puts the call through (Step S791). The authentication device modifies the caller ID of the caller with the prefix "[A]", thus the caller ID that the called phone receives would be "[A] Smith_1337".

c) Authenticating Callers within a VoIP Infrastructure

A VoIP infrastructure is where the caller is using an internet connection to connect to a VoIP provider, which relays the call to a traditional telephone network. Implementations of VoIP systems were discussed in Section (1-d). Such known VoIP providers are Skype, Vonage and the like. With Skype, the caller has software installed at a personal PC. The user uses the Skype software to initiate a call. The Skype VoIP software uses the internet to relay the call to Skype servers. The Skype server then relays the call to traditional telephone network and connects the call. The user then talks through a microphone connected to the PC. Thus, the Skype VoIP servers' handles the call from the user's PC to the traditional phone network over the internet. The Skype VoIP system is used generally where the user does not have a phone number. A Skype user usually has a Skype username, which allows others to connect to the user over the Skype system. The Skype system can assign users phone numbers. The Vonage VoIP system is more tailored at replacing residential phone service. With Vonage, the user installs a Vonage VoIP router. The router is connected to an internet service provided by the residence. The household phone line then is connected to the Vonage VoIP router. When a user picks up the phone, a dial tone is provided by the router. When the user dials a call, the Vonage router contacts the Vonage VoIP server. The Vonage VoIP servers then relay the call to the traditional phone network. Vonage also provides a phone number to the user. Thus, a caller from the traditional phone network can call a Vonage user. The traditional phone network then relays the call to the Vonage server, where it is relayed to the router and the called phone is rang by the Vonage VoIP router.

Since such VoIP systems sometimes do not assign phone numbers to their customers, the VoIP callers' caller ID usually shows up as "Private", "Out of Area", or other similar text. As was described, such caller ID can be thought of as a blocked caller ID since a phone number is not displayed. Thus, such VoIP systems would be ideal candidates for caller ID nicknames described previously. And through the use caller ID nicknames, caller ID authentication may be performed as was described in the previous embodiment.

The system and methods for caller ID nicknames assignment and authentication were previously explained, but will be recapped for a VoIP system. A VoIP provider such as Vonage may institute unique caller ID nicknames within it's network. A Vonage VoIP customer would be asked to pick a caller ID nickname which is unique to all Vonage customers, for example "CommanderData". To the customer's unique nickname, the VoIP provider would prefix its unique tag, such as "Vonage:". Thus, the complete caller ID nickname "Vonage:CommanderData" would be the customers caller ID nickname. The nickname "CommanderData" would be unique to the Vonage provider, and the nickname "Vonage:CommanderData" would be unique to the telephone network. Thus any outgoing calls by the customer would display the caller ID of "Vonage:CommanderData". The called party can thus use nickname to determine if the calling party is someone familiar or not. The Vonage service provider may install an authentication device and for every outgoing call authenticate the caller ID nicknames with an authentication server. Alternatively, as was discussed, the caller ID nickname chosen by the customer may be unique to the entire telephone network, such that the VoIP provider need not prefix its tag to make it unique.

One issue with authenticating caller ID's within a VoIP system is if the VoIP customer does not have an assigned phone number, the process of certification becomes more complicated. There are several scenarios that can occur within such a VoIP system. The first scenario is if the VoIP customer does not have a phone number, but has an authentication device installed locally, such as in the form of authentication device software running on the customers PC or the authentication device integrated within the customers VoIP router. In such instances, the certification process will use the customer's uniquely assigned caller ID nickname. The authentication device can contact the authentication server and request a certification password. The device would submit along with the request the caller ID nickname. The authentication server would then resolve the caller ID nickname to the VoIP provider. For example, if the nickname was "Vonage:CommanderData", the server would resolve this nickname as the customer "CommanderData" on the Vonage VoIP network. The server would contact the Vonage VoIP network and connect to the customer with the caller ID nickname "CommanderData". The Vonage system would then connect the server to the user. The certification process can then proceed as explained in previous embodiments. The authentication device can intercept the call from the server and receive the certification password. And the device can use the certification password in all future communications with the authentication server.

The second scenario is where the VoIP customer has a caller ID nickname but does not have a phone number and does not have the authentication device installed locally. In such scenarios, the authentication device would be installed at the VoIP provider, as was shown in FIG. 2A. In such an instance, the VoIP provider would make available the authentication device for each user. Such an authentication device would be added to the VoIP provider system through hardware or software or a combination thereof. Such that that the authentication device at the VoIP provider would be able to perform all the necessary functions for each customer, such as intercepting dialed number, contacting an authentication server, modifying caller ID, and so on. The authentication device at the VoIP provider would also possess its' own phone number for the purpose of certifying itself with the authentication server. The phone number of the VoIP authentication device would most likely be registered with the authentication server. The registration would indicate to the authentication server that the authentication device at that number belongs to the VoIP provider. And any message sent by the authentication device with the caller number as that number is acting on behalf of the VoIP provider. Thus, when a VoIP customer dials a number, the VoIP provider would send the calling status message, such as "CALLING_STATUS-[Caller:VoIPprovider_authentication_device_phone_number, CallerID:Vonage:CommanderData, Password:VoipPass1000, Called:555-2000]". Thus, the authentication server can match the certification password in the calling status message against the password generated and sent to the VoIP provider authentication device and certify that the calling status message is being received from the VoIP provider. The authentication server can then receive authentication request from the called party and authenticate the caller ID nicknames.

It should be understood that if the VoIP customer has a phone number, the methods of caller ID authentication and process of certification would be accomplished in the same manner as were disclosed in the previous embodiments.

As an alternative to the requirement of phone numbers for certification and caller ID nicknames within a VoIP system may be email addresses. For example, the caller ID of the caller in a VoIP system can be the email address of the caller. The email of the caller would be the email address the VoIP provider has on record for the caller. Thus, the called parties may identify the caller through their unique email address, such as "commanderdata!2013@gmail.com". This email address can then be used in messages sent to the authentication server in place of the caller ID. The certification process can also use the email address. Such as the caller device can contact the authentication server and send a certification request containing the email address of the caller. The server can then send a certification password to the email address.

The authentication device of the caller can then retrieve the certification password from the callers email address and use the password in all messages for the purpose of certification.

8) Authenticating Callers with Legitimate Caller ID Spoofing (FIG. 8 (A-C))

It should be apparent to the reader that the authentication system described in the preceding embodiments can be used within a PBX, business phone systems, call centers, IP PBX, Hybrid PBX, or similar phone systems system without any issues. In general, such systems have multiple user phones or stations connected to the PSTN through an exchange system, such as PBX and the like. Thus, when an outgoing call is placed from a user phone or a station of the exchange, the exchange would connect the call to an outside number. If the exchange system is not spoofing the caller ID information, then the caller ID of the exchange system is authenticated as discussed in previous embodiments. The exchange system would have an authentication device installed. The authentication device would certify with the authentication server upon installation and send heartbeat messages to the authentication server on a regular basis to indicate it is installed and functioning properly. The authentication device would then send to the server the telephone numbers of outgoing calls to be authenticated by the called authentication devices. And the authentication device of called parties would authenticate incoming calls.

As discussed previously, there might be instance where a caller will legitimately spoof their caller ID information. In the cases where there are two or more exchanges and the exchanges wish to spoof caller ID information to display a single number, caller ID authentication is possible. One example of such a system would be a business with two offices in separate locations. The business would like to display a single toll free number as the caller ID of all employees outbound calls to customers. Although this embodiment of the invention by way of example will show how one exchange may legitimately spoof another exchanges caller ID, it should be understood the embodiment may be implemented not just between exchanges but can be implemented between any two parties on a landline, on smartphones, or VoIP phones in the same manner.

Figure 8A:
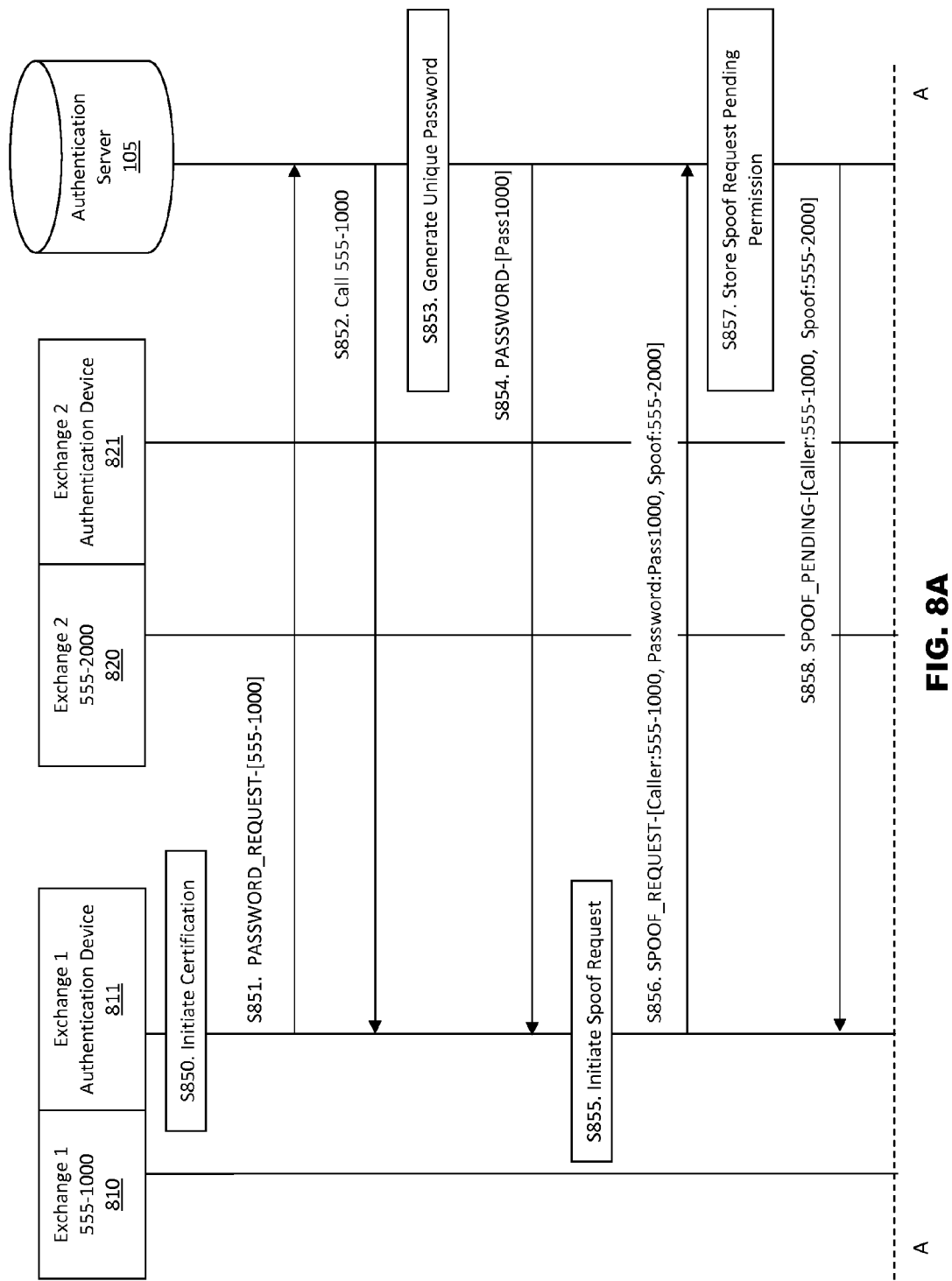
FIGS. 8A-8C, collectively referred as FIG. 8, shows the flowchart and signaling diagram for an embodiment of the invention of authenticating legitimately spoofed caller ID's.
Figure 8B:
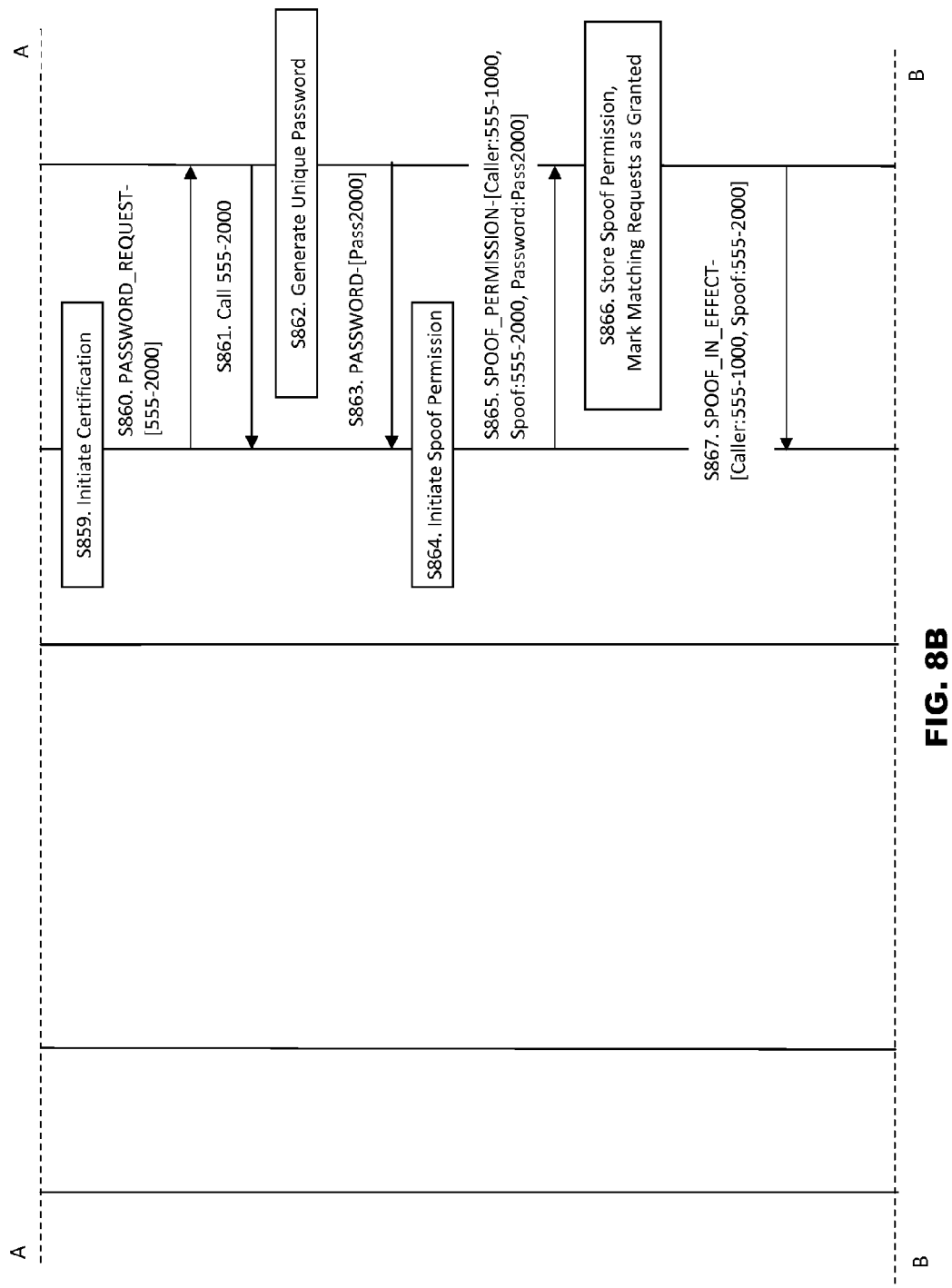
Figure 8C:
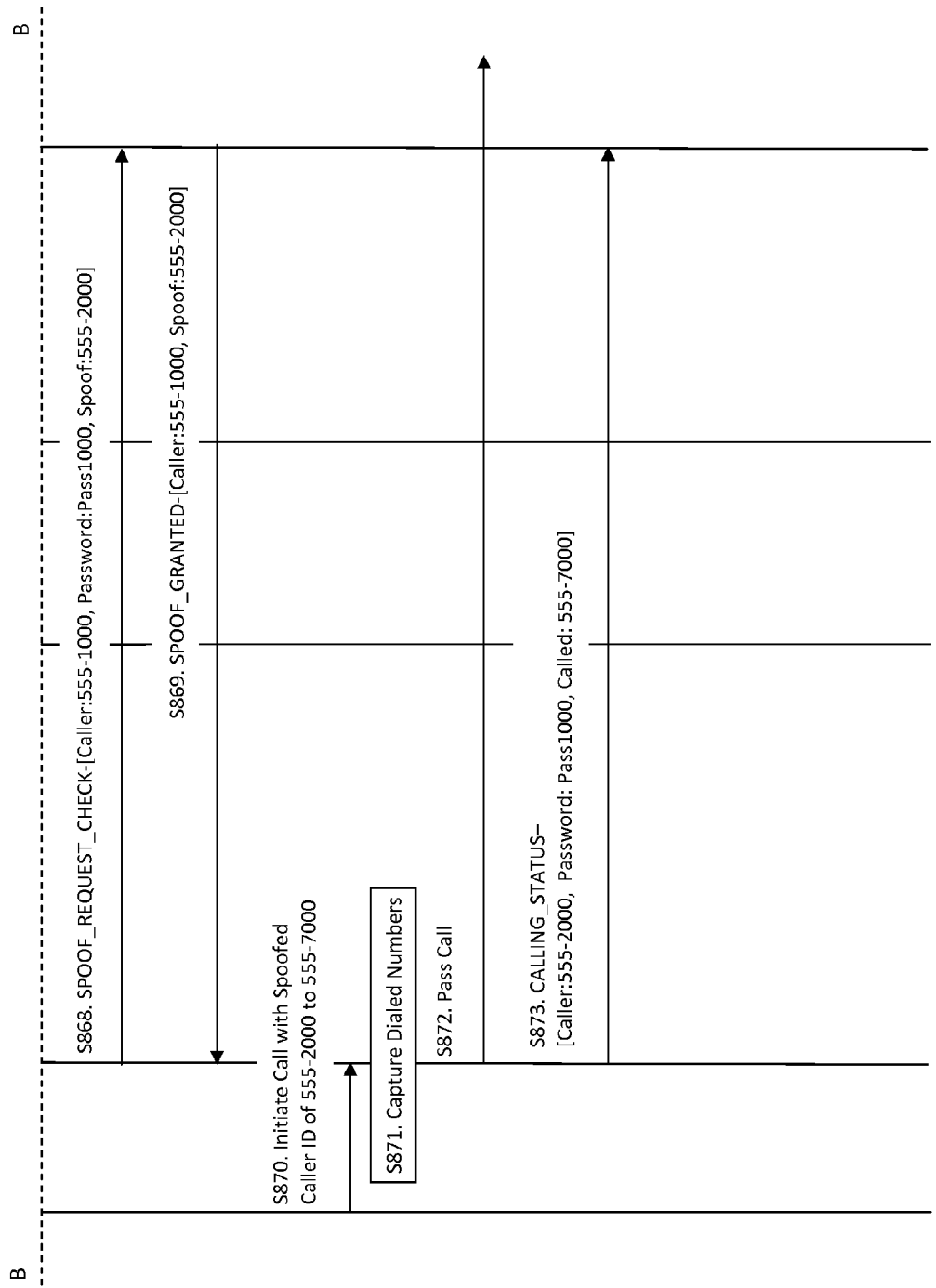

In this embodiment of the invention legitimate caller ID spoofing and accompanying authentication methods are illustrated. FIGS. 8A-8C, collectively referred as FIG. 8, shows the flowchart and signaling diagram for an embodiment of the invention of authenticating legitimately spoofed caller ID's. In FIG. 8, one exchange wishes to spoof the caller ID of another exchange. An exchange can be a PBX and the like. The steps performed by the exchanges in FIG. 8 would be performed the same for any other system or phones which wish to perform legitimate caller ID spoofing. Referring to FIG. 8A, the first exchange 810 with a telephone number 555-1000 has an authentication device 811. The first exchange can be referred to as the spoofing party who wishes to spoof its caller ID to that of the spoofed party. The second exchange 820 with a telephone number 555-2000 has an authentication device 821. The second exchange can be referred to as the spoofed party who gives permission to the spoofing party to spoof its' caller ID. The first exchange wishes to spoof the caller ID of the second exchange. The process begins where the first exchange authentication device certifies itself (Step S850). The authentication device for the first exchange begins the certification process by contacting the authentication server 105 and requesting a password (Step S851). It should be noted that the certification process could have already taken place for the first exchange authentication device, in which case the process would skip to Step S855. The authentication server then calls the first exchange (Step S852). The call is intercepted by the authentication device and picked up. The authentication server generates (Step S853) and sends a unique password (Step S854). The authentication device may, during the call back from the authentication server, or anytime after a certification password is received may initiate a request to spoof its' caller ID to be the telephone number of the second exchange, namely 555-2000 (Step S855). This spoof request may take place at any time and there is no restriction that a spoof request be submitted after certification, but there is a restriction that the spoof request is only considered by the server which is received from certified devices. The spoof request may be initiated by the customer served by the authentication device. The spoof request may be indicated to the authentication device through IVR or through connecting to the device through an internet connection and adjust the device settings through a web page. If the authentication device is implemented as software, for example on a smartphone, the spoof request may be initiated by going to the software settings menu. The authentication device contacts the server and transmits a spoof request (Step S856). The transmitted spoof request data maybe in the form of "SPOOF_REQUEST-[Caller:555-1000, Password: Pass1000, Spoof:555-2000]" The "Caller" field signifies the requesting phone number. The "Password" field signifies that the authentication device is certified by transmitting the password received during certification. The "Spoof" field indicates to the server the phone number that is wished to be spoofed. The authentication server stores the spoof request (Step S857) and replies that the spoof request is pending permission from the second exchange at 555-2000 (Step S858). The replied message from the server may be in the form of "SPOOF_PENDING-[Caller:555-1000, Spoof:555-2000]". It should be noted that the spoof permission by the second exchange could have already been sent to the authentication server, in which case the authentication server would have replied back as spoof request granted, as is shown in Step S869.

Referring to FIG. 8B, which is a continuation of FIG. 8A, the second authentication device initiates the certification process (Step S859) by transmitting a certification password request to the server (Step S860). It should be noted that the certification process could have already taken place for the second exchange authentication device, in which case the process would skip to Step S864. The authentication server calls the second exchange phone number (Step S861), which is intercepted by the authentication device and picked up. The authentication server then generates a unique password (Step S862) and sends it to the authentication device (Step S863). The authentication device then initiates a spoof permission (Step S864). The authentication device of the second exchange may during the callback, or through an internet connection, grant permission for first exchange authentication device at 555-1000 to spoof its number. It should be understood that any permission to grant a spoof would be sent with the authentication device certification password received in Step S861. The device sends a message to the server authorizing the number at 555-1000 to spoof its' number. (Step S865). The transmitted message may be in the form of "SPOOF_PERMISSION-[Caller:555-1000, Spoof:555-2000, Password:Pass2000]" The "Spoof" fields signifies the phone number of the spoof permission granting customer. The "Password" field signifies the certification password of the device, transmitted by the server. The "Caller" field indicates that the phone number at "555-1000" may spoof the number of the spoof granting customer "555-2000". The authentication server stores the spoof permission, and marks all matching spoof requests as granted (Step S866). It should be apparent that matching requests would consist of requests in which the "Caller" and "Spoof" fields match, such as the messages in Steps S856 and S865. The server replies with a message that the spoof permission is received and the spoof permission is now in effect (Step S867). The in effect reply signifies that the spoof is granted to the party signified in the "Caller" field until it is revoked. The reply message may consist of "SPOOF_IN_EFFECT-[Caller:555-1000, Spoof:555-2000]". The message confirms that the "Caller" with the phone number 555-1000 has been granted by the "Spoof" party at the phone number 555-2000 to spoof its' number.

Referring to FIG. 8C, which is a continuation of FIG. 8B, the first authentication device checks the status of the spoof request by contacting the authentication server (Step S868). The spoof request status check would only be performed if the server had replied that the previous request by the spoof requesting party was pending, as was indicated in Step S858. Alternatively, the server may contact the spoof requesting party once the spoof permission is received by the server. In Step S868, the transmitted message to the server may be in the form of "SPOOF_REQUEST_CHECK-[Caller:555-1000, Password:Pass1000, Spoof:555-2000]". The authentication server replies that the first exchange authentication device may spoof its' caller ID as 555-2000 (Step S869). The transmitted message to the device may be in the form of "SPOOF_GRANTED-[Caller:555-1000, Spoof:555-2000]". Thereafter, the first exchange initiates a call to another party (called party not shown in figure) at the phone number 555-7000 with a spoofed caller ID of 555-2000 (Step S870). The first exchange authentication device captures the dialed numbers (Step S871) and passes the call to the telephone network (Step S872). The authentication device contacts the authentication server and transmits the called number and spoofs the calling number as 555-2000 (Step S873). The calling status message transmitted to the authentication server can consist of "CALLING_STATUS-[Caller:555-2000, Password:Pass1000, Called: 555-7000]". The password "Pass1000" would be the password generated by the authentication server and transmitted to the authentication device in Step S854. Thus the authentication device is using its' own password. The authentication server looks up the phone number of the password holder, and determines it to be 555-1000. However, since the authentication device of 555-2000 has given permission for the authentication device at 555-1000 to spoof its number, the authentication server accepts the "Caller:555-2000" field in the transmitted data. Then, the call is received at the called party with the phone number 555-7000. If the called party has an authentication device installed, the authentication device contacts the authentication server and authenticates that the caller ID of the call. The authentication server may either indicate that the caller ID is authentic or it can indicate to the called party that the caller ID is legitimately spoofed. Such indication would be performed by the authentication server transmitting the appropriate messages to the authentication device of the called party.

The calling status message can also be in the form of "CALLING_STATUS-[Caller:555-1000, Spoofing:555-2000, Password: Pass1000, Called: 555-7000]". The "Caller" field would indicate the caller number, the "Password" field would indicate the password of the caller. The "Spoofing" field would indicate the number that the caller is spoofing its caller ID as. The server would first verify the password matches the password of the caller, verify that the caller has permission to spoof the number contained in the "Spoofing" field, and then store the calling status message. In either calling status message formats, the authentication server would have received a message that the caller is calling with a spoofed caller ID and the server would then check the permissions on file if the caller is allowed to spoof the number. The server can then authenticate an authentication request sent by the called party which contains spoofed the caller ID of the caller.

A spoof permission may also be rescinded by the party who granted the spoof permission. Such a rescind message can be in the form of "SPOOF_PERMISSION_RESCIND-[Caller: 555-1000, Spoof:555-2000, Password:Pass2000]". Such a rescind message is self explanatory and will not be elaborated. According to such a rescind message, the server would no longer authenticate spoofed caller ID's by the respective caller party. The server may also contact the spoofing party authentication device to notify it of the spoof permission rescind.

9) Authentication Device Call Handling (FIG. 9-FIG. 14)

The next embodiments will introduce the call handling features of the authentication device. If the authentication device is able to authenticate caller ID's, then it becomes possible to handle calls based on such authenticated caller ID's. Calls from numbers that are deemed trustworthy and which the user wishes to be contacted by; can be connected to the user by the authentication device. Such calls can be which the user speaks to on a daily basis, such as spouse, relatives, etc. Calls from numbers that are deemed untrustworthy and which the user does not wish to be contacted by; can be intercepted by the authentication device. Such calls can be calls from telemarketers, robocallers, etc. The authentication device can thus maintain a list of such trustworthy and untrustworthy phone numbers in lists. And since the authentication device is able to both authenticate caller ID and detect caller ID spoofing, such lists can form a very effective method for call handling not presently known in the art.

The call handling concepts introduced in the following section will utilize the caller ID authentication systems and methods discussed in the previous embodiments. However, other methods of caller ID authentication, either known in the prior art or discovered after the date of this disclosure, may be used instead.

a) Authentication Device Internal Lists: Whitelist

In this embodiment of the current invention, the authentication device maintains a local or internal whitelist. The internal whitelist is a list of numbers that the authentication device determines to be trustworthy. Trustworthy numbers are defined as numbers that the customer of the phone for which the authentication device is connected to wishes to receive calls from. Such trustworthy numbers may be the customer's spouse, children, relatives and the like. The internal whitelist of the authentication device would consist of a database contained in the device for storing phone numbers. The phone numbers are added to the internal whitelist by the authentication device autonomously. The authentication device adds numbers that the customer dials a certain amount of times to the internal whitelist automatically. The authentication device adds numbers that call the customer a certain amount of times to the internal whitelist automatically. The phone numbers of received calls would be identified by caller ID and would only be added to the whitelist if the caller ID can be authenticated according to the previously described embodiments of the invention. Thus, the authentication device autonomously complies and populates an internal whitelist of phone numbers. A number may also be manually added to the whitelist through the authentication device IVR prompts, or through the device settings accessed through the internet.

If the incoming call has a blocked caller ID, that is it displays "Private" or no text as the caller ID, then this call cannot be placed in the internal whitelist. Since the caller ID is blocked, there isn't a way to differentiate one blocked caller ID from another. However, if the incoming call is utilizing a customized caller ID, such as a caller ID nickname, then it is possible to add such a call to the internal whitelist. Since a caller ID nickname by definition is unique, it is possible to differentiate one nickname from another, and handle such calls appropriately, as will be explained. Adding a caller ID nickname to the whitelist would be done through a similar mechanism to adding incoming calls with non-blocked caller ID's to the internal whitelist. If the customer receives a certain number of calls from a caller with a caller ID nickname, that nickname can be added to the internal whitelist autonomously.

All numbers and caller ID nicknames which are added to the internal whitelist, or any other list as will be explained, must be authenticated first. Such authentication may be performed by any embodiment previously described. Authentication ensures that a caller is actually calling from the number which is stated on the caller ID. Numbers added to the internal whitelist must also not be on the internal blacklist.

b) Authentication Device Internal Lists: Blacklist

The authentication device also maintains a local or internal blacklist. The internal blacklist is a list of numbers that the authentication device stores that are determined to be banned from contacting the customer. A number is added to the internal blacklist in one of two ways, autonomously or manually. The autonomous method of adding a number to the internal blacklist will be discussed later. The user of the authentication device can manually add a number to the blacklist by entering a star code, during a call or after a call has ended. For example, if the user of the authentication device receives a call from a telemarketer, and the user wishes to ban the telemarketer from further contacting him, the user can press a star code such as *10. If the star code is pressed during a call, the caller ID number of the call is added to the internal blacklist. If the star code is pressed after a call has ended, the preceding calls telephone number is added to the blacklist. The process of adding a telephone number to a blacklist after a call has ended can be where the user hangs up the phone, picks up the phone, hears a dial tone, and dials *10. Since the authentication device is able to monitors outgoing dialed numbers, the device can intercept the star code, pick up the phone and announce through a voice prompt that the last called number has been added to the internal blacklist. A number may also be manually added to the blacklist through the authentication device IVR prompts, or through the device settings accessed through the internet. Only authenticated caller ID's, such as determined according to the previously described embodiments, can be added to the blacklist.

There might be instances where a number calls the customer several times, and the device mistakenly determines this to be a whitelisted number and autonomously adds it to the whitelist, as described previously. However, such a number may be a telemarketer, and it might be the case that the customer forgets to add the number to the blacklist after such a call. In such a case, if the customer eventually adds the number to the blacklist after receiving a subsequent call, the number would be removed from the whitelist and added to the blacklist.

If the incoming call has a blocked caller ID, that is it displays "Private" or no text as the caller ID, then this call cannot be placed in the internal blacklist. Since the caller ID is blocked, there isn't a way to differentiate one blocked caller ID from another. However, if the incoming call is utilizing a customized caller ID, such as a caller ID nickname, then it is possible to add such a call to the internal blacklist. Since a caller ID nickname by definition is unique, it is possible to differentiate one nickname from another, and handle such calls appropriately, as will be explained. Adding a caller ID nickname to the blacklist would be done through a similar mechanism to adding incoming calls without blocked caller ID's to the internal blacklist. If the customer receives a call with a caller ID nickname and wishes to add it to the internal blacklist, then the customer presses the appropriate star code during or after the call has ended, as was explained, and the appropriate nickname can be added to the blacklist.

Figure 9A:
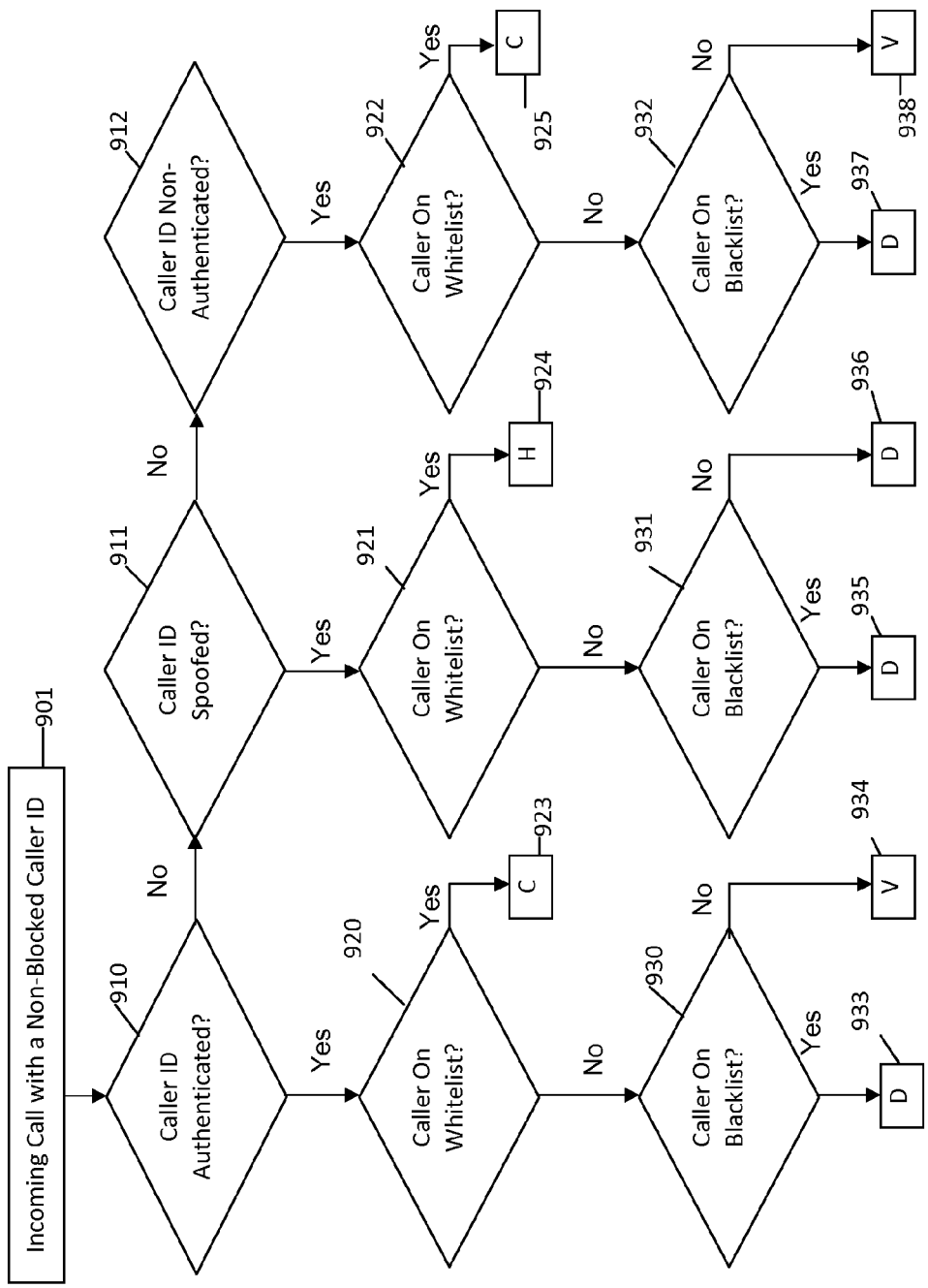
FIG. 9A shows, by way of example, the flow chart that is used to handle calls with non-blocked caller ID's by the authentication device.

If the authentication device is implemented as a software program running on a smartphone for instance, then the user may add a number to the blacklist by pressing a button on the call screen, before, during or after the call has ended. Such a button may be in the form of a thumbs down button, to indicate that the user does not wish to receive calls from the caller again. A thumbs up button may be provided to allow for the user to place the caller ID on the whitelist manually. If the user does not press any button, then the call is handled as a graylisted number until it is automatically put on the internal whitelist or; automatically or manually placed on the blacklist at a later time.

c) Authentication Device Call Control and Internal Graylisting for a Non-Blocked Caller ID's (FIG. 9A)

First, call handling with respect to non-blocked caller ID's will be presented, then call handling with respect to blocked caller ID's will be elaborated. The authentication device has 2 compiled lists, an internal whitelist and an internal blacklist. Any incoming call number that is on the internal whitelist and the caller's caller ID is authenticated, the call is allowed to ring the customers' phone. Any incoming call that is on the internal blacklist and the calls caller ID is authenticated it not allowed to ring the customers' phone. If an incoming call is not on either the internal whitelist or blacklist, but the caller ID of the caller can be authenticated (authenticated caller ID prefix "[A]"), the customer can choose to have those calls handled as a graylisted number. A graylisted number is any number not on either a whitelist or a blacklist. A graylisted number, at the choosing of the customer, may be connected to the customer directly, after which it can be put on the internal blacklist or internal whitelist by the authentication device. A graylisted number may also be forced to verify that the caller is a human or be forwarded to voicemail. The human verification can consist of the authentication device picking up the call, without ringing the customers' phone. The called authentication device can play a message that verifies that the caller is human by requiring a correct answer. The answer by the caller can be input through a touch-tone phone. Human verification can consist of asking a question such as a math question. A sample math question can consist of "what is two times two?". The caller would then have to press 4 on a touch-tone phone as the correct answer and to pass the human verification test. Another type of question could be a math question with a knowledge component, such as what is two times the number of wheels on a motorcycle?". This question requires both math and knowledge. Such questions could be uploaded from a central server, preferably such as the authentication server or the global list server (as will be disclosed shortly) or any other server. The uploading of the questions and answers from a central server on a regular basis would ensure that new questions can be introduced to calling systems and calling system would not be able to circumvent and recognize such questions autonomously. The ultimate purpose of such questions is to verify that a human is calling rather than an automated caller, such as robocallers or automated telemarketers. Once the human verification test is passed by the caller, the call is allowed to ring the customers' phone. If the human verification test is failed, the call could be dropped or forwarded to voice mail. If an incoming call is not on either the internal whitelist or blacklist, and the caller ID of the caller cannot be authenticated (irresolute caller ID prefix "[I]"), the customer can customize how those calls are handled. If an incoming call is not on either the internal whitelist or blacklist, and the caller ID of the caller is determined to be spoofed (spoofed caller ID prefix "[S]"), the customer can customize how those calls are handled, but mostly likely will choose it to be handled as a blacklisted number.

In the previous embodiments, the authentication device modified the caller ID of the caller to indicate the authentication status, such as "[A]", "[S]" or "[I]". The authentication device can further modify the caller ID of an incoming call to indicate which list the number is currently belongs to. For example, if a calling number is both authenticated and is on the internal whitelist, then the caller ID can be modified with the prefix "[W-A]", to indicate the caller is on the internal whitelist and is authenticated. Likewise, the caller can indicate a caller's number is on the whitelist, blacklist, or graylist with the prefixes "[W]", "[B]", "[G]". Since blacklisted calls will almost always be dropped, the called user will likely never see a caller ID with the prefix "[B]". Therefore, there are a total of nine combinations of caller ID prefixes that can be applied to a caller's caller ID, which are "[W-A]", "[W-S]", "[W-I]", "[B-A]", "[B-S]", "[B-I]", "[G-A]", "[G-S]", "[G-I]".

The customer can specify how calls are handled based on the combination of caller ID authentication status and which list the call number is currently stored in. There are three possible caller ID authentication statuses, namely; authenticated, irresolute, and spoofed. And there are three possible lists that a caller number can be on, whitelist, blacklist and graylist. Thus there are a total of 9 combinations of call handling options. These 9 call handling options can be set by the authentication device manufacturer. And the customer of the authentication device may choose to modify these call handling options.

FIG. 9A shows, by way of example, the flow chart that is used to handle calls with non-blocked caller ID's by the authentication device. Once a call is received in step 901 by the authentication device, the call is intercepted. The caller ID of the intercepted call is determined and authenticated against the authentication server, according to the previously described embodiments. If the caller ID is determined to be authentic in decision step 910 the process moves to the next decision step 920. The decision step 920 checks if the authenticated caller ID number is contained in the internal whitelist. If so, the process moves to step 923 and the call is connected to the user's phone. The connection to the user's phone is made by the authentication device ringing the user's phone and sending the modified caller ID which indicates that the caller is on the internal whitelist and has an authentic caller ID. The prefix added to the caller ID would be "[W-A]". If the caller ID number of the caller was not on the internal whitelist, the decision step 920 would proceed to decision step 930. The decision step 930 would determine if the caller ID number is contained in the internal blacklist. If the number is determined to be on the internal blacklist, then the decision step 930 would proceed to step 933. In step 933, the call would be dropped. Dropping the call would consist of the authentication device not ringing and not connecting the call to the user. Dropping the call could also consist of the authentication device picking up the phone and hanging it up. Dropping the call could also consist of a message played to the caller that the called party does not wish to receive calls from the caller. Dropping the call could also consist of a message played to the caller that the line has been disconnected, in other words misrepresenting the telephone line status in order to persuade the caller not to call the number. Dropping the call could also consist of certain tones being played to the caller, such as a disconnected tone.

The rest of the steps in FIG. 9A will not be explained in detail. The remaining steps presented in FIG. 9A are self evident and can be followed by a reader trained in the art. Steps with the letter "C", such as step 923 signify connected calls. Steps with the letter "H", such as step 924, signify calls that will be subject to human verification by the authentication device. Steps with the letter "V", such as step 934, signify calls that will be forwarded to voice mail, by the authentication device. Steps with the letter "D", such as step 933, signify calls that will be dropped by the authentication device.

Figure 9B:
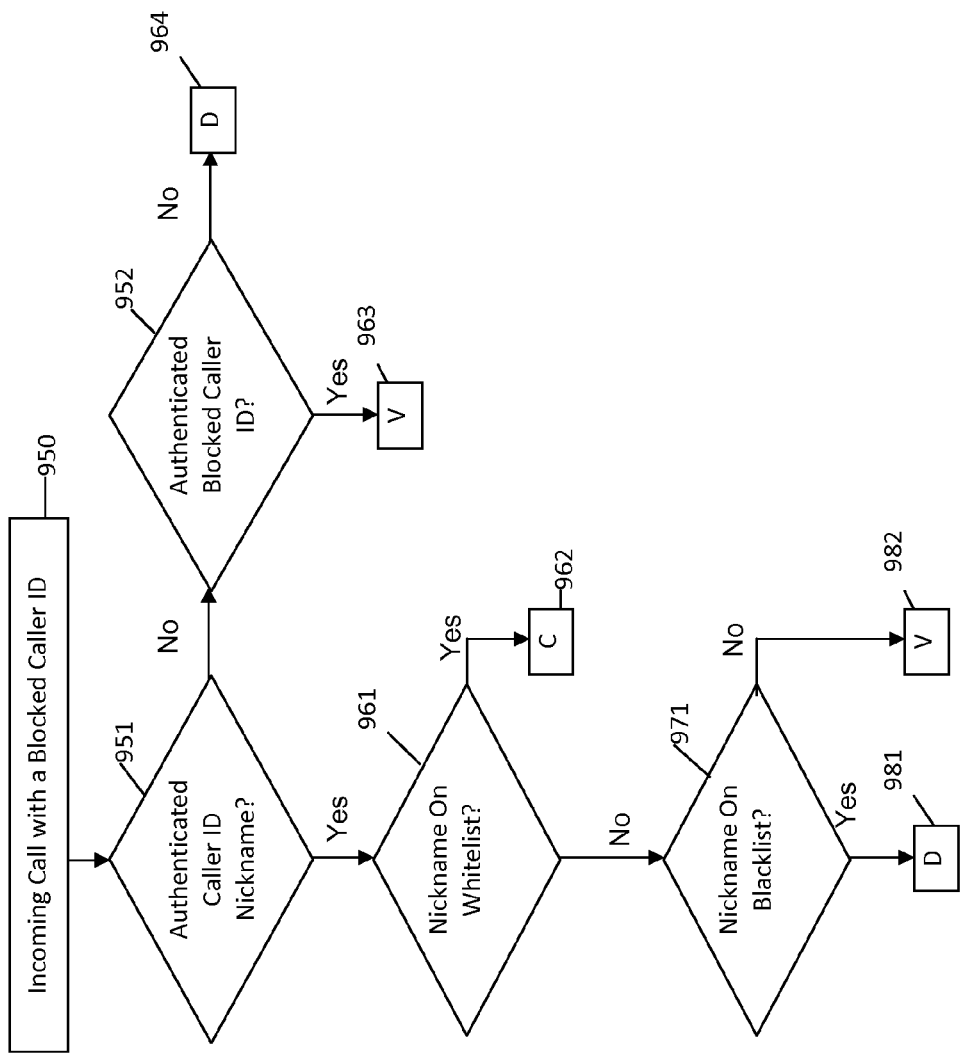
FIG. 9B shows, by way of example, the flow chart that is used in handling incoming calls with blocked caller ID's by the authentication device.

The flowchart shown in FIG. 9A is given as an example only, and the manufacturer or the end user of the authentication device may wish to change how some calls will be handled depending on the caller ID authentication status and the list the calling number is contained in. However, the central premise of this embodiment of the invention is allowing authenticated whitelisted numbers to ring the customer phone number, as shown in step 923 of FIG. 9A. And authenticated blacklisted number to be dropped and prevented from ringing the customer phone and bothering the customer, as shown in step 933 of FIG. 9A. And having an authenticated call that is either not on the whitelist or blacklist be treated as a gray number, where the treatment of the gray number is definable by the customer. In the embodiment shown in FIG. 9A, such a gray number is chosen to be subject to human verification. Thus, the authentication device is able to handle incoming calls based the combination of caller ID authentication and the list the calling number is contained in.

d) Authentication Device Call Control and Internal Graylisting for a Blocked Caller ID (FIG. 9B)

FIG. 9B shows the flowchart an exemplary embodiment of the invention uses in handling incoming calls with blocked caller ID's. FIG. 9B is shown as an example, the specific options for handling incoming calls with blocked caller ID's may be modified by the customer or the telephone service provider as seen fit.

When a call is received by the called authentication device, the call is checked to see if the caller ID of the call is blocked. If so, the process proceeds to step 950. After step 950, the process moves to decision step 951. Decision step 951 determines if the authenticated caller ID is in the form of a caller ID nickname. If so, the process moves to step 961. The decision step 961 checks to see if the caller ID nickname of the incoming call is contained in the internal whitelist. If so, the process moves to step 962 and the call is allowed to ring the customer phone. If the caller ID nickname is not on the internal whitelist, the process moves to step 971. The decision step 971 checks to see if the caller ID nickname is on the internal blacklist, if so the process moves to step 981 and the call is dropped. If the nickname is not on the blacklist, the process moves to step 982 and the call is sent to voicemail by the authentication device.

Figure 10A:
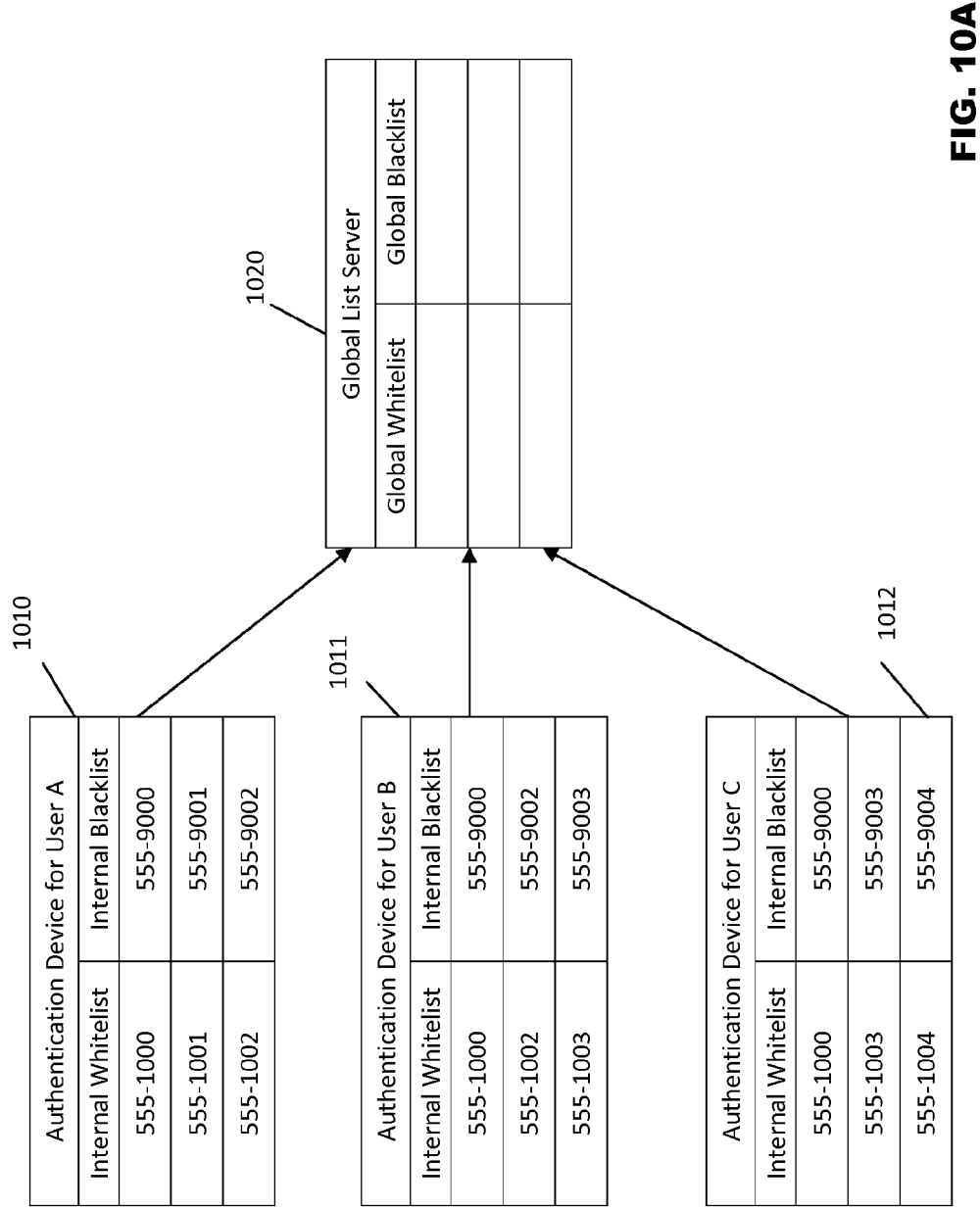
FIG. 10A shows, by way of example, the internal lists maintained by the authentication device and the global lists maintained by the global list server.
Figure 10B:
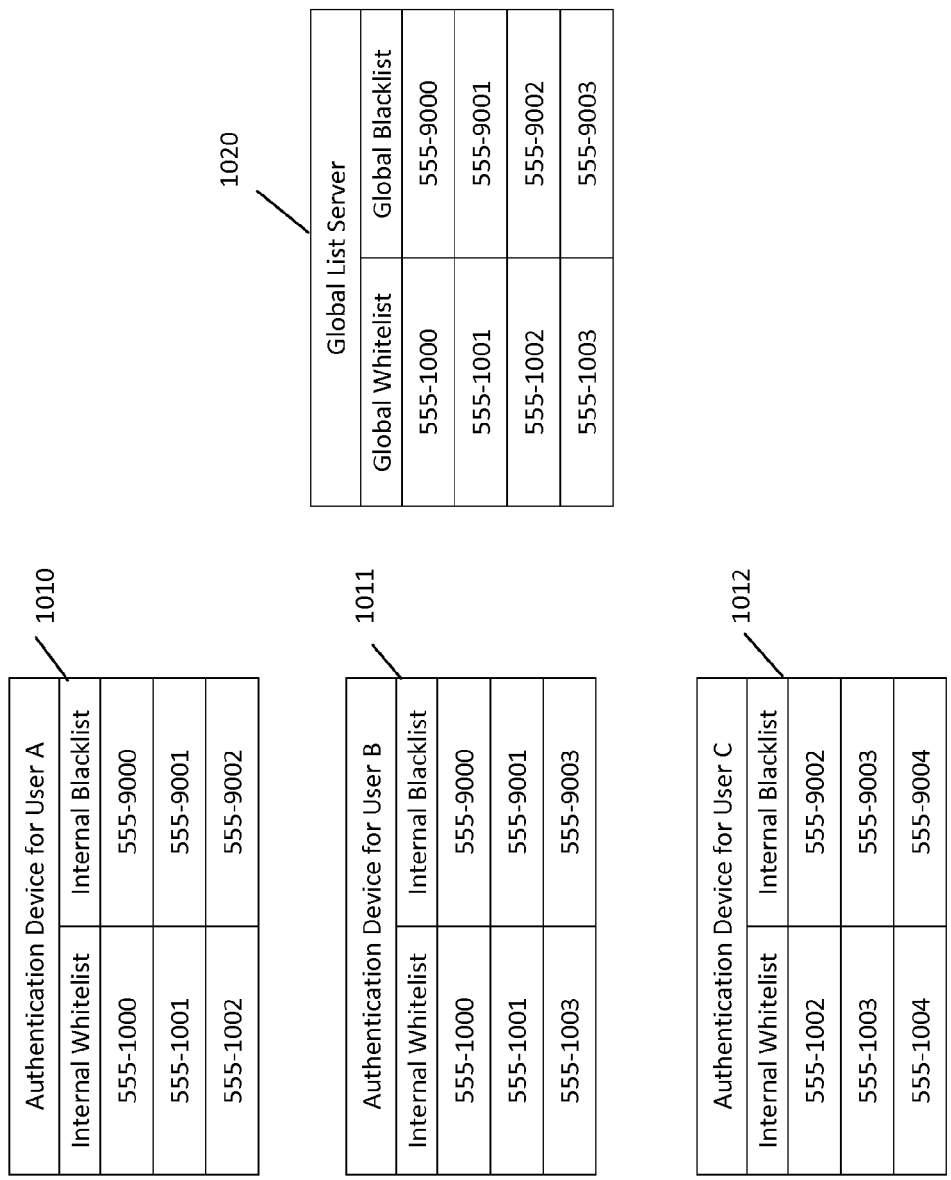
FIG. 10B shows, by way of example, the state of the global list server after the internal lists of the authentication devices are uploaded to the global list server.

If the incoming call is did not have a caller ID nickname, the decision step 951 would have branched into step 952. The decision step 952 checks to see if the caller ID is blocked but is authenticated. If so, the process moves to step 963 and the call is sent to voicemail by the device. If the caller ID had not been authenticated, the decision step 952 would have branched into step 964 where the call would be dropped by the device.

e) Authentication Device Global Lists (FIG. 10A-FIG. 10B)

i) Constructing the Global List Through Internal Lists

In another embodiment of the current invention, the authentication devices of each user help compile a global whitelist and a global blacklist. Since the authentication device would be installed on each phone line of many users, it becomes possible to aggregate each user's internal whitelist and blacklist into a global whitelist and blacklist. If a phone number is on more than a certain number of authentication devices internal whitelists, that number can be deemed to be trustworthy to all customers. Therefore, it would be safe to add such a phone number to the global whitelist. An example of such a phone number could belong to a bank. Likewise, if a phone number is on more than a certain number of authentication devices internal blacklists, that number can be deed to be untrustworthy to all customers. Therefore, it would be correct to add such a phone number to the global blacklist. An example of such a phone number could belong to a problematic telemarketer. If the telemarketer's phone numbers is on a certain number of authentication devices blacklists, then that number can be put on a global blacklist.

For the purpose of aggregating and maintaining global lists, a global list server is required. The global list server is accessible by the authentication devices, preferably over a data connection such as the internet. The authentication devices may be able to access the global list server through the same connection as the authentication server. The functionality of the global list server may be integrated into the authentication server. The global list server maintains a database of numbers, a global whitelist, and a global blacklist. The global list server also has logic to aggregate received numbers from the authentication devices and place them on the appropriate lists based on a predetermined algorithm. Alternatively, the global list server can also maintain the internal lists of authentication devices.

The global list server can also use intermediary lists for the purpose of aiding which numbers are added to the global lists. For example, the global list server can place all uploaded internal whitelist numbers from the authentication devices in an intermediate whitelist. The global list server may place additional uploaded internal whitelists in the intermediate whitelist as they are uploaded throughout the day. At the end of each day, month or year, the global list server may then choose which number from the intermediary whitelist to nominate to the global whitelist.

Thus, for each incoming call, the authentication device can check if the calling number is on an internal whitelist or internal blacklist. If so, the authentication device can handle the call as described in the previous embodiment. If the calling number is not on an internal whitelist or internal blacklist, the authentication device can query the global list server. If the calling number is on the global list server's global whitelist, the call may be accepted. If the calling number is on the global list server's global blacklist, the call may be rejected. If the calling number is not on the global list server's global whitelist or blacklist, the number can be treated as a gray number. The gray number can thus be handled according to preset rules.

FIG. 10A shows, by way of example, an embodiment of the current invention. FIG. 10A shows the internal whitelists and blacklists for three user authentication devices. The authentication device for user A 1010 has an internal whitelist with three numbers. These three numbers would have been automatically added to the internal whitelist by the authentication device. The first number 555-1000 for example, could have been added by the authentication device to the internal whitelist because user A dialed that number more that a certain number of times, such as dialed 555-1000 more than three times. The second number 555-1001 for example, could have been added by the authentication device to the internal whitelist because user A received calls by that number more than a certain number of times, such as 555-1001 called the user more than three times. Telephone numbers are only added to the internal whitelist if the user does not indicate such a number to be blacklisted. FIG. 10A shows the telephone number 555-9003 to be on the authentication device for user B 1011, internal blacklist. The telephone number 555-9003 would have been added to the internal blacklist manually by the user through entering in the appropriate star code during or after receiving a call from such a number. At regular intervals, such as every hour, six hours, or day, each authentication device for each user uploads its' internal lists to the global list server. Instead of uploading at regular intervals, the authentication devices may upload its' lists every time a new telephone number is added to a list, or every time a certain numbers of telephone numbers are added to its' list. The global list server receives the internal lists of each authentication device and aggregates and populates them into the appropriate global whitelist and global blacklists. A telephone number is placed into the global whitelist if it is contained and is received from a certain number of authentication devices internal whitelists. Likewise, a telephone number is placed into the global blacklist if it is contained and is received from a certain number of authentication devices internal blacklists. FIG. 10A shows the authentications devices of user A 1010, user B 1011 and user C 1012 transmitting the internal list to the global list server 1020. As can be seen, the global list server maintains a global whitelist and a global blacklist. In the shown example, the global lists are empty. In FIG. 10B, the global list server 1020 aggregates the received internal lists and populates the global lists. In example of FIG. 10B, a telephone number on more than 2 users authentication device lists are placed into global list. However, as is apparent to the reader, the threshold for placing telephone numbers into the global list can be any number, as seen fit, such as 2, 4, 100, etc. Instead of choosing a threshold number, the threshold can be a percentage. Such a percentage can be in the form of; if a telephone number is in the internal whitelist of 10% or more of all the users' internal whitelist, the telephone number would be placed into the global whitelist by the global list server. Returning to FIG. 10B, the example used the number 2 as the threshold for placing a telephone number into the global list. From FIG. 10B, it can be seen that the telephone number 555-9003 has been placed into the global blacklist. The reason 555-9003 was placed into the global blacklist is because that number is contained in user B's internal blacklist, and user C's internal blacklist. Since the number of internal lists the telephone number is contained in is equal to the predetermined threshold, the telephone number is placed into the appropriate global list. The predetermined threshold for placing telephone numbers into the list can be the same threshold for both whitelists and blacklist or different. Such as telephone numbers on 10% or more internal whitelists are added to the global whitelist, but telephone numbers on 20% or more internal blacklists are added to the global blacklist.

One issue with blacklists is to when and how to remove a certain number from the blacklist. For instance, if a telemarketer's phone number is placed on a blacklist, the telemarketer can close the number. The blacklisted number can then be assigned to a residence by the telephone company. In such cases, the residence can have a hard time contacting individuals or companies since the number maybe on internal, private or global blacklists. With regards to globally blacklisted numbers, the numbers could be put on probation after a certain amount of time has passed since they were put on the global blacklist. When the number is put on probation, the number would be taken off the global blacklist, private blacklists, and the global list server would instruct the number be removed from all internal blacklists. The probation status of the number would mean that if a certain number or percentage of user's placed the number on their internal or private blacklists, it would be put back on the global blacklist. And the threshold for putting a number on probation back on the global blacklist would be much lower than a number not on probation. For instance, if the requirement for being put on a global blacklist was being on more than 20% of internal or private blacklists, then the threshold for being put back on the blacklist for a number on probation could be 2%. If the threshold for the number on probation to be put on the global blacklist is exceeded, such as more than 2% of users put the number back on their internal or private blacklist, then the number would be put back on the global blacklist. If the threshold has not been passed while the number is on probation and after a certain period on probation, the number is taken off the probation status and treated like any other number with respect to threshold for being put on global white or black list. A similar methodology could be used for internal or private blacklisted numbers not on the global blacklist. After a certain period of time, a blacklisted number can be automatically taken off the internal or private blacklist. The user can be allowed to determine the time period, or asked to verify that the blacklisted number be taken off the list. Such methodologies are not necessary with respect to internal or private or global whitelists since as soon as a whitelisted number becomes problematic, those numbers would be placed on internal or private and possibly global blacklists through already described methods.

ii) Compiling the Global Whitelist Through Call Tally

In conjunction to compiling the global whitelist through aggregating internal whitelists, the authentication server can keep a tally of calls being made to a telephone number, and if the number of calls exceeds a certain threshold, that number can be placed on the global whitelist.

Figure 11A:
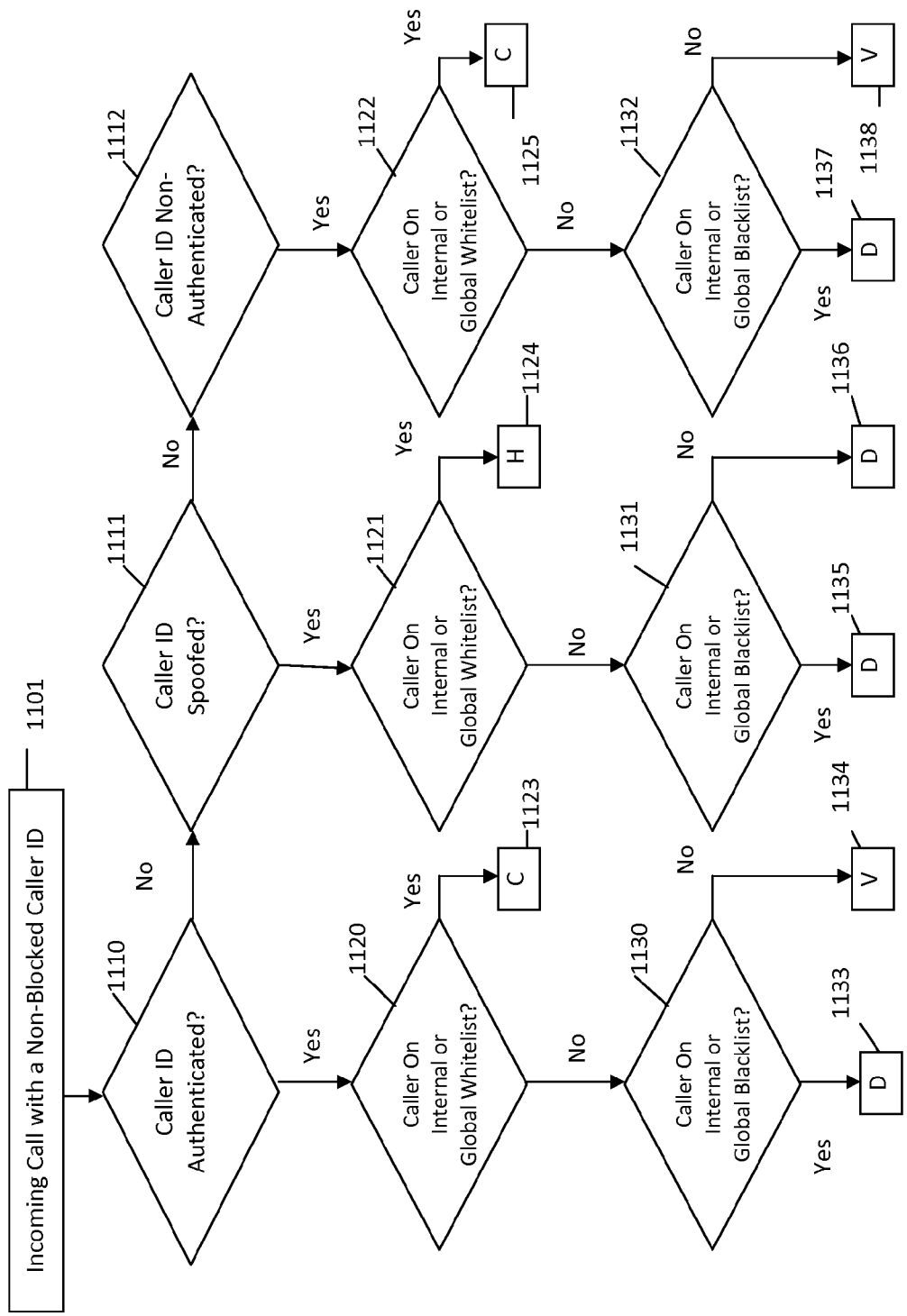
FIG. 11A shows, by way of example, the flowchart that is used to handle calls with non-blocked caller ID's by the authentication device utilizing both global and internal lists.
Figure 11B:
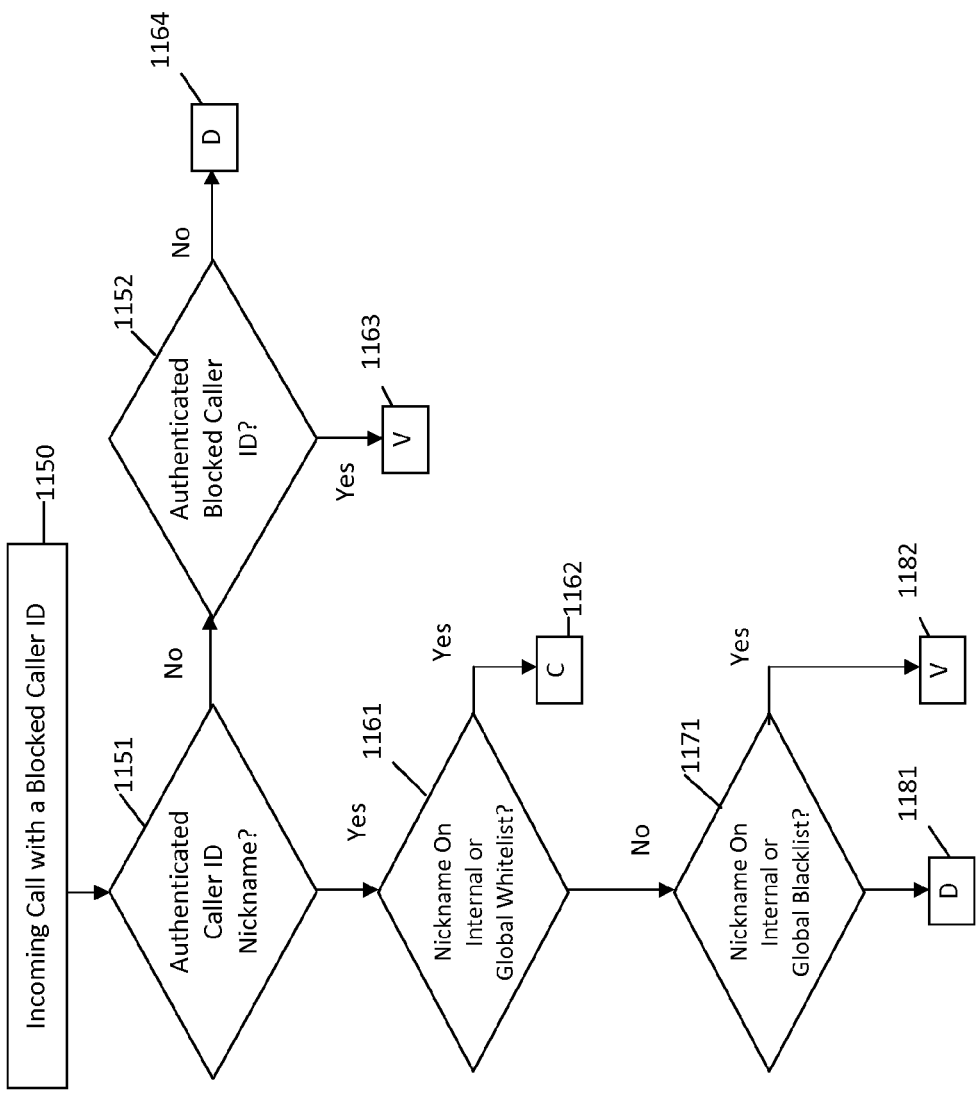
FIG. 11B shows, by way of example, the flowchart that is used to handle calls with blocked caller ID's by the authentication device utilizing both global and internal lists.

The reason being that callers would not regularly place calls to a blacklisted number. The authentication server can determine the threshold through a blind tally of calls having been made to that number. Or the server can determine the threshold as number of unique callers who have made a call to that number. The threshold can be a total number, such as 1000 calls made to that number. Or the threshold can be time based, such as 100 calls per day, or 100 calls average per day during the past month. A separate threshold can be used to remove a number from the whitelist, such as if less than 10 call per day are being made to that number. The threshold can also take into account the number of calls made to a telephone number from callers with authentication devices versus those without. Likewise, the authentication server can keep a tally of calls that have been received by a telephone number and place the telephone number in the global whitelist if the amount of calls received passes a threshold. The number of calls being made to a telephone number and being received by that number would not necessarily be equal since there might be callers who do not have authentication devices installed. Alternatively, the tally might consist tallying caller telephone numbers which have been authenticated, and placing such numbers within the global whitelist if the tally exceeds a certain number. Similar to the previously given tally examples, the tally may only take into account authentic caller telephone numbers which have been placed to unique called numbers, such that two calls from an authentic caller number to the same called number would only be counted once.

j) Call Handling with Global Lists (FIG. 11A-FIG. 11B)

After a global whitelist and global blacklist has been compiled, call handling by the authentication device is done through both the internal lists and global lists. As was explained in Section (9c), the device handles calls through internal lists. If a device receives an incoming call which is not on any internal list, the authentication device may query the global list server to check if the number is on any global lists. The query may consist of simply sending the caller ID of the caller and the server replying with the corresponding global list identifier the number is on. After the authentication device queries the server to check if a number is on the global lists, the call can then be handled based on which global list the number is on.

Alternatively, if the authentication server and the global list server are integrated within the same server or are able to communicate with each other, the global list identifier, such as global whitelist or blacklist, may be sent by the authentication server when replying to caller ID authentication requests. For example, if the authentication server is replying with an authenticated message, the global list of the caller number may be indicated thus so; "AUTHENTICATED-[Caller:555-1000, Caller List: Global Whitelist, Called:555-2000]". The "Caller List:Global Whitelist" would indicate that the caller with the 555-1000 number is currently on the global whitelist. The authentication device can then handle the call appropriately knowing which global list the calling number is on.

FIG. 11A shows, by way of example, the flowchart that is used to handle calls with non-blocked caller ID's by the authentication device. FIG. 11B shows, by way of example, the flow chart that is used to handle calls with blocked caller ID's by the authentication device. The FIGS. 11A and 11B are similar to FIGS. 9A and 9B explained in Sections 9-C and Section 9-D. The only differences are that the decision steps in FIGS. 9A and 9B which checked if a certain number was on a certain internal list have been updated to check if they are also on a certain global list. For instance, in FIG. 9A the decision step 920 checked if an authenticated caller ID was on the internal whitelist and the call was handled appropriately. In FIG. 11A, the decision step 920 from FIG. 9A is replace by decision step 1120. Decision step 1120 is updated to take into account that a number can either be on the internal whitelist or on the global whitelist. In the example given in FIG. 11A, numbers that are on either the internal and global whitelist are handled the same. However, it should be understood that they could be treated differently. Such that a number on the internal whitelist is allowed to connect to the customer phone, while a number not on the internal whitelist, but on the global whitelist is put through to voice mail. Thus a call may be handled based on the combination of internal lists, global lists, and authentication status of the calling party. The rest of FIGS. 11A and 11B is self explanatory and will not be elaborated in detail.

One issue that might arise when handling calls based on both internal and global lists is which lists take precedence. For instance, if a number is on the internal blacklist but is also on the global whitelist. In such a case, the internal blacklist would preferably take precedence over the global whitelist, and the call would be handled as an internal blacklisted number. Call handling with regards to list precedence could be configured by the telephone provider, authentication device maker, or the customer as seen fit.

Figure 12:
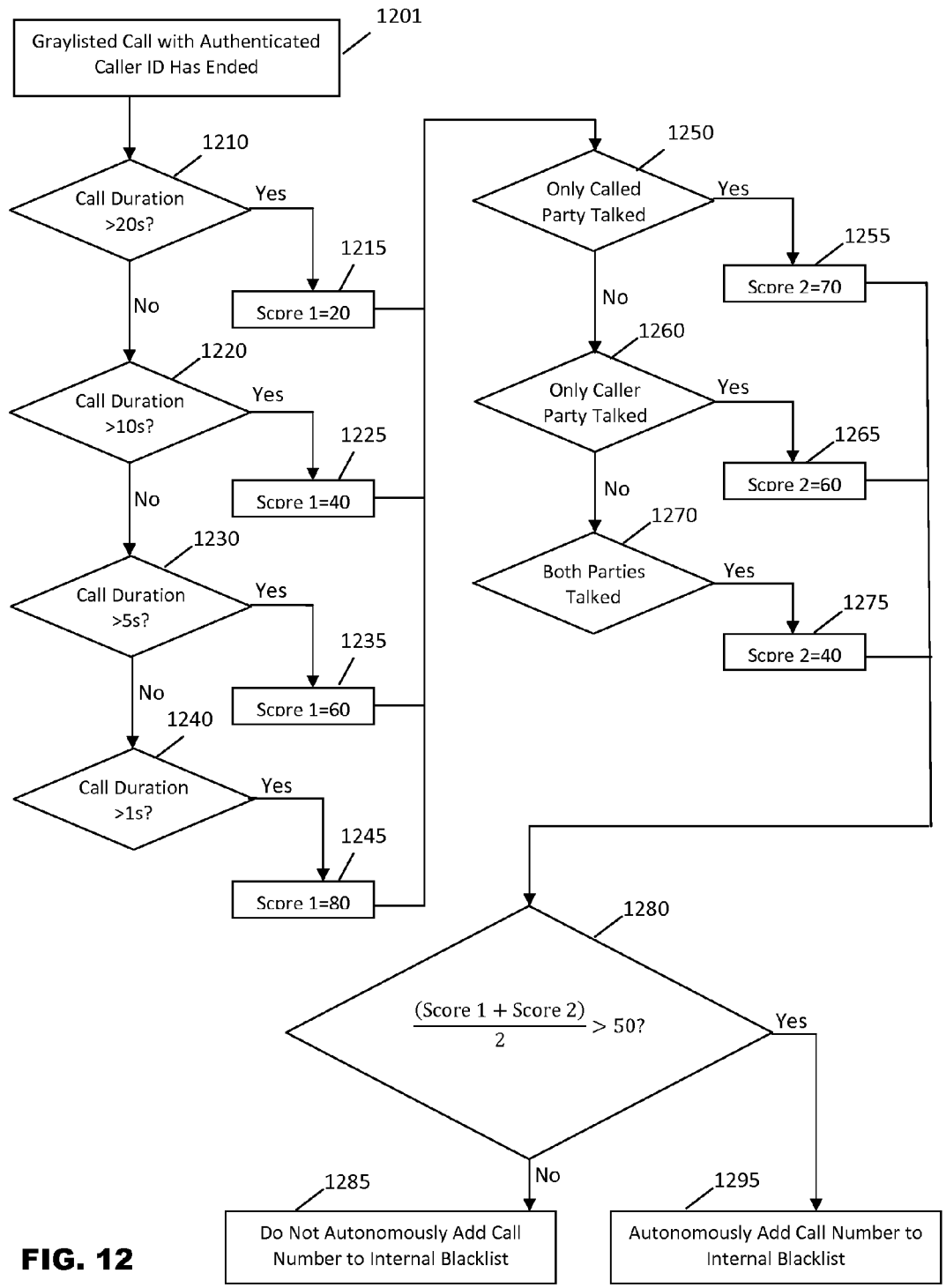
FIG. 12 illustrates, by way of example, the flowchart used in adding an incoming telephone number to the internal blacklist of the called authentication device autonomously.

In Section (9-c), there were a total of 9 call handling options. With the introduction of global lists, three more lists are introduced. Thus there are internal white, black and gray lists, and in addition global white, black and gray lists. Therefore, there are 3 internal lists, 3 global lists, and 3 authentication combinations. The total number of call handling options is 3 to the power 3, which is 27. For example, an incoming telephone number could be authenticated, on the internal graylist, and on the global whitelist. Or an incoming telephone number could be authenticated, on the internal whitelist, and on the global graylist. The telephone customer or the authentication device manufacturer may adjust how calls are handled in each of the 27 combinations. There are however some redundant combinations, such as an incoming telephone number could be spoofed, on the internal blacklist, and on the global graylist. In the example of a spoofed number, the combinations of internal and global lists would likely not affect the handling of the call since if the number is spoofed it would most likely be handled regardless of the internal or global lists.

k) Autonomous Determination of Blacklisted Numbers (FIG. 12)

Incoming calls can also be added to the internal blacklist by the authentication devices autonomously. An autonomous blacklist determination of an incoming call can consist of the duration of the call. For example, if a number calls, and the customer picks up and hangs up within a short period of time, such calls may be inferred as a nuisance call and a call which the customer does not wish to receive. Another autonomous determination metric of a blacklisted call can be which party talked the most during the call. For example, if a call is received by the customer, and the caller talked most of the time and the customer only said "Hello", then such a call may be inferred as robocall or an automated message call. Another autonomous determination metric of a blacklisted call can be which party was talking when the call was hung up. For example, if a call is received and the customer hangs up the call while the caller is still talking, then it may be inferred that this is a call the customer does not wish to receive in the future. Another autonomous determination of a blacklisted call can consist of voice recognition. For example, if the called party says "Not interested" before hanging up, this call can be inferred as a telemarketing call by the device. Likewise, recognizing, through voice recognition, certain keywords spoken by the caller and the called parties, a call may be determined to be a blacklisted number. Therefore, autonomous determination metrics can include call duration, called party total talk time, called party total talk time as a percentage of call duration, caller party total talk time, called party total talk time as a percentage of call duration, which party was talking when the call was hung up, keywords spoken during the call, and which party spoke certain keywords. The autonomous determination metrics can also include which parties were talking in which portion of the call, such as if the caller was talking during the first half of the call, or the called party talking during the last half of the call, and so on.

The authentication device would have the necessary combination of hardware and software to measure the metrics described herein for the purpose of autonomously blacklisting a certain call. For example, the call duration metric can simply be measured by the authentication device starting a timer when a call is picked and stopping the timer when the call is hung up. Similarly, other metric can be measure through systems and methods known in the art.

Using such metrics, the authentication device may autonomously add calls to the internal blacklist. The determination that a call is to be placed on the internal blacklist can consist of several metrics used in combination. Such metrics can be individually combined through a score system. Each metric can be assigned a score from 0 to 100, where 0 is that the call is certain not to be a blacklisted call and where 100 is where the call is certain to be a blacklisted call. If one or more metrics are used, the average score of these metrics computed and if the average score is past a predetermined threshold, the number can be added to the internal blacklist.

FIG. 12 is a flowchart illustrating one example of adding the caller number to the internal blacklist autonomously. The flowchart illustrates the use of two metrics for determining if the caller number should be added to the blacklist. The flowchart is shown as an example only. Adding a called number to the internal blacklist may entail the use of one or more metrics, where each metric and metric criterion is weighted differently, and the resultant formula for weighing each metric may be different that what is presented in the figure. The metrics and the resultant formula would be determined most likely through trial and error, and would likely need to be modified on an ongoing basis to adapt to undesired call behavior. In FIG. 12, the first metric used is call duration, with the metric criterion being the length of the call, namely; 20 seconds, 10 seconds, 5 seconds, and 1 second. The second metric used is which party talked and the metric criteria being; called party talked, caller party talked, or both parties talked. Each of the metric criterions is assigned a score. The determination formula is the average of the two metric criterion scores. The determination formula adds an incoming caller ID to the internal blacklist if the average of the 2 metric scores is greater than the determination threshold of 50. If not, the phone number is not added to the internal blacklist.

Figure 13A:
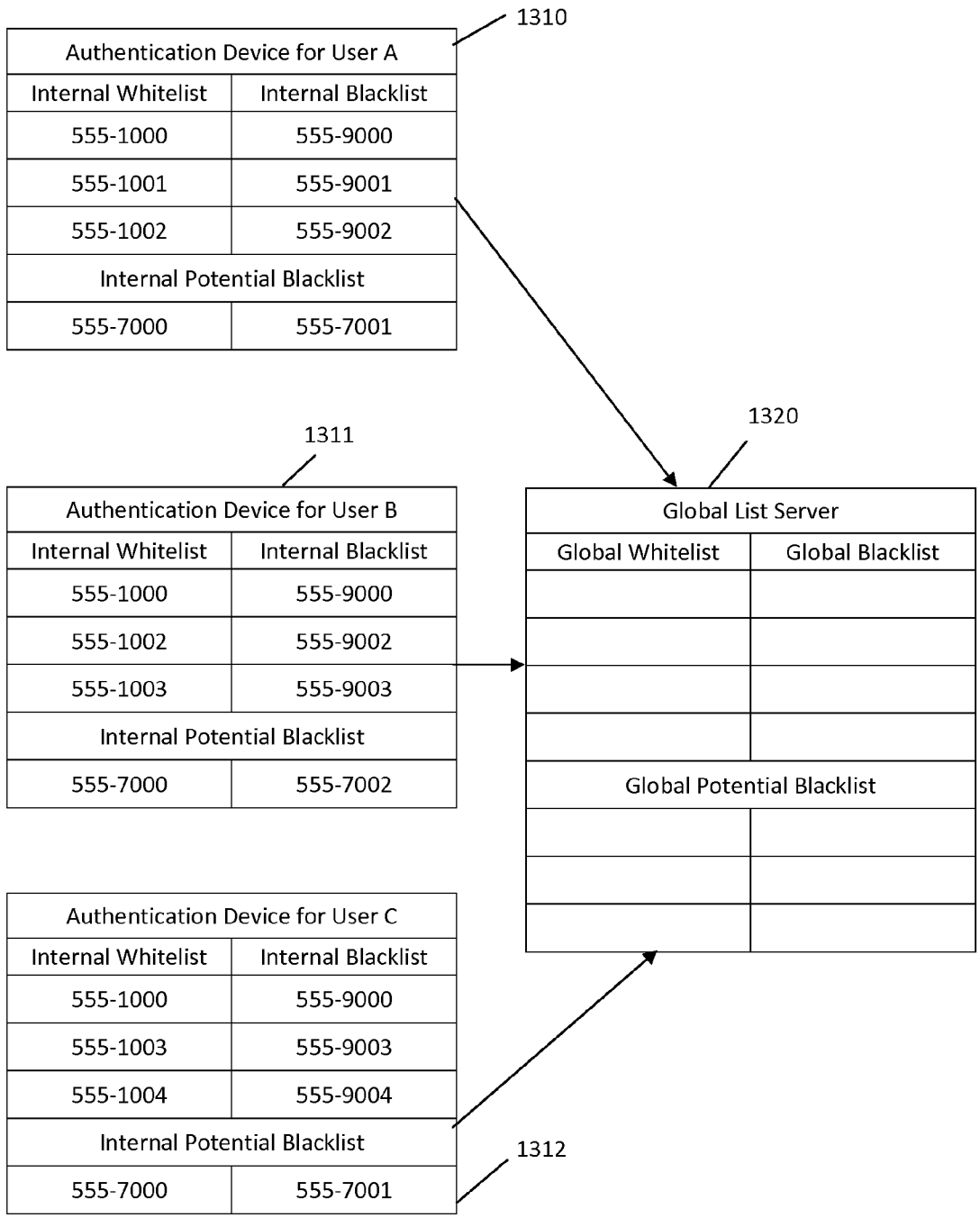
FIG. 13A shows, by way of example, the internal lists and internal potential blacklists maintained by the authentication device, and the global lists and global potential blacklists maintained by the global list server.
Figure 13B:
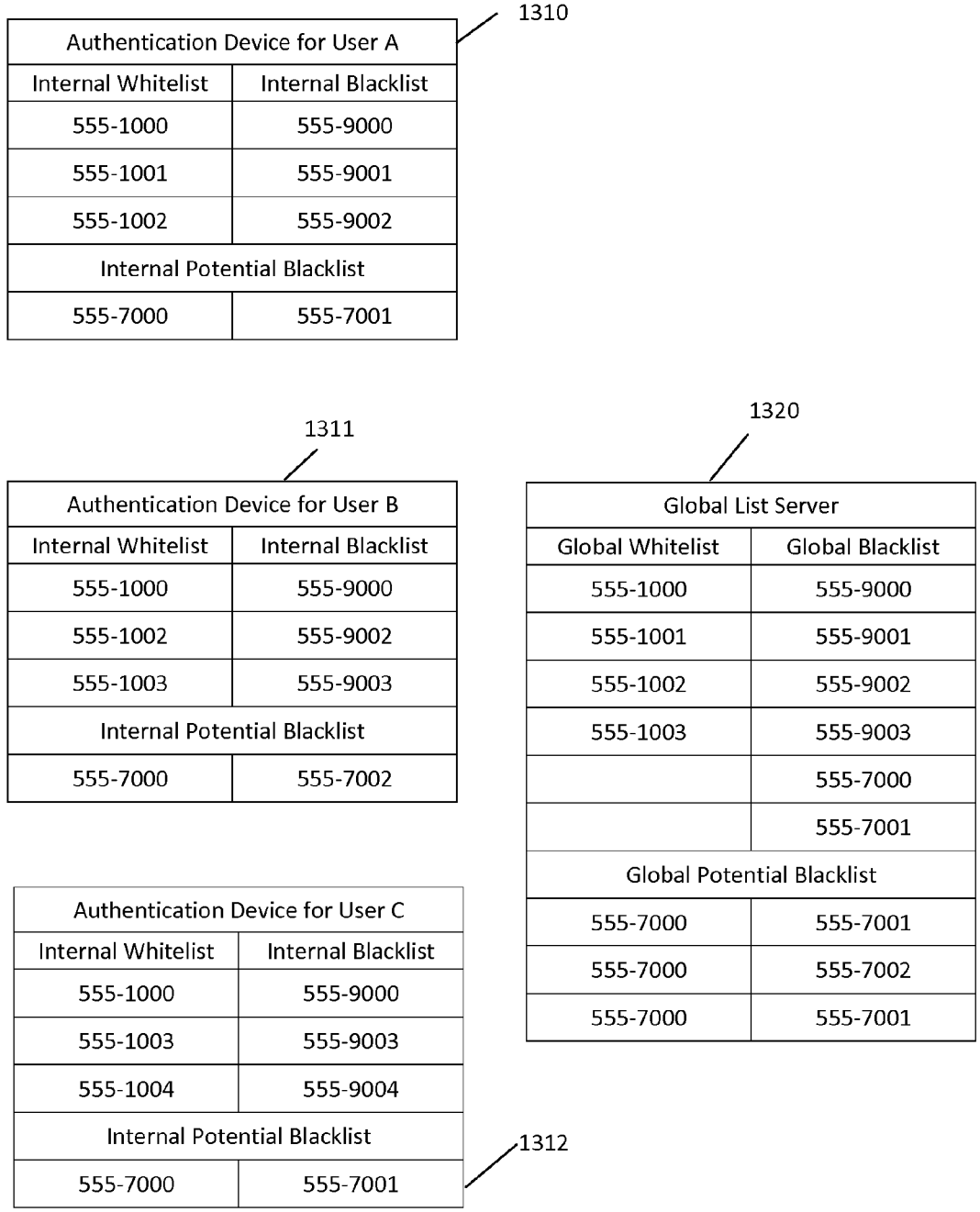
FIG. 13B shows, by way of example, the internal lists and internal potential blacklists maintained by the authentication device and the global lists and global potential blacklists maintained by the global list server after the authentication devices have uploaded their lists to the global list server.

The process of FIG. 12 starts when a call with an authenticated caller ID has ended 1201. The authenticated caller ID may be a call in the form authenticated non-blocked caller ID or an authenticated caller ID nickname. The caller number must preferably be graylisted, in that it is neither on any whitelist or blacklist, whether internal or global. After the call has ended, the process moves through 4 decision steps in measuring the call duration metric. The first decision step 1210 determines if the call has had a duration of more than 20 seconds. If so, the decision step moves to step 1215 where the first score is assigned 20 points. Thus, the call duration metric criterion of a call lasting more than 20 seconds assigns 20 points to the first score. The decision steps 1220, 1230, and 1240 are self explanatory. Each decision step corresponds to a specific call duration criteria metric. If a metric criterion is satisfied, such as a call duration being a certain time, the corresponding score is assigned. One should note that the shorter the duration of the call, the more points the first score is assigned. The reasoning behind this is that the short duration calls have a higher likelihood of being unwanted calls and should be placed on the internal blacklist. The process then moves to the next three decision steps which correspond to the, which side talked metric. The which side talked metric determines which side talked during the call, and each metric criteria assigns a number to the second store. If only the called party talked, as is determined by the decision step 1250, then the process moves to step 1255 and the second score is assigned 70 points. The rest of which side called decision steps 1260 and 1270 are self explanatory. Once all the metric criteria are determined the process moves to the determination formula 1280. In this embodiment the determination formula determines the average of the first score and the second score. If the average is greater than a predetermined threshold, 50 in this instance, the call number is added to the internal blacklist as shown in step 1295. If not, the call number is not added to the internal blacklist, as is shown in step 1285.

l) Internal Potential Blacklist for use with Autonomous Determination of Blacklisted Numbers (FIG. 13A-FIG. 13B)

In the previous section, the authentication device autonomously determined blacklisted numbers and added them to the internal blacklist. However, as one might realize, there might be instances where the autonomous determination of blacklisted numbers would be subject to errors. For example, a call may be received from an automated robocall system from a dentist's office to remind customers of upcoming appointments. The customer might pick up the phone, answer "hello", realize that it is the dentist's office reminding an upcoming appointment, and hang up within 5 seconds. According to the previous embodiment show in FIG. 12, since the call lasted less than 5, the first score is assigned a value of 80. And since both parties were talking, the second score is assigned a value of 40. The average of the two values is 60, which would surpass the predetermined threshold of 50 for placing this call on the blacklist. As the phone number of the dentist's appointment reminder system is placed on the internal blacklist, the customer will not receive further appointment reminders from his dentist. The prevention of such situations will be explored in this section.

One solution to the problem of mistakenly adding numbers to the internal blacklist is to introduce a new internal list. The new internal list would be called an internal potential blacklist. Thus, instead of autonomously placing a number in the internal blacklist, autonomously determined telephone numbers would be placed in the internal potential blacklist. The potential blacklist would contain numbers which are suspected of being blacklisted numbers. The numbers on the potential blacklist would not be subject to call handling procedures. The potential blacklist would only function as an internal storage of numbers. The internal potential blacklisted numbers would then be uploaded to the global list server. The global list server would also have a new list, called the global potential blacklist. Similar to the internal potential blacklist, the global potential blacklist number would not be subject to call handling procedures, and only serves as storage of numbers. The global list server would aggregate all the internal potential blacklists of the authentication devices to the global potential blacklist. If a phone number is on more than a certain number of internal potential blacklists then that phone number can be added to the global blacklist. Any number added to the global blacklist would be treated according to the global blacklist rules. Thus, potential blacklisted numbers compiled by the authentication device may be checked against each other and errors in the system can be reduced.

FIG. 13A and FIG. 13B illustrate, according to one embodiment of the invention, the concept of potential blacklists. FIG. 13A shows three user authentication devices 1310, 1311, 1312 for users A, B, and C, respectively. It can be seen that the three authentication devices have an internal whitelist and an internal blacklist. The concepts of internal whitelists and internal blacklists and how they are populated were discussed previously. The authentication devices also have an internal potential blacklist. The internal potential blacklist contains numbers which have been autonomously identified to be potentially blacklisted numbers by the authentication device. The internal potential blacklist is not used for call handling. The numbers on the internal potential blacklists are uploaded to the global list server 1320. The global list server maintains a global potential blacklist. The global list server receives the numbers from internal potential blacklists from all the users' authentication devices.

FIG. 13B illustrates the result of each authentication device uploading the internal lists to the global list server. The population of the global whitelist and global blacklist were discussed previously. In example of FIG. 13A and FIG. 13B, a telephone number on more than 2 users authentication device lists are placed into global list. The blacklisted number 555-9000, 555-9001, and 555-9002 are added to the global blacklist since they are on more than 2 internal blacklists. In addition, the internal potential blacklists are aggregated by the global list server. The global potential blacklist contains all the aggregated numbers transmitted from the authentication devices internal potential blacklist. In this example, a telephone number on more than 2 internal potential blacklists are added to the global blacklist. Thus, the number 555-7000 and 555-7001 are added to the global blacklist from the global potential blacklist, since two number are on the internal potential blacklists of user A and user C. As was discussed previously with regards to global whitelists and blacklists, the determination of how a number on the global potential blacklist gets added to the global blacklist may be modified as seen fit. For example, a telephone number on global potential blacklisted number may be added to the global blacklist if it is on more than a certain number of internal blacklists, or it is on more than a certain percentage of internal potential blacklists, and so on.

The second solution to the problem of mistakenly adding numbers to the internal blacklist is for the global list server to crosscheck the numbers on the global potential blacklist against the internal blacklists received from the authentication devices. Such a solution would be in addition to the global list server moving numbers from the global potential blacklist to the global blacklist. The global list server may check if a number on the global potential blacklist is on a certain number of internal blacklists uploaded by the authentication devices. If so, the number on the global potential blacklist may be moved to the global blacklist. Thus, by checking the autonomously determined blacklisted numbers against the manually determined blacklisted numbers, the process can be made more robust.

The concept of a potential internal and global blacklist can be similarly applied to whitelists. If a user calls a number once, the number can be added to the internal potential whitelist. The global list server can then aggregate the internal potential whitelists of users, and promote numbers that are on a certain number or percentage of users.

m) Server Determination of Received Autonomous Blacklist Determination Metrics

Figure 14A:
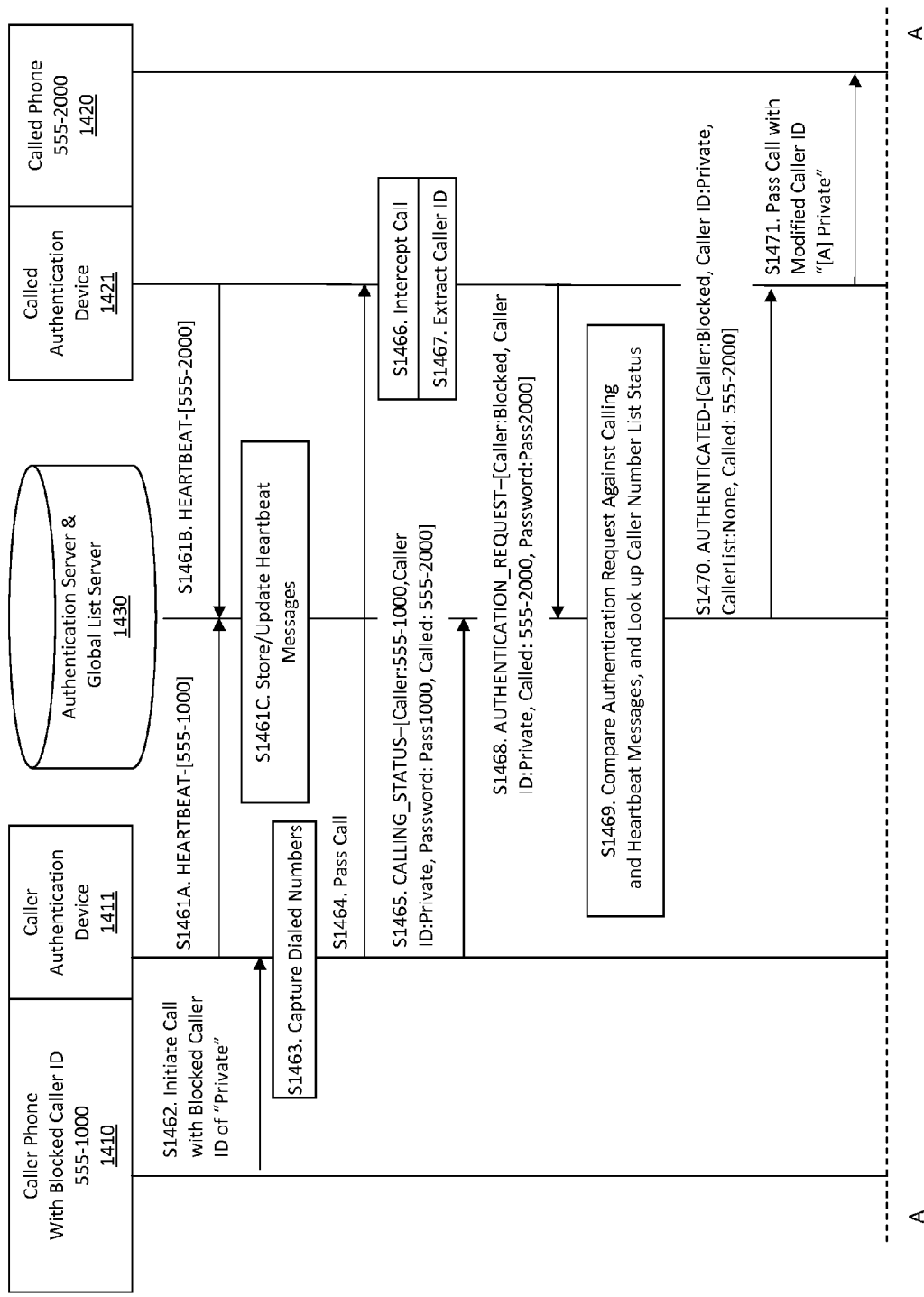
FIGS. 14A-14C, collectively referred to as FIG. 14, illustrates the flowchart and messaging diagram for adding a blocked caller ID to the user's private blacklist, by way of example.
Figure 14B:
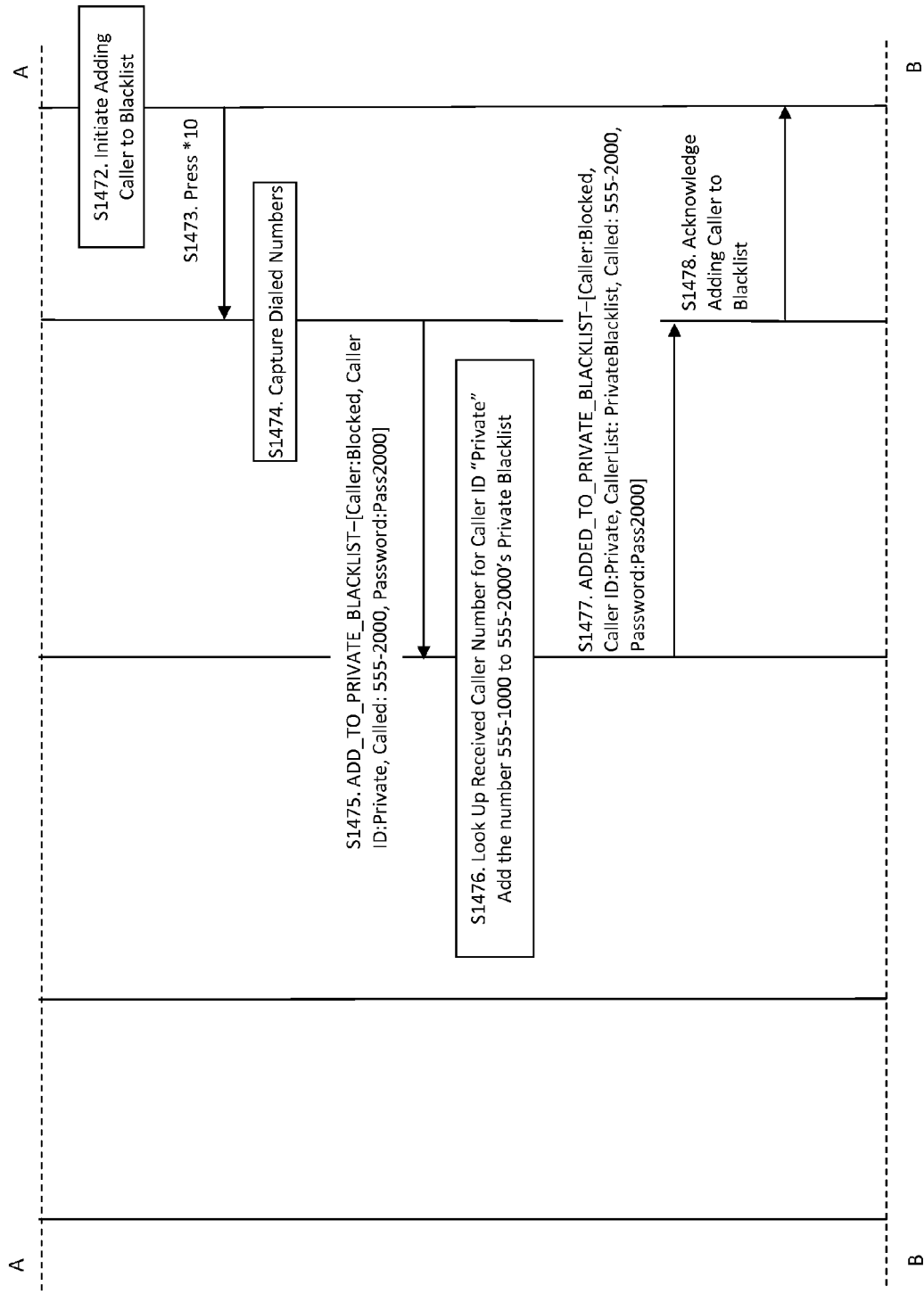
Figure 14C:
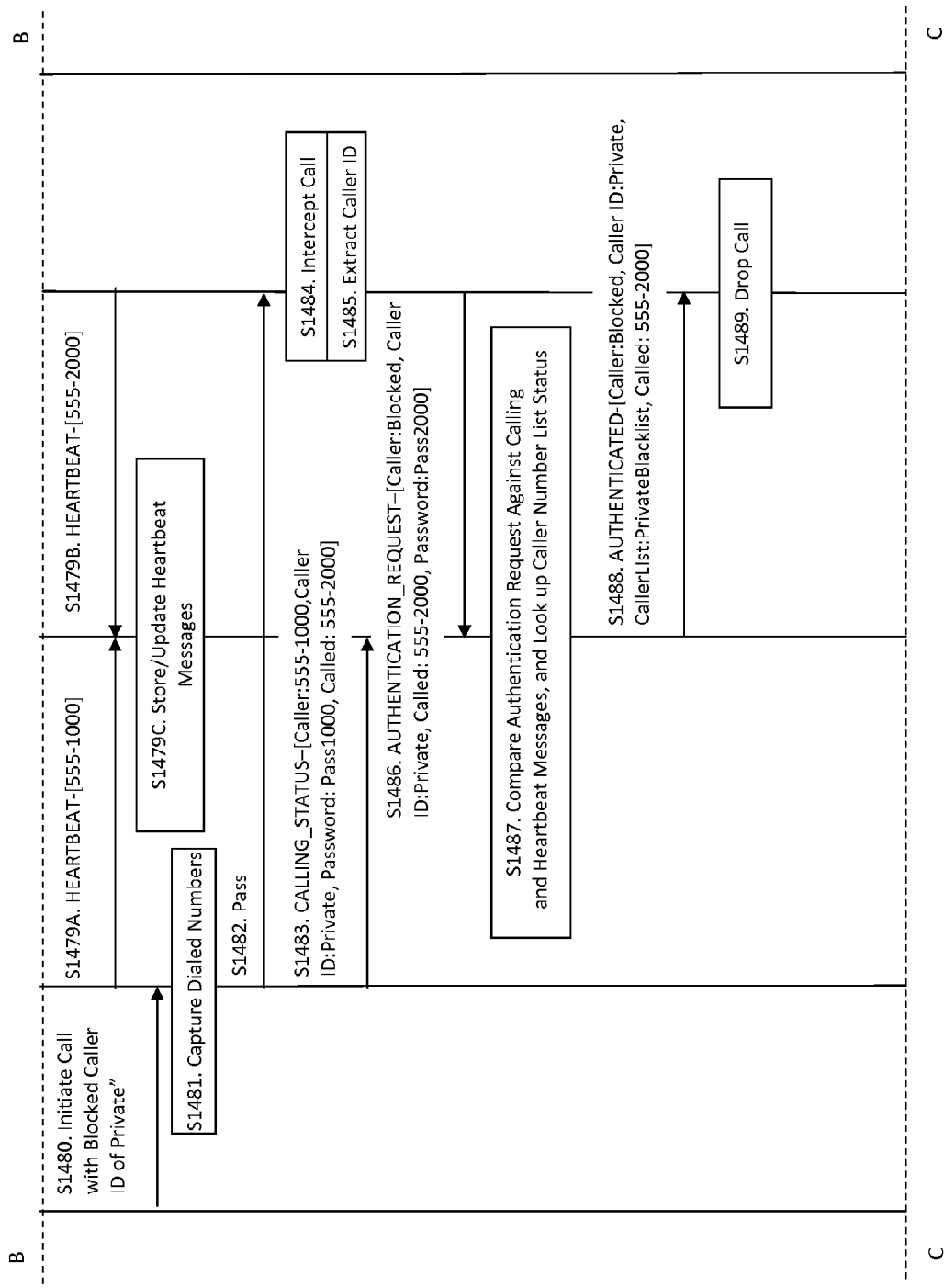

The authentication device can transmit the autonomous blacklist determination metrics, such as call duration, talk time, etc, directly to the authentication server. The server can then aggregate such information and determine if a number should be placed on the global blacklist. Alternatively, the authentication device may upload a recording of the telephone call to the authentication server and the server would measure certain metrics for blacklist determination. The authentication device may only upload a recording of the telephone call if certain metrics criterions have been met and consented to by the user, or the user may initiate an upload of the recording manually.

n) Adding a Blocked Caller ID to a Private Whitelist or Blacklist (FIG. 14A-14C)

As was described, a number may be put on an internal list for the purpose of handling such calls in a different manner, such as allowing or dropping those calls. However, one restriction in the previous embodiments were that blocked caller ID's, with the exception of caller ID nicknames, could not be placed on the internal lists. As was described, a blocked caller ID has a caller ID text of "Private" or a blank caller ID text, and does not display a phone number. Thus, a blocked caller ID cannot be placed on any internal list, since one blocked caller ID cannot be distinguished from another blocked caller ID. However, if a blocked caller ID is authenticated, the caller phone number of the blocked caller ID is transmitted to the authentication server. Authenticating a blocked caller ID was explained in Section (7-a). If the global list server has access to the authentication server, or if the global list server and authentication server are implemented as a single system, it is possible to add a blocked phone number to a private list stored on the global list server. Since, if the global list server has access to the phone number of a blocked caller ID, this fact can be used to place such a phone number on the private list maintained for the customer.

In this embodiment, the global list server will maintain a private whitelist and blacklist for each individual customer. The private lists on the global list server will contain phone numbers of callers with blocked caller ID's. Thus, if a called party receives a call with a blocked caller ID, the authentication device of the called party proceeds to authenticate it. The authentication server can authenticate the caller with the blocked caller ID, assuming the caller has an authentication device installed. Once authenticated, the authentication device of the called party can put the call through. Such a process was described in Section (7-a). The called party may then answer the call and may wish to add the caller to the blacklist through dialing a star code. Since the caller ID is blocked, the authentication device of the called party cannot add the phone number to the internal blacklist. The authentication device of the called party contacts the authentication server and asks to put the number of the caller on the private blacklist. The authentication server contacts the global list server with the caller number and asks for it to be put on the called customer's private blacklist. The global list server thus adds the number to the customer's private blacklist. The next time the same caller with the blocked caller ID calls, the authentication device proceeds to authenticate the call. The authentication server passes the caller number to the global list server to check if it is contained on any lists. The global list server replies that it is contained on the customer's private blacklist. The authentication server replies with an authenticated message along with the list the blocked number is contained in. The authentication device of the called party handles the call accordingly.

FIG. 14 illustrates the flowchart and messaging diagram for adding a blocked caller ID to the user's private blacklist, by way of example. FIG. 14A-14C, collectively referred to as FIG. 14, shows a caller 1410 with a blocked caller ID using an authentication device 1411 which is calling the called party 1420 with an authentication device 1421. The authentication server 1430 has also an integrated global list server. The authentication server implements all the functionalities of a global list server, as was described in the previous embodiments. The integration of the authentication and global list server allows for a much more practical and robust system. On each authenticated message transmitted to the authentication device, the authentication server can also look up which list the caller number is on and include the list identifier within the authenticated message. Thus, the authentication device does not need to contact a separate global list server to inquire the calling numbers global or private list status. Alternatively, the global list server may also maintain the internal list of the authentication device.

Referring to FIG. 14A, steps S1461A through S1468 have been explained and elaborated in previous embodiments. For instance steps S1461A through S1468 correspond identically to steps S761 through S768 as illustrated in FIG. 7A and as elaborated in Section (7-a). Therefore, explanation of those steps will be skipped.

In Step S1469 the authentication server receives the authentication request and looks up if a call has been made to the called number of 555-2000 by a caller with a blocked caller ID of "Private". If so, then the caller ID is determined to be authentic. Since the authentication server also has an integrated global list server, the authentication server looks up the caller's number of 555-1000 against all the lists in the global list server, namely; global whitelist, global blacklist, private whitelist, and private blacklist. In this example, the number is not on any lists of the global list server. In Step S1470, the authentication server replies with an authenticated message. The contents of the message in this example are given as "AUTHENTICATED-[Caller:Blocked, Caller ID:Private, CallerList:None, Called: 555-2000]". The field "CallerList: None" of the message indicates that the caller's telephone number is not on any list of the global list server. In Step S1471, the authentication device of the called party passes the modified caller ID of "[A] Private" to the called party.

Referring to FIG. 14B, which is a continuation of FIG. 14A, after the called party receives the call, the called party decides to block the number from initiating further calls (Step S1472) by adding the number to the blacklist. The called party adds the number to the blacklist by dialing star code, such as *10 (Step S1473). The called authentication device captures the star code and does not pass it to the telephone network (Step S1474). The authentication device determines that the last caller had a blocked caller ID, therefore the last caller may not be added to the internal blacklist. The authentication device determines that the caller must be placed on the private blacklist. The authentication device sends a message to the authentication server to indicate that the previous caller is to be placed on the private blacklist (Step S1475). The message sent to the authentication server in this example is given as "ADD_TO_PRIVATE_BLACKLIST-[Caller: Blocked, Caller ID:Private, Called: 555-2000, Password: Pass2000]". The message indicates that the last caller with the blocked caller ID and with a caller ID of "Private" is to be added to the private blacklist. The field "Caller ID" would not be critical to the adding the blocked number to the private blacklist. The message can simply be interpreted as adding the last caller with a blocked caller ID to the called party's private blacklist. The authentication server receives the message and looks up the telephone number of the last caller with the blocked caller ID (Step S1476). The caller's number was transmitted with the calling status message in Step S1465. The authentication server places the caller's number, 555-1000, on the called party's private blacklist. The authentication server sends a confirmation message to the authentication device (Step S1477). The confirmation message in this example is given as "ADDED_TO_PRIVATE_BLACK-LIST-[Caller:Blocked, Caller ID:Private, CallerList: Private-Blacklist, Called: 555-2000, Password:Pass2000]". The field "CallerList: PrivateBlacklist" indicates and confirms that the caller was added to the private blacklist. The authentication device sends a confirmation to the called party that the caller was added to the blacklist (Step S1478). The authentication device confirmation may be in the form of playing a confirmation voice message to the customer after the customer presses the star code.

Referring to FIG. 14C, which is a continuation of FIG. 14B, the caller with the blocked caller ID calls the called party a second time. Steps S1479 through S1486 are identical to steps S1461 through S1468 and are processed in the same manner. Therefore, they will not be elaborated. In Step S1487 the authentication server receives the authentication request and looks up if a call has been made to the called number of 555-2000 by a caller with a blocked caller ID of "Private". If so, then the caller ID is determined to be authentic. Since the authentication server also has an integrated global list server, the authentication server looks up the caller's number of 555-1000 against all the lists in the global list server, namely; global whitelist, global blacklist, private whitelist, and private blacklist. Since the called party has previously added the caller to his private blacklist, the authentication server determines the caller to be a privately blacklisted number. In Step S1488, the authentication server replies with an authenticated message. The contents of the message in this example are given as "AUTHENTICATED-[Caller:Blocked, Caller ID:Private, CallerList:PrivateBlacklist, Called: 555-2000]". The field "CallerList:PrivateBlacklist" of the message indicates that the caller is on the private blacklist of the called party. The authentication device of the called party receives the authenticated message which indicates the caller is on the private blacklist of the called party. The authentication device then drops the call (Step S1489). The decision to drop the call would be dependent on the call handling settings of the authentication device, but ideally, privately blacklisted numbers would be dropped. Similarly, privately whitelisted numbers would be allowed to connect.

With regards to the private whitelist, the authentication server may be set to place a blocked caller ID number which is not on either the private whitelist or the private blacklist, on the private whitelist if the number calls the called party a certain number of times. Such placement would be similar to the placement of numbers on the internal whitelist by the authentication device, as was explained in previous sections.

The called party may set call handling options such that the authentication device handles calls with blocked caller ID's based on the private whitelist or the private blacklist determination received from the authentication server. As was explained in previous sections, call handling options may include allowing the call to connect to the called party, dropping the call, sending the call to voicemail, etc. The call handling option can also indicate handling calls with blocked caller ID's which are not on either private whitelist or blacklist.

The concepts introduced in this section of the combined authentication server and global list server maintaining the private lists of the authentication devices may be used to maintain the internal lists of the authentication devices. There isn't a requirement that the internal list of the authentication device be maintained at the authentication device. Instead the global list server, or preferably a combined authentication and global list server, may maintain the internal lists of each authentication device. The authentication/global list server can thus add number that the customer receives or dials a certain number of times to the customer's internal list, since the authentication server is already receiving the called number and received numbers for each authentication device through calling status and authentication request messages. The authentication/global list server can then pass the list status of the calling number within the authentication request reply messages, as was illustrated in Step S1488.

The concepts introduced in Section (9-e) with regards to aggregating internal lists to global lists may be used to aggregate private lists also. Since the global list server maintains a private whitelist and blacklist for each customer, the global list server may aggregate the private lists and move telephone numbers which are on more than a certain number of private lists to the global lists.

10) Caller ID Revealing Techniques (FIG. 15A-15E)

a. Revealing a Blocked Caller ID to Certain or all Called Parties (FIG. 15A-15C)

Since a number of a blocked caller ID is sent to the authentication server by the caller party authentication device, the server may be given permission to reveal the blocked caller ID to certain or all called authentication devices.

Figure 15A:
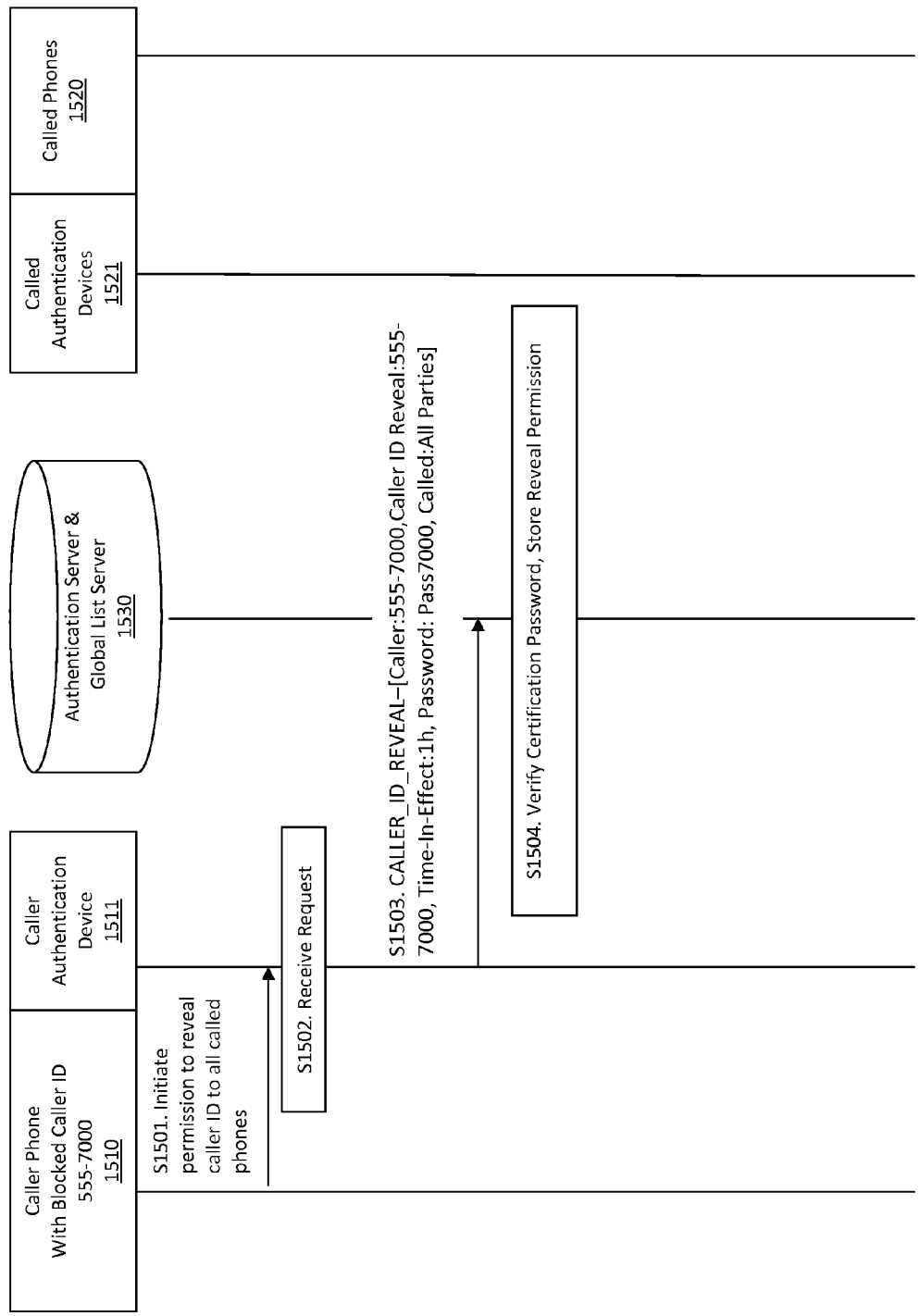
FIG. 15A-15C illustrates, by way of example, the flowchart and messaging diagram for revealing a blocked caller ID certain called parties.
Figure 15B:
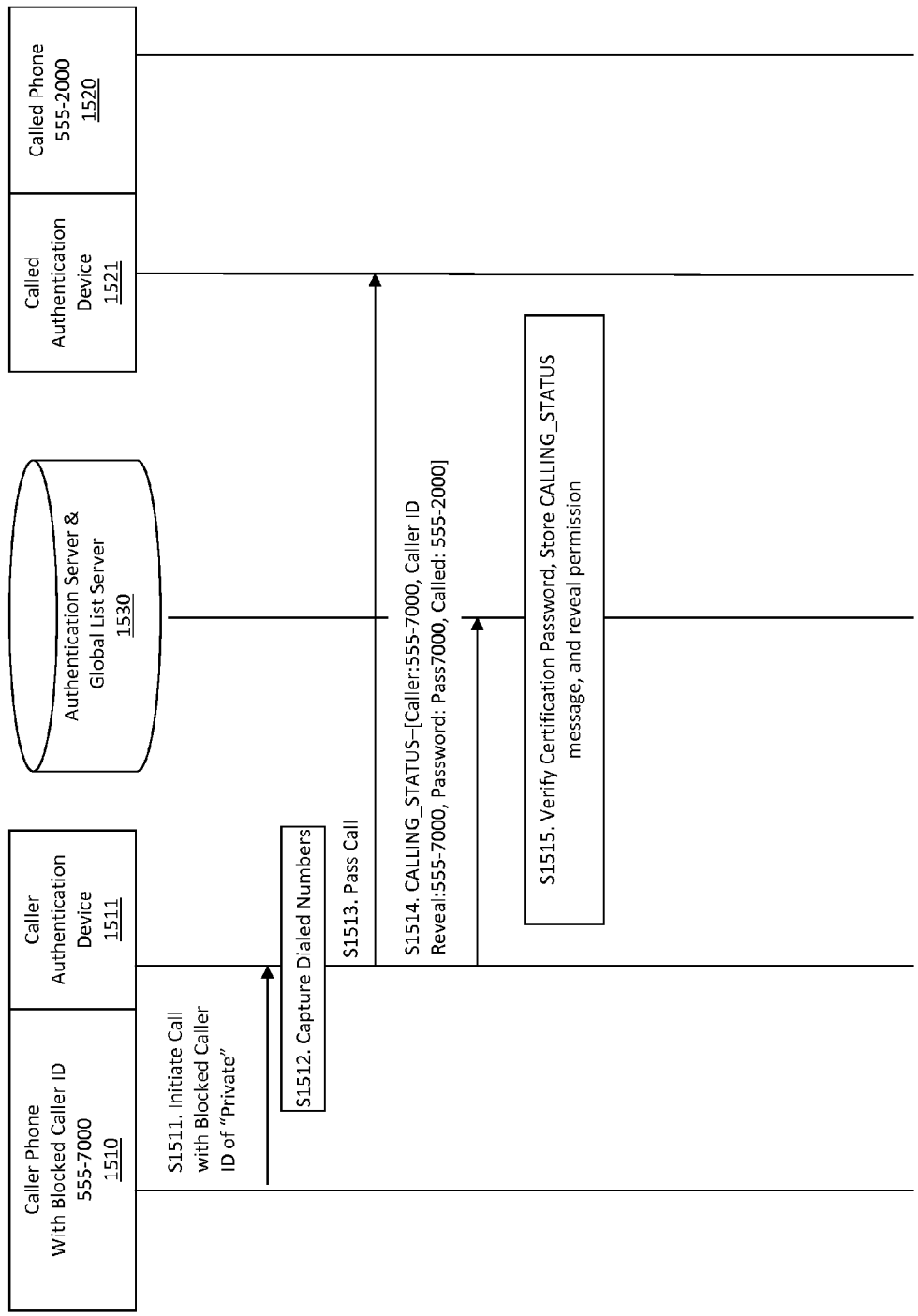
Figure 15C:
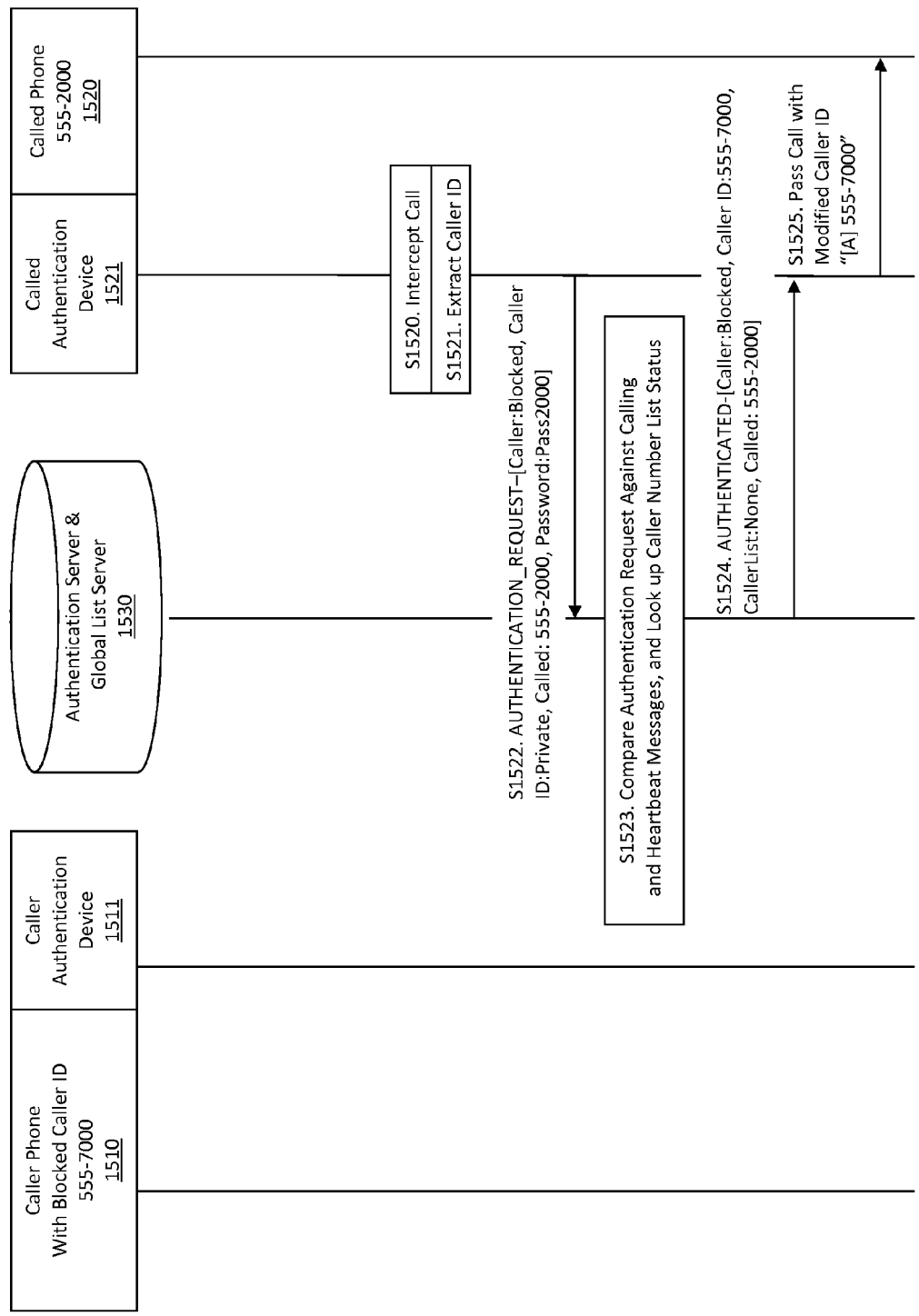

FIG. 15A illustrates an example where a caller gives permission for her blocked caller ID to be revealed to all called parties. All called parties would be parties which haven an authentication device installed. The callers' caller ID would still be blocked for any calls to called parties who do not have an authentication device installed. In this example, the authentication server 1530 stores all permissions regarding which called numbers to reveal caller ID's to. In the next example, the server will not store such numbers. The caller phone with blocked caller ID 1510 initiates a request, Step S1501, to the caller authentication device 1511 to reveal its phone number to all called phones, an example of such a phone is the called phone 1520. Such a request can be in the form of the user going to the authentication device settings in a web interface, or smartphone interface, or IVR, or any other means already discussed. The authentication device receives the request, Step S1502, and sends a "CALLER_ID_REVEAL" message to the authentication server. The caller ID reveal message contains the caller phone number "555-7000" and the certification password for that number "Pass7000". The authentication server receives the request, Step S1504, and first verifies the certification password. The authentication server then stores the caller ID reveal field for the specific called number. In the message the caller ID reveal field is "555-7000", which indicates that the caller wants to reveal its caller ID as that number. A caller with a spoof permission may reveal its number to be that of a spoofed party which gave the permission. Since the caller ID reveal field is the same as the caller party number, it does not need a spoof permission in this case. The server then stores this reveal number for the party to be called. The called filed in the reveal request determines the number for which to reveal caller ID's for, in this example that field is given as "All Parties". "All Parties" would mean that the caller ID will be revealed for all parties. The called field could contain a phone number such as "555-2000", in which case the caller ID will only be revealed for that number. The called field could be a listing of numbers for which the caller wishes to reveal caller ID's for. The "Time-In-Effect" field in the message is given as "1 h". The time in effect is the time this reveal is valid for, which is given as 1 hour in this example. The server will thus reveal the callers' caller ID to all parties for a duration of 1 hour, after which time the reveal request will be deleted and caller ID will no longer be revealed by the server to called authentication devices. The server will then pass along the caller ID reveal number in an authenticated message transmitted to any number or number contained in the called field for the duration of the time in effect field, which will be shown by example in FIG. 15C. The server may acknowledge the results of the caller ID reveal message as being successfully received and in effect. The server may also respond with any error messages should the message have the incorrect password, or would need spoof permission if it wished to spoof another party phone number. The request in Step S1501, by the user, would ideally be performed before a user makes a call. However, there could be instances where the user has called a number and the called party wishes the caller to reveal her caller ID during the call. In such cases the user can initiate the caller ID reveal request for the call and the steps outlined in this embodiment can be performed similarly. If the server determines that the caller is talking to the called party, the server can transmit a second "AUTHENTICATED" message with the caller ID revealed. Authenticated messages which reveal the caller ID will be explained later with respect to FIG. 15C. The called authentication device can receive the second authenticated message with the revealed caller ID and notify the user during the call. If the caller wished to rescind the caller ID reveal request, the caller can initiate a rescind request to the authentication device. The rescind request may be in the form of "CALLER_ID_REVEAL_RESCIND-[Caller:555-7000,Caller ID Reveal:555-7000, Time-In-Effect:1h, Password: Pass7000, Called:All Parties]". The "Time-In-Effect" field of the rescind request allows for the rescind to be in effect for only a certain amount of time or indefinitely. The remainder of the rescind request fields are self explanatory and will not be elaborated.

The caller ID reveal message could also contain additional information besides the caller party telephone number. For instance, the message could also reveal the caller name, such as "CALLER_ID_REVEAL-[Caller:555-7000,Caller ID Reveal Name: John Smith, Caller ID Reveal:555-7000, Time-In-Effect:1h, Password: Pass7000, Called:All Parties]". The name within the "Caller ID Reveal Name" field could then be transmitted with the revealed caller number to the called party. The user can set what type of information is revealed and which called numbers are to be revealed which type of information. The server could either allow any information to placed within the caller ID reveal name field or the server could verify such information. The verification could consist of the server performing a lookup of the caller ID reveal number in a phonebook and only allow for the caller ID reveal name to match the name in the phonebook.

FIG. 15B shows an alternative embodiment than that was shown in FIG. 15A. In FIG. 15B, a caller with a blocked caller ID is calling another party. In this example, the authentication device of the caller 1511 keeps a list of all parties which to reveal caller ID's for. The listing of called numbers for which to reveal caller ID's for can be compiled manually by the user of the authentication device. Or the listing can be extracted from the user's internal whitelist. Or the listing can be extracted from the users contact list on a smartphone, for instances where the authentication device is a software program running on such a phone. Such listing compilation methods can be selected and the listing itself can be modified by the user. This listing is not transmitted to the authentication server 1530 in the form of caller ID reveal messages. Instead, the caller ID reveal indication is transmitted within the calling status messages. Steps S1511 through S1513 are executed the same as in previously described embodiments and figures. Step S1514 is the calling status message transmitted to the authentication server. The calling status message contains the caller number and certification password. The calling status message also contains the "Caller ID Reveal" number. This number is then stored by the authentication server for the purpose of revealing it to the called party number, as contained in the "Called" field of the calling status message. The caller ID reveal number can be the number of the caller or another number that the authentication device has spoofing permission for, as was described in the previous embodiment. Once the server verifies the certification password and checks if the caller ID reveal number is the caller number or another number which spoof permission was given, the calling status message is stored. The calling status message does not contain a "Time-In-Effect" field as in the previous embodiment since this reveal request is applies to the call being placed only, and not other called numbers.

FIG. 15C shows, by example, the flowchart and messaging diagram of the authentication server revealing the caller ID of the caller with a blocked caller ID to the called party authentication device. The example given in FIG. 15C could have been the result of the reveal request shown in FIG. 15A, since that request was for a request to reveal caller ID's for all parties. Or the example in FIG. 15C could have been the result of the calling status message given in FIG. 15B and where the call is received by the called party for which caller ID was reveal given permission for. In FIG. 15C, the called party authentication device 1521 for the called party 1520 at the phone number 555-2000 intercepts the call, Step S1520, and extracts the caller ID, Step S1521. The authentication device then sends an authentication request, Step S1522 with the blocked caller ID indication. Such steps were already elaborated in previous embodiments. The authentication server receives the request, Step S1523, verifies the called party certification password, determines that the caller ID is authentic, and also determines that the calling party requested the caller ID to be revealed to the called party. The authentication server then transmits an authenticated message, Step S1524, with the caller ID of the called party revealed, as shown in the "Caller ID:555-7000". The authentication device receives the authenticated message, appends the [A] in front of the received caller ID of the calling party, and displays the resulting caller ID "[A] 555-7000" to the user, Step S1525. Thus, a caller with a blocked caller is both authenticated and the caller ID revealed.

b. Caller ID Revealing within a VoIP Infrastructure (FIG. 15D-15E)

In Section (7-C), authenticating caller ID's within a VoIP infrastructure was disclosed. The authentication system used the concept of caller ID nicknames and disclosing the nickname within the caller ID presented to the called party in order to uniquely identify and differentiate each VoIP caller. However, VoIP calls can be treated as call with a blocked caller ID. That is, a called party on a landline would not receive a caller ID telephone number from a VoIP user who only has a VoIP username at Skype for instance. Even if the Skype caller has a telephone number assigned to her by Skype where she can receive calls, Skype might not pass this telephone number in her caller ID to called parties. In such instances, we can treat a VoIP call that does not transmit either the VoIP unique username or VoIP user telephone number, as a blocked caller ID. And such a VoIP call can be authenticated in the same manner as a blocked caller ID, as was elaborated in Section (7-a). And such a VoIP call can have its' caller ID revealed to the called party.

Figure 15D:
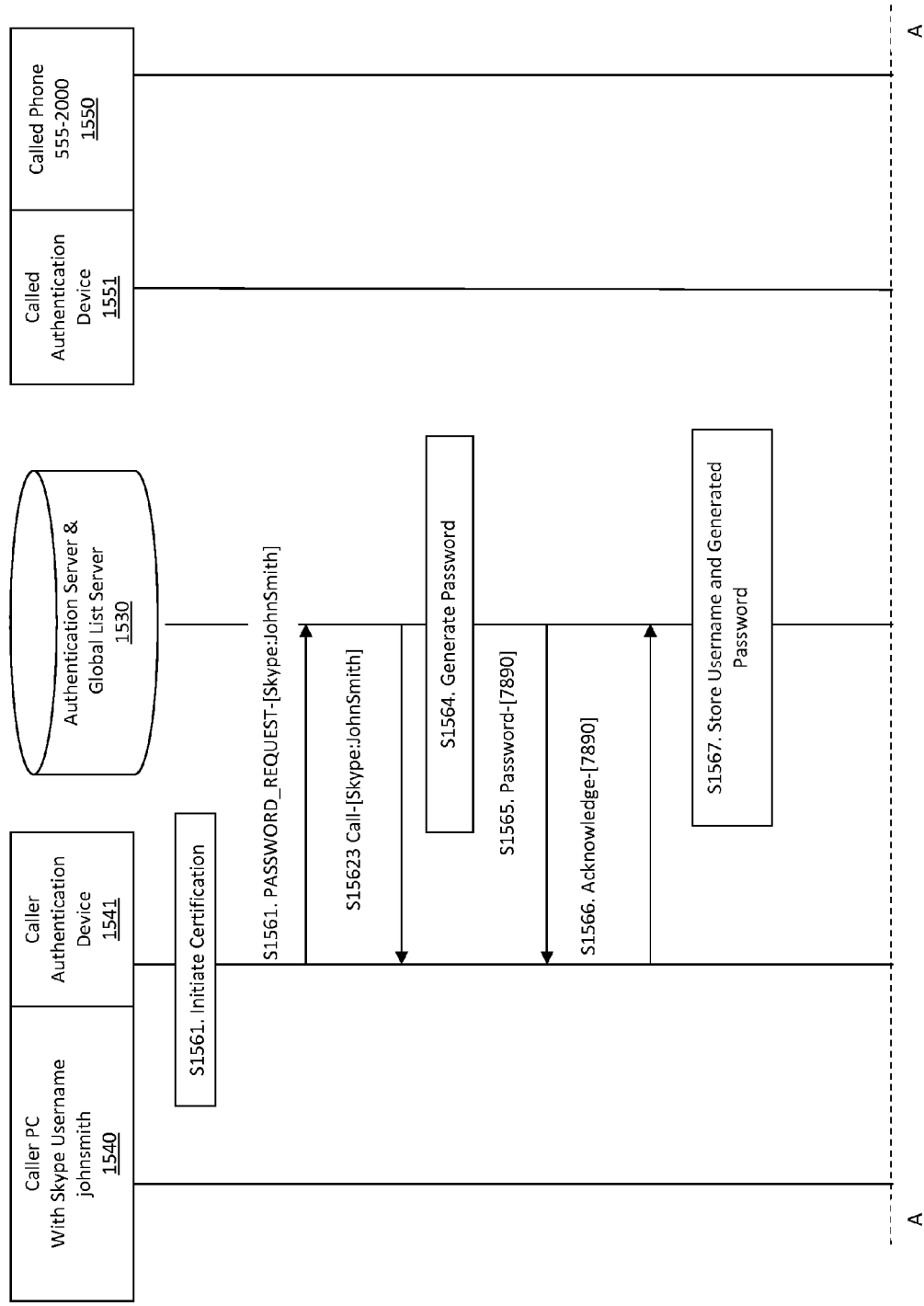
FIG. 15D-15E illustrates, by way of example, the flowchart and messaging diagram for authenticating caller ID within a VoIP infrastructure.
Figure 15E:
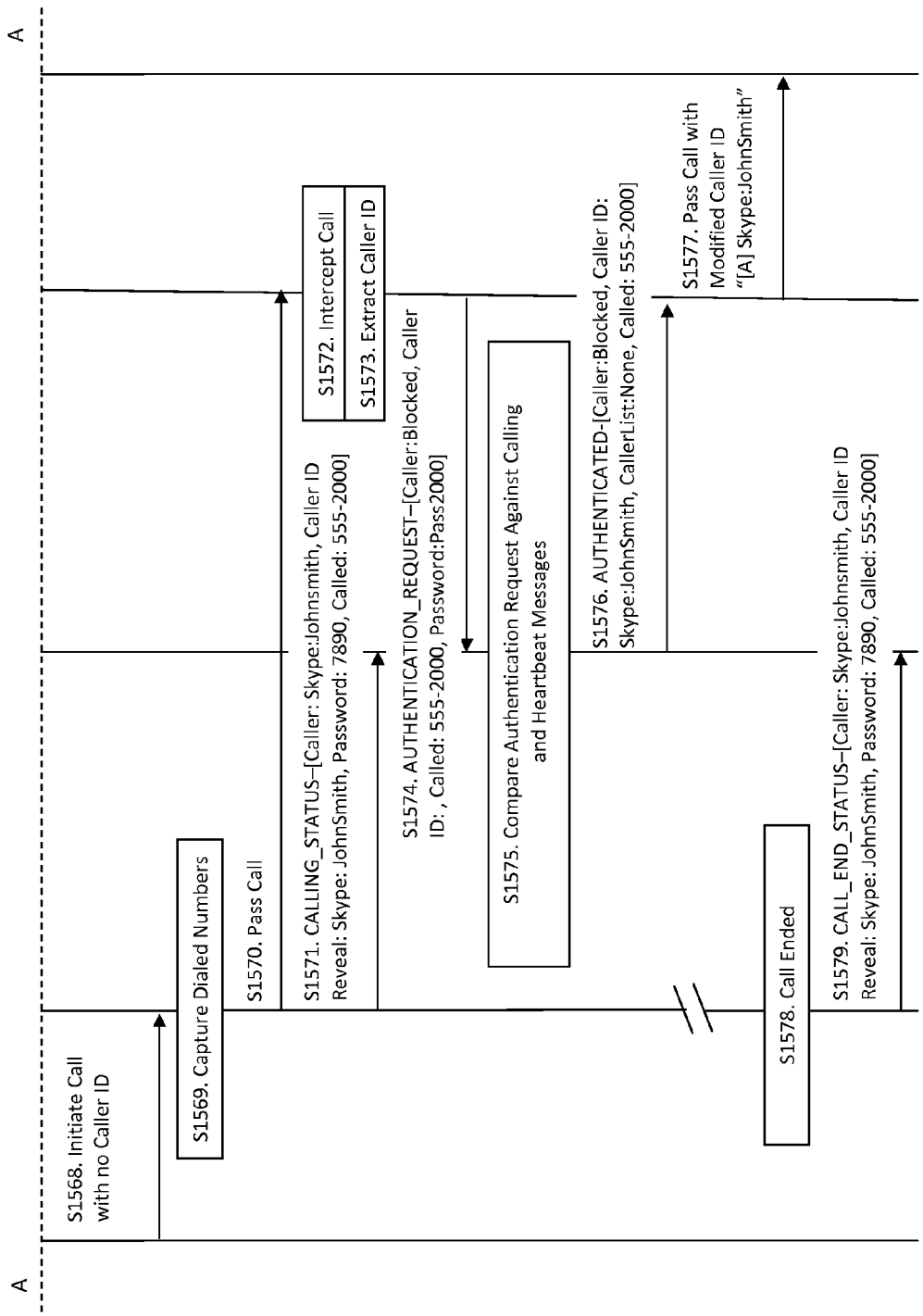

FIGS. 15D and 15E illustrate the messaging diagram of an embodiment of the invention for VoIP caller ID authentication and revelation. The process is similar to revealing a blocked caller ID. The caller 1540 is using a Skype software client on his PC. His Skype username, also known as the "Skype Name" or "Skype Contact Name", is "JohnSmith" and does not have an accompanying telephone number connected to the VoIP account. Thus, when he calls a telephone such as a landline, his caller ID may be displayed as blank, "Out of Area", or as "Skype Caller 1-XXX-XXX . . . ", where the name "Skype Caller" and number "1-XXX-XXX . . . " is shared between all Skype callers and does not serve the function of a uniquely identifying caller ID or caller ID nickname. The caller authentication device 1541 may be an addon to the Skype software client, or software implemented by Skype within the client, or any number of other implementations already discussed. The device initiates certification by contacting the authentication server, Step S1561, and sends a password request, Step S1562. The contact to the server would preferably be through the internet as the user is assumed to be connecting to Skype over the internet on his PC. The password request consists of the VoIP provider the user is at, "Skype", and the Skype username the authentication device is connected to "JohnSmith". The server receives the request and initiates a VoIP call to the username over the VoIP provider contained in the request, Step S1563. The contact to the Skype username would also occur through the internet. This is somewhat different with respect to previous examples where the contact to the server by the device was preferably performed through the internet, but the certification password was transmitted by the server to the device over telephone or SMS networks. The authentication server thus contacts "JohnSmith" at Skype. This contact can be done by the server using the Skype API, or through any other means. Alternatively, the caller may have a Session Initiation Protocol (SIP) address and the server can contact the caller authentication device at the SIP address. The server generates a password, Step S1564, and transmits it Step S1565. The authentication device receives the call and the transmitted the password. The password can be transmitted by the server through DTMF tones during the call and the device can then decode the DTMF tones and determine the password. The certification password can be transmitted during the call through computerized voice, fax, or modem, as previously disclosed. Also previously disclosed, the password can be transmitted through the caller ID of the call from the server to the device. Alternatively, Skype users can receive instant messages at their username, thus the password can be transmitted within an instant message to "JohnSmith" at Skype without the need to place a call. And the authentication device can intercept the instant message and extract the password.

The authentication device replies with the received certification password, Step S1566. The acknowledgement would preferably contain the password to verify that it has received the password correctly. The server would then store the username and the accompanying password, Step S1567. This would also serve as the first heartbeat and prove that the authentication device is installed at the username. In this example, no other heartbeats are sent by the device. The device can now present the username "Skype:JohnSmith" and password "7890" to the server and prove that it is the actual authentication device at that username. The certification of the called party is not explicitly shown, but is assumed to have taken place with the called party receiving the password "Pass2000".

After certification, the caller can initiate calls and have its username authenticated and if desired, revealed to the called party. This process is similar to authenticating a blocked caller ID and revealing such a blocked caller ID to certain or all parties.

In Step S1568, the Skype caller initiates a call to the called party 1550. The authentication device captures the dialed numbers, Step S1569. The call is passed to the called party, Step S1570. The device contacts the server with a calling status message, Step S1571, containing the Skype username as the caller field, the certification password, the caller ID to be revealed, and the called party telephone number. The called party authentication device 1551 intercepts the call S1572, and extracts the caller ID, S1573. The called authentication device contacts the server, Step S1574, with an authentication request with the Caller field indicated to be blocked and the caller ID field blank to signify no caller ID number or name has been received. The authentication server verifies the called party authentication password, Step S1575, and checks if a caller is currently calling the called party. The server determines that the Skype caller is currently initiating a call to the called party. The authentication server sends an authenticated message, Step S1576, with the caller ID field revealing the caller username and the VoIP provider of the user, which is "Skype:JohnSmith". The server also indicates the caller is currently not on the called party internal lists or global lists. The authentication device of the called party then modifies the caller ID presented to the called party, Step S1577, to indicate the revealed VoIP username and the authentication status. Thus, the VoIP username is revealed and the VoIP username is authenticated.

After the caller authentication device determines the call has ended, Step S1578, the device sends a call end status message to the server to signify that the caller has ended the call with called party, Step S1579. Such messages mitigate race conditions and allow the server to determine which party connected to the called party when caller ID information is unavailable to the called party. As elaborated, such messages can be transmitted by the caller and called parties to signify stages of each call being made or received, such as call ringing, call busy, and call ended messages. However, such messages use communication bandwidth and other resources, especially if the authentication device is implemented on a smartphone as software and is contacting the server through a wireless data plan with a bandwidth cap. Thus, it would only be desirable to have callers with blocked caller ID's to transmit such messages, especially a call busy or call end message. If the caller's caller ID is not blocked, then a race condition is mitigated by the called party transmitting the caller ID of the connected caller to the authentication server. In cases where the authentication server receives a calling status message and does not receive an accompanying authentication request from the called party within a certain amount of time, such as 10 seconds, the server may infer that the caller either hung up the call before being connected or the called party was busy taking another call or the called party was not out of coverage area, if on a smartphone. The server can then expire the calling status message and would not need a call ended status message or a call busy message from the caller party. The tradeoff in such a system is the possibility that an attacker might call the called party with the spoofed caller ID at the same time the victim is calling the called party and connect to the called party before the victim and be authenticated. The risks of an attacker guessing the caller number which made a call and did not connect within the same timeframe are low but not impossible, and would have to be weighed against the available network and server resources to send and process additional messages.

In another embodiment of the invention, the server may measure the average time between receiving a calling status message and an authentication request message, and use the time measurement in determining when to expire such messages. The time between the two messages reflecting when the call is initiated by the caller party and when the call is received by the called party, which is the time period it takes to connect the call. If the server determines that the average time between the two messages is 5 seconds, then the server may expire such messages after 10 seconds, allowing a margin of safety of 2. The server may measure the time between the two messages with respect to area codes, geographical locations, telephone networks, and other aspects of the caller and called parties. Thus, the server may infer that the caller being in a 555 area code takes at least 3 seconds to connect to a called party. Or the server may infer that a caller being in a 555 area code calling a 444 area code takes on average 4 seconds to connect. Such time measurements may be used to differentiate between race conditions as previously explained. If a calling status message was received from a 555 area code caller, and at the same time a calling status was received from a 444 area code caller, and if a authentication request was received by a 333 area code called party with 3 seconds, the server may use the previously measured connection times and infer that it is most likely that the 555 area code caller connected within that time frame, and not the 444 area code caller. These time measurements may further be utilized to determine a caller with an illegitimate spoofed caller ID. For instance, if a spoofer with a spoofed caller ID area code of 555 sends a calling status message and the called party at the 444 area code sends an authentication request within 3 seconds, but average time for a 555 caller to connect to a 444 party was previously determined to be 4 seconds, as measured by the authentication server, then the server may determine the caller ID is spoofed. Or the server may scrutinize the caller party. The authentication server may request that the caller authentication device recertify. Or the server may audit the caller authentication device and request the last 3 calls received or made by that device, and compare it to the records for that device on the server. The same concept would equally be utilized for VoIP callers and called parties. To aid in more accurate measurement of the connection time, the calling status message may be transmitted to the server at an exact time or instance within the call initiation, such as after the last digit of a valid telephone number is dialed by the caller party. Likewise, the authentication request may be transmitted to the server at an exact time or instance within the call reception, such as when the first or second ring is received by the called party. The authentication devices may send messages separate from the calling status and authentication request, to aid in measuring the connection time of the call. Such steps would allow for very accurate measurements of the call connection times by the server.

11) Privacy Protections

Since the authentication server is notified of each call that is being placed and each call that is being received, the users of such a service might have privacy concerns. To resolve such issues, the information that is sent to the authentication server could be anonymized. For instance in a calling status message, the number of the caller and called parties are transmitted to the authentication server, where the authentication server is made aware of who is calling whom. Instead of transmitting the phone numbers, an encoding of the phone number may be transmitted. The encoding would be performed through a predetermined algorithm. Such encoding algorithms would allow for one-way encoding of information and not allow for the encoded information to be decoded, such examples of encoding are hashes (e.g. MD5, SHA256).

An overly simplified example of such an encoding might be the sum of adding up all the numbers contained in the phone number. Thus, instead of a calling status message in the form of "CALLING_STATUS-[Caller:555-2000, Password: Pass1000, Called: 555-7000]", the calling status message with the phone numbers encoded through summing all the digits would be "CALLING_STATUS-[Caller:17, Password: Pass1000, Called: 22]". The caller number "555-2000" is encoded as 17 by adding the digits 5,5,5, and 2. The same for the called phone number. And the authentication request "AUTHENTICATION_REQUEST-[Caller:555-2000, Called: 555-7000, Password: Pass7000]" would be encoded as "AUTHENTICATION_REQUEST-[Caller:17, Called: 22, Password: Pass7000]". Thus the authentication server can match the encoded caller and called numbers, and authenticate the caller ID. The password would also be paired with the encoded phone number. Thus, the server would store the certification password for the caller with the encoded phone number of "17" as "Pass1000". During certification the server would have to receive the actual telephone number in order to contact the number and transmit the certification password. However, after the password is transmitted, the server may then encode the phone number, store it alongside the password and destroy the non-encoded phone number. Where the caller would only transmit the encoded phone number and the server can verify that the password matches the password on file for that encoded phone number.

Such privacy protections would allow for the authentication server to authenticate caller ID's without knowing the actual phone numbers of users and whom they are calling or receiving calls from. Such encoding would break the processes of caller ID revealing. The encoded caller ID may be revealed, and the called party could then associate the encoded caller ID with a contact name on her phone. However, such encoding still makes it possible to add a number, even blocked numbers, to internal, private and public lists. The requirement is that the encoding results in a unique string for a unique phone number and that no collisions occur where two different phone numbers have the same encoded string.

Safeguarding the communication between authentication devices and the authentication server through the use of cryptographic techniques, such as utilizing public/private keys, signed certificates, and other techniques are beyond the scope of this invention disclosure and will not be elaborated upon. Similarly, safeguarding the transmission of the certification password from the authentication server to the authentication device phone number will also not be discussed. A practitioner in the art may utilize any and all currently known network and telecommunications cryptology and security methods to safeguard such communications.

12) Caller ID Authentication without an Authentication Device

The previous sections described caller ID authentication utilizing authentication devices in communication with an authentication server. Also peer-to-peer authentication has been described where there isn't an authentication server available. In both cases, an authentication device was necessary for caller ID authentication. In this section, authenticating caller ID without an authentication device will be discussed.

If a caller did not have an authentication device, and the called party had an authentication device, the caller ID was determined to be irresolute in the previous examples and sections. However, if the authentication server had access to the caller party information, such as calls the caller party was making in real-time, then the authentication server would have the same information as would be received within a calling status message. The authentication server then would be able to determine a caller ID as authentic, spoofed or irresolute in reply to an authentication request. For instance, if a caller is on the Verizon telephone provider and does not have an authentication device installed, the caller may opt-in for the Verizon provider to make his calling information available to the authentication server. The authentication server would thus receive all calls being made and received by that individual. If the caller then made a call to a party with an authentication device, the authentication server would receive the caller telephone number and the destination telephone number. The called party authentication device would send an authentication request. The server could then reply with the authenticated message. Even though the Verizon telephone provider is not implementing the full functionality of an authentication device for each customer, the called party can authenticate caller ID's from any Verizon customer who opted-in. Also, any opted-in Verizon customer would be protected from spoofing with respect to called customers using authentication devices.

The previous example can be further developed where both the caller and the called parties do not use an authentication device. If the authentication server had access to a called party's caller ID information in real-time, then the authentication server would have the same information as contained in the authentication request message. The authentication server can then authenticate and detect spoofing if it had access to both the caller's and the called party's call information in real-time. However, since the telephone provider is not implementing the full functionality of an authentication device for each customer but only providing call information, the customer would have to be made aware of caller ID authentication determination in another way. If the authentication server detects that a called party is receiving a spoofed caller ID, then the authentication server can call the called party during the spoofed call. If the called party has a call waiting feature, she can put the caller on hold and receive the call from the authentication server. The authentication server can then inform the called party of the spoofed caller ID though a computerized voice. If the called party does not have call waiting, the authentication server can wait until the called party line is not busy, and then contact the called party. The called party can then be made aware of the previous caller's caller ID status. Or the authentication server can send a text to a phone number, send an email to a designated address or simply log spoofed callers where the user can view such information about her received calls at a website. A user may set how she wants to be warned by calling the authentication server service telephone number and inputting her preferences through IVR, or visiting the authentication server website and logging in.

If a landline called party is not utilizing an authentication device, but the server is able to capture the caller ID's the called party receives, the authentication server may forward the caller ID authentication status to another device, such as a smartphone. Authentication device software may be installed at a smartphone. The authentication device software may authenticate caller ID's for the calls made or received by the smartphone telephone number. However, in this example the smartphone authentication device is primarily used to display caller ID status of the calls the landline phone receives. The authentication device would contact the authentication server and request a password for the landline phone by transmitting the landline telephone number. The authentication server would then call the landline phone and transmit the password, preferably through a computerized voice. The landline customer would pick up the phone, hear and determine the password being said by the voice, and input the received password into the authentication device on the smartphone. The authentication device would then be able to authenticate itself as the landline authentication device to the server. When a call is received by the called party on the landline, the authentication server can then contact the authentication device on the smartphone and transmit the caller ID status of the call being received by the landline phone. Such a system could also allow for a user to manually input, by hand, into the smartphone authentication device telephone numbers of calls made or caller ID's received by the landline phone and receive authentication status of such calls.

Such a system could be used in cases where the caller has an authentication device and the called party does not have an authentication device, such as a called party using a landline, and where the authentication server is not capturing caller or called party call information in real-time. The called party can designate the authentication device software on her smartphone as the authentication device of the landline. Thus, the server would forward or push the authentication status of calls being made to the landline phone, as described Section (4-b), to the designated smartphone authentication device. However, in such a case the server would only know authentic caller ID's being received by the landline and would not be able to inform the landline designated software of spoofed or irresolute caller ID's. Such a system would also allow for the smartphone to legitimately spoof its caller ID to that of the landline phone, where entering in the password of the landline phone into the smartphone authentication device would serve as the permission.

13) Ramifications and Advantages, and Conclusion

The caller ID authentication system can be used selectively, instead of applied to all calls made and received by the customer. For instance, a customer may install a software app provided by his bank onto his smartphone. The bank app may track calls made by the customer and only contact the authentication server when the customer dials the bank customer support number or the bank branch. The authentication server may also be set up by the bank and only service the bank app and the bank. Thus, when the customer calls the bank, the bank app can send a calling status message to the banks authentication server. The bank customer support operator or the bank branch operator can verify the authenticity of the caller ID of the customer through software running on their systems contacting the authentication server. And if the bank called the customers cell phone, the bank app can indicate the authenticity of the banks caller ID to the customer. In such a fashion, each institution may release a smartphone app that caters to their customers.

It should be understood that the system and methods introduced in this invention disclosure may be used in any telecommunication system and any aspect of telecommunications. For example, the method of caller ID authentication of this invention may be utilized in a voice mail system. In such a voice mail system, calls from certain authenticated caller ID's, such as from the owners of the voice mail box, can be put through to the voicemail inbox and voicemail settings without the requirement of a password challenge. In another example, a fax machine may utilize the disclosed invention to authenticating caller ID's through an integrated authentication device. Thus, the fax machine can indicate the authentication status of the fax sender in the page margin of the fax document. In another example, a financial institution may utilize the disclosed invention to authenticating caller ID's to verify that the account holder of record is calling the financial institution.

a) Applications of Caller ID Authentication Methodology in Other Communications Systems One should also realize that the described methods of caller ID authentication and list based call handling may be applicable to other fields of communication, such as email, phone texting, radio communication and the like.

For example, in an email system, the described invention of caller ID authentication may be used to authenticate the email sender address. The email sender and the email receiver can implement an authentication device, such as software running on the user's PC, or the email provider may implement the authentication device within their email servers as software, hardware or combination thereof. Thus, as soon as an email is sent from the email sender to the recipient, the sender authentication device can transmit an email sent status message to an authentication server. The email sent message can include the sender email address and the recipient email address. As soon as the email recipient receives the email, the recipient authentication device can contact the authentication server, and send an authentication request. The authentication request can include the sender email address, as determined by the "From:" field of the email (similar to the concept of caller ID), and recipient email address. The authentication server can then compare the email sent message sent by the sender and the authentication request sent by the recipient to determine that the email sender address is authenticated, spoofed or irresolute. The authentication device of the recipient can then modify the email sender address to indicate the authentication status of the sender's email address. Or the authentication device may indicate the authentication status of the sender email address in other forms. The concept of certification may also be directly used in email address authentication. The authentication device may transmit a certification request to the authentication server containing the email address that the authentication device is installed at, and the authentication server may then email a certification password the email address. The authentication device may then use the received password for all transmissions sent to the authentication server. Thus, the authentication server can verify that the authentication device possesses ownership of the email address. Thus, one skilled in the art can utilize any and all concepts introduced in this disclosure, such as caller ID authentication, caller ID spoof detection, certification, peer-to-peer authentication and certification, local lists, global lists, private lists, in email authentication and email handling system. The concepts of the invention may thus be used in other field of communications where it is advantageous to authenticate the sender address, and where the field of communication allows for a sender address to be authenticated according to this invention disclosure.

The concepts of active and passive may also be applied to other fields of communications, such as the email sender authentication system thus described. An example of passive authentication in an email system would be constructing a passive certification password from the email "From:" or "To:" fields.

As should be apparent to those skilled in the art, the same concept of caller ID and email authentication just discussed can be used similarly in SMS, MMS or any other form of text messaging in order to authenticate the source address of such a message.

Another field of communications that would benefit from the described methodology of sender authentication and list based message handling is postal mail. Although the concepts described thus far can be easily be utilized to authenticate the sender of a piece of postal mail by those skilled in the art, a non-limiting example of how such a system might be implemented will be discussed. The postal mail authentication system would have an authentication server which would receive from a communication network, preferably over the internet, the mailing status messages and mail authentication request messages from authentication devices. The authentication server would then transmit the authentication status of the source address of the piece of postal mail to the recipient authentication device. The authentication device may be implemented by the sender of the postal mail within a digital postage system, such as those offered by Stamps.com or Pitney-Bowes. In such systems, the sender of a postal mail is allowed to print postage directly from their PC. Such systems also offer a digital scale connected to a computer for adjusting the printed postal rate based on the mail weight, given a specific destination. Thus, when the sender of the mail item prints postage for a specific destination, the integrated authentication device within the digital postage system would contact the authentication server and send a mailing status message containing the sender postal address and destination postal addresses. The authentication server would store the mailing status message. As is apparent, the sent postal mail would have written on it the source postal address and the destination postal address. The source postal address on the mail article might or might not be the sender address of a mail item. For instance, an attacker might send a postal mail which shows the source address to be a bank and try to trick a postal recipient by instructing them to call a certain telephone number, which might be controlled by the attacker and used to record sensitive financial information disclosed by the victim.

The authentication device at the recipient might consist of a software program running a PC. Once the recipient receives the postal mail, she can merely enter the source postal address that is indicated on the piece of mail into the software program. The authentication device would then contact the authentication server with an authentication request containing the recipient postal address and the source postal address of the mail item. The authentication server would then determine the source address is authentic if the source address matches the sender address, and the recipient address matches the destination address contained in the mailing status message and the authentication request message. Such matching has already been described with regards to caller ID authentication.

The authentication device at the recipient might be in the form of an imaging scanner connected to a PC and accompanying software running on the PC. In such a system, the imaging scanner would perform optical character recognition (OCR) and extract the source address indicated on the postal mail, and the user can be saved from the inconvenience of entering in the source address of every mail item she receives. If needed, the address the machine is residing at, that is the address the recipient is at, can be entered manually by the user at the installation of the authentication device. The authentication device may be in the form of a smartphone with an imaging device, such as a camera, and accompanying software. The smartphone of the recipient may be used to take a picture of the postal mail, the software may then perform OCR and extract the source address. Instead of performing the OCR locally on the device, the authentication device may transmit the taken picture directly to the server, where the server would perform the OCR. The sender mailing system might encode the sender address and destination address in a machine readable form on the mailing, such as a barcode, Quick Response Code (QR code), or the like. Next to the QR code on a mailing envelope, a message such as "Scan this code to authenticate the source address of this mail item" might be placed. The recipient can then scan the QR code, and the authentication device can extract the address of the sender and contact the authentication server with an authentication request. Such encoding would also make possible for other kinds imaging systems to extract the source and destination addresses, such as barcode scanners. The described smartphone system may also be utilized by the sender of the postal mail. The sender could enter the mail destination address manually into the software for an article of mail or scan the mail article and the software application would then process the destination address through OCR. As should be apparent, the types of authentication devices given in the examples for the sender and the recipient can be interchanged such that one type of device can also be used by the other party.

The certification process would be similar to the certification processes described thus far as it relates to other communication systems. The authentication device would send a certification request to the authentication server. The authentication server would then initiate the mailing of the certification password through the postal mail system. The recipient of the certification password postal mail would either enter in the certification password manually into the authentication device or scan it with an imaging device of the authentication device. Such a certification process would prove that the authentication device is residing at the postal address it claims to be at. The authentication device could contact the authentication server and verify certification password. This initial contact would present the first heartbeat and prove to the server that an authentication device is installed for that postal mail address. The authentication device may send heartbeats at regular intervals to indicate that it is functioning at that address or may omit doing so. The concepts of the previously elaborated passive certification password would also apply to postal mail authentication. The passive certification password would be constructed from destination and source addresses of mail sent or received.

Thus, the mailing status message would contain the sender address, destination address and the certification password received at the sender address by postal mail from the authentication server. The authentication server would thus compare the sender address and the certification password in the mailing status message to the certification password sent to that sender address and only accept the mailing status message if they match. Likewise, the authentication request message would contain the source address, destination address, and the certification password of the destination address. The server would thus compare the destination address and the certification password in the request to the certification password sent to the recipient address, which is the destination address, and only reply to the request if they match.

Such a system could be vulnerable to a race condition such that a bank could send a legitimate postal mail at the same time an attacker sends an illegitimate postal mail claiming to be from the same bank. Such a situation could lead to the illegitimate mail being authenticated since it arrived first, and the legitimate mail being determined to be spoofed since it arrived later. To mitigate such issues, the piece postal mail may have associated with it a race string, such a string consisting of letters or numbers that would identify the postal mail and help differentiate it from other sent pieces of mail. The race string would be constructed by the authentication device of the sender, and sent to the authentication server within the mailing status message. The race string would be indicated on the postal mail or be able to be derived from the postal mail. Such a race string can simply be in the form of a date sent and a couple of random digits, such as "1/1/2014: 12" or the date and time, such as "1/1/2014-1:01:01 pm". Thus, the attacker would have to send the postal mail on the same date "1/1/2014", and guess the later two digits or exact time. A more complicated system could be 8 or more random digits or characters, which would make it very difficult for an attacker to guess. Another system could consist of the sender keeping a running tally of the mail items sent, and indicating the tally on the mail item. Such that the race string can be "10" if the sender has sent 9 pieces of mail and this is the $10^{th}$ mail item. The tally could be the number of all mail sent by the sender or just mail sent by the sender to that specific recipient. Such a system would require the attacker to know the total number of mail items the sender sent in total or the number of total mail items the recipient received from the sender. Such a system would also allow for the recipient to become aware of lost or delayed mail. If the recipient is authenticating a mail item with a "10" race string, but never received or authenticated a mail item with a "9" race string, then she could be made aware of the missing mail item with the "9" race string by the authentication system. The race string could be the weight of the postal mail, where the sender weights the mail, sends the weight to the authentication server within the mailing status message, and the recipient weights the mail and sends the weight to the authentication server in the authentication request. Thus, the mail can be indentified according to its weight from other mail that might have the same source and destination addresses. Similarly, the race sting could be the shape, size, color, or an actual image of the postal mail. The race string may be a combination of thus described examples and the race string being indicated on the mail, such as the date and time when it was mailed, or being able to be derived from the mail, such as its weight. Thus, the sender authentication can construct the race string, send it with the mailing status message to the server. The recipient authentication device would then send the race string of the received mail. The server would then be able to differentiate between two postal mailings with the same source and destination addresses and authenticate them individually. Such authentication would consist of the server verifying that a mailing status message and the authentication message both containing the same race string. If the authentication server can't match an authentication message with a mailing status message that has the same race string, then the source address would be determined to be spoofed. The authentication device of the recipient may then indicate the authentication status of the source address.

If the race string is constructed by the sender authentication device to be a sufficiently unique and hard to guess string of characters, such as 10 random alpha-numeric characters, an attacker would not be able guess the race string easily. In such an example, a QR code can placed on the mail by the sender which would only encode the race string, and nothing else. Again, the mailing item might indicate "Scan this QR code to authenticate". The sender authentication device would still send a mailing status message with the sender postal address, recipient postal address, certification password of the sender, and race string. The recipient authentication device however, need only scan the QR code, extract the race string, and send the authentication request containing only the race string, the recipient postal address and certification password of the recipient. The certification password of the recipient is not vital to the authentication process, but is desirable for other security issues. Such issues could be where an attacker brute forces the race string and tries to determine the senders that a recipient is receiving mail from. The QR code could be a URL that contains the race string, where the URL points to the authentication server and race string is appended to the URL as a query string (i.e. HTTP GET method). The authentication device may then append the certification password to the URL as another query string. For security purposes, the certification password sent to the server may instead be a hash computed by appending the race string to the password and taking the hash of the resulting string. The recipient postal address may or may not be sent in the authentication request. Since the server would receive the race string in the authentication request, the race string allows the server to match a corresponding mailing status message with the same race string and determine the destination address. And if the certification password transmitted in the authentication request matches certification request for the destination address, then the server can authenticate the postal mail. Thus, after receiving the authentication request and verifying the certification password, the server can look up the race string, confirm that the sender sent a message with the race string to the recipient address, and send the address of the sender to the recipient authentication device. The recipient can then determine the source address of the mail. The source address of the mail can be indicated on the mail piece, which the recipient can cross check with the sender address supplied by the authentication server. The source address of the mail can be omitted from the mail piece, and the recipient can discover the address of the sender through the message sent by the server.

Such scanning of a QR code by the recipient would also serve as a confirmation that the recipient has received the item, known in the art as delivery confirmation or return receipt. Since the recipient device is transmitting the certification password of the device in the authentication request, the request proves that the intended recipient has received the mail item. Such a system could be utilized in credit card mailings for example, where the customer who receives the credit card mailing could simply scan the QR code to verify they have received the credit card, and the bank can automatically activate the credit card. The authentication request transmitted to the authentication server can include both the recipient postal mail certification password, and the recipient telephone certification password, thus verifying the postal address and phone number of the recipient. Alternatively, a QR code sticker could be placed on the credit card. The QR code would instruct the authentication device to place a call to a telephone number indicated on the QR code. The authentication device would then call the QR code telephone number and transmit a calling status message to the server. The calling status message could also contain a race string contained in the QR code. The called party (i.e. Bank) would then authenticate the caller ID of caller, verify the caller has transmitted the appropriate race string to the server, and activate the credit card. The race string could be the credit card number that is wished to be activated. The race string could be an encoded form of the credit card number, or the last 4 digits of the credit card number.

Such a race condition could also apply to electronic mail previously described. In an electronic mail, the race string can be constructed from the subject line, if the subject line is sufficiently unique. Or the race string can consist of a hash of the email message body, computed using hashing algorithms such as MD5, SHA256, and the like. Or a constructed race string, such as 8 random characters, can be inserted into the email by the authentication device of the sender, such as within the email body, subject line or From field. The race string can also be when the email was transmitted, where the transmission time and date are usually indicted on the email header. If the race string is inserted into the mail by the sender, then the race string could have a tag prefixed or postfixed which allow the recipient to find and extract the race string from the email. For example, if the race string is "1234", then the tag can be prefixed such as, "<Race String:1234>". The recipient can thus find the text "Race String" between the two enclosures "<", ">", and extract the string. Summarizing, the race string is used to uniquely identify a message in a communication system such that a delay in the transmission does not result in a message with a spoofed source address from being mistakenly determined as having an authentic source address.

Another issue that relates to all forms of communications is matching the source address of a message with a corresponding institution. For instance, if a caller ID is given as "XYZ Bank, 555-1000", even if a caller ID of 555-100 is authenticated according to previously described methods, the name "XYZ Bank" would have to be authenticated through other means. The same issue applies to electronic and postal mail. Given an address of "XYZ Bank, 123 Any St, Any State, 12345", the address "123 Any St, Any State 12345" can be authenticated according to the previously described methods, but there needs to be a mechanism to match "XYZ Bank" to that address. In a telephone system, such matching can occur via a phone book lookup. The phone number "555-1000" would be looked up in a phone book database and the corresponding name can be compared that of one displayed in the caller ID. The phone book database could be maintained by each telephone provider and allowed to be searched. Such databases are already present on the internet and available for search, such as whitepages and yellowpages maintained by Verizon, AT&T, and others. The lookup can be performed by the authentication server or the authentication device of the called party. If looked up by the authentication server, the authentication status of the name could be transmitted to the authentication device within the caller ID number authentication message. The authentication server may also transmit the name corresponding to the phone number and allow the called authentication device to perform a match between the caller ID and the name transmitted by the server. The lookup can instead be performed by the authentication device of the called party and the verification of the name matching a given telephone number can be indicated to the user. Such a lookup can also be applied to electronic mail authentication system. If an email address is given as "XYZ Bank, service@xyzbank.com", then the lookup can be performed against a database of email addresses and corresponding entities. Or the lookup can be performed by navigating to domain address of the email address, "https://xyzbank.com", and determining if the site domain in the SSL certificate corresponds to name given in the email address, "XYZ Bank". Or the lookup can be performed by navigating to the domain address and querying the domain as to the name associated with a given email address.

As was the case with caller ID authentication, the eventual benefit of authenticating the source address is to handle incoming communications based on such authenticated addresses. Thus, the authenticated postal addresses of the sender may be added to local and global white and black lists. Such lists and the process of adding addresses to such lists were described with respect to caller ID and can be similarly applied to postal addresses. The handling of mail dependent on such lists may be done manually. For instance, if a mail room in a bank branch is utilizing an embodiment of the invention through a handheld scanner, then the mail room clerk can place whitelisted incoming emails in one pile and blacklisted emails in another pile. The mail room clerk can also place the source addresses from advertisers (i.e. Junk Mail) in the blacklist of the bank branch manually. The authentication device of the bank branch may add authentic source addresses to the bank whitelist autonomously if the mail has been received a number of times. Likewise, the authentication device of the bank branch may add destination addresses to the bank whitelist autonomously if mail has been sent to a destination address a certain number of times. Such concepts were elaborated as they related to caller ID. The mail room clerk may also forward spoofed mail to appropriate personnel or law enforcement. The bank branch office clerk may then choose to only receive whitelisted postal mail addressed to her. The office clerk may then place the source addresses of a received mail in the blacklist of the clerk, similar to the concept of a local blacklist in caller ID. The office clerk may perform adding an address to her local blacklist through a software interface on her computer, or through scanning the mail and indicating it be placed on her blacklist. The local lists of all the bank clerks may then be aggregated and white and black lists can be compiled for the bank branch, similar to the concept of a global lists in caller ID. The global lists for each bank branch can be compiled into an institutional global list for all bank branches. All the lists for the institutions can be compiled into multi-institutional global list for many institutions, such as banks, hospitals and so on.

If the postal mail source address authentication is done autonomously, such as through a mail sorting machine with an integrated OCR, the sorting machine may mark whitelisted mail with a green marker, blacklisted mail with a black marker, and spoofed mail with a red marker. Such marking would allow for the customer to determine how to treat the mail. The sorting machine could also sort mail for an intended customer into separate white or black listed piles. The postal worker can then deliver two piles to the customer and the customer can prioritize the opening of incoming mail to whitelisted mail first. The delivery of the postal mail can be prioritized by the postal service whereby whitelisted mail is delivered on a first come basis and blacklisted mail is delivered only on certain days of the week. Such machines could be implemented by postal companies such as UPS or FedEx, or they could part of a country postal system, such as USPS.

The concepts of caller ID authentication and postal mail authentication can be combined in a fax transmission. For instance, a fax can contain the sender and recipient postal addresses, in either typed or hand written form ready for OCR, or in a barcoded form. The fax can then be sent to the recipient fax machine through a telecommunication system. The postal mail authentication server would be updated by the fax sender as having sent a mail from the sender to the destination mail address. The fax machine can determine the authenticity of the caller ID of the fax sender through the described embodiments of the invention. The fax machine can also determine the authenticity of the sender postal mail address by reading the sender and recipient postal addresses and performing authentication of the sender postal address, as described previously.

The concepts of caller ID authentication, email authentication and postal mail authentication can be combined in an electronic fax system. Electronic fax providers maintain a fax telephone number for a customer and then sends the received faxes as emails to the customers, an example of such a system is the service provided by eFax.com, myfax.com and others. In such a system, the electronic fax provider can authenticate caller ID of incoming faxes and indicate the result on the fax. The electronic fax provider can then send the fax to the customers email. The email provider can then authenticate the source address of the email from the electronic fax provider and indicate it to the customer. The customer can then authenticate the source postal address contained in the fax.

b) Authenticating Email Source Address and Adding it to a Whitelist. (FIG. 16A-FIG. 16C)

Although the process of adapting the described invention has been discussed with respect to email sender address verification, an embodiment will now be presented. The concept as it relates to email sender address verification would apply similarly to other forms of electronic messaging such as text messaging, SMS and the like.

Figure 16A:
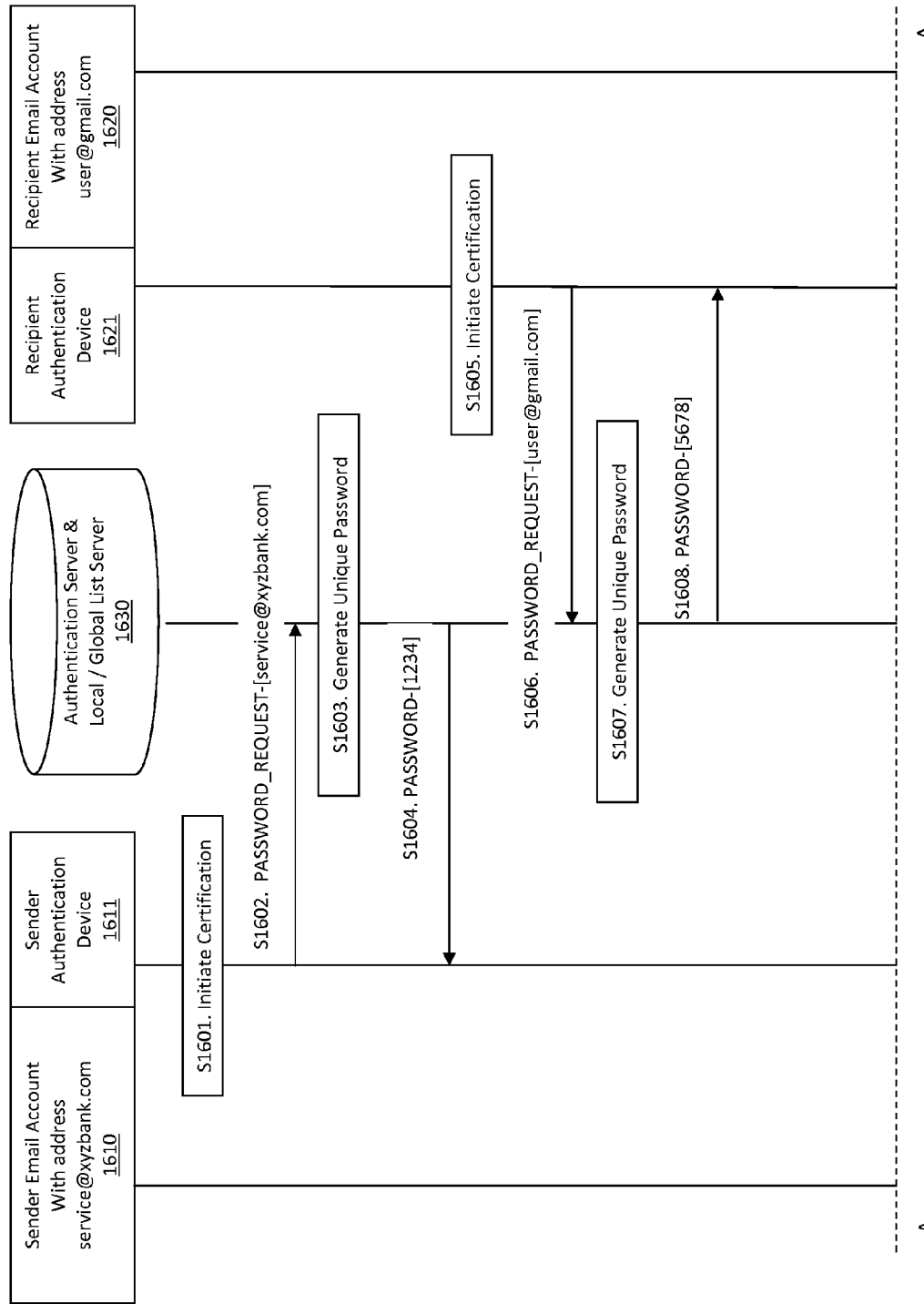
FIGS. 16A-16C, collectively referred to as FIG. 16, illustrates the flowchart and messaging diagram for an embodiment of the invention which authenticates email sender address and adding it to a local whitelist of the recipient.
Figure 16B:
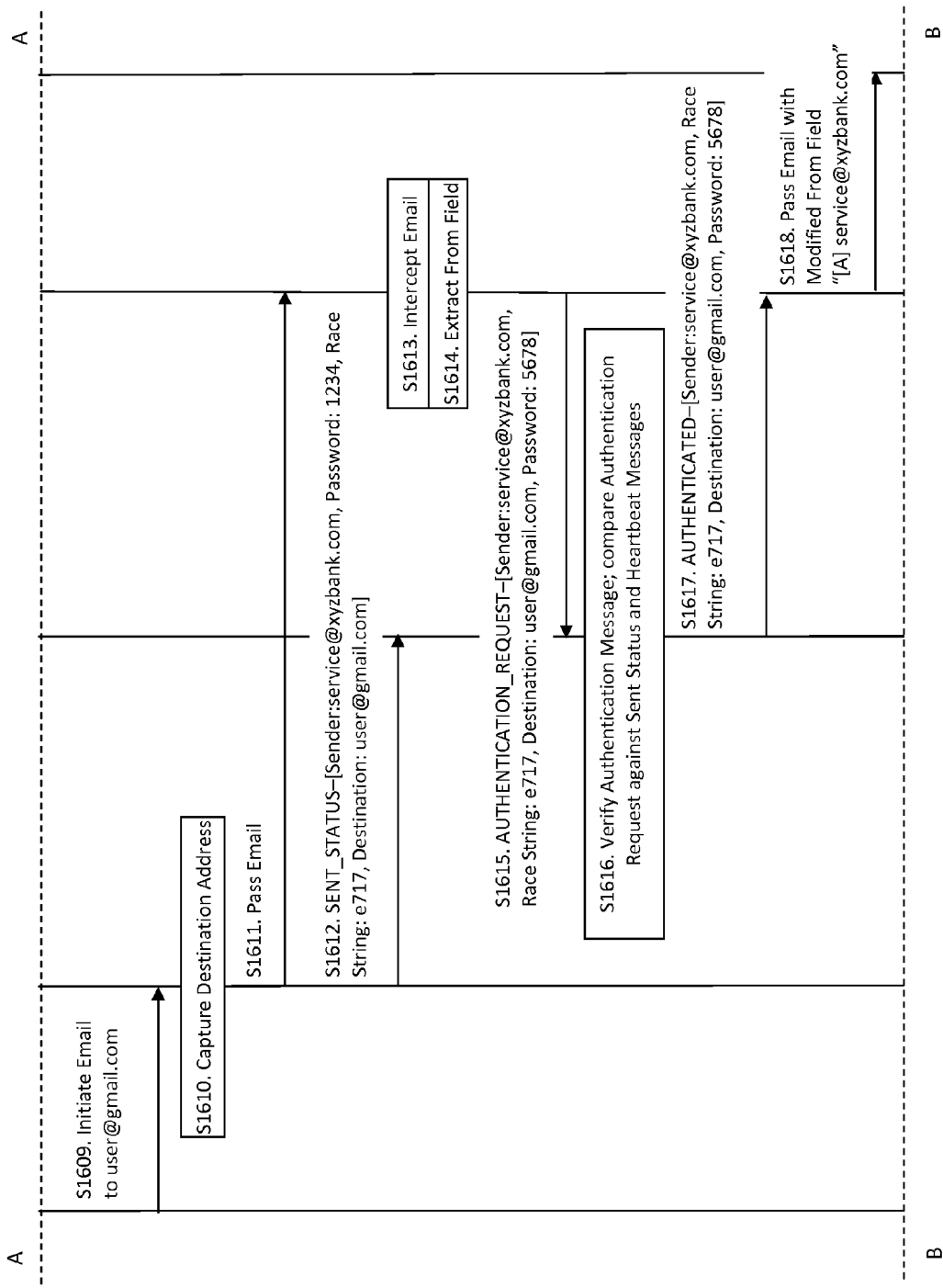
Figure 16C:
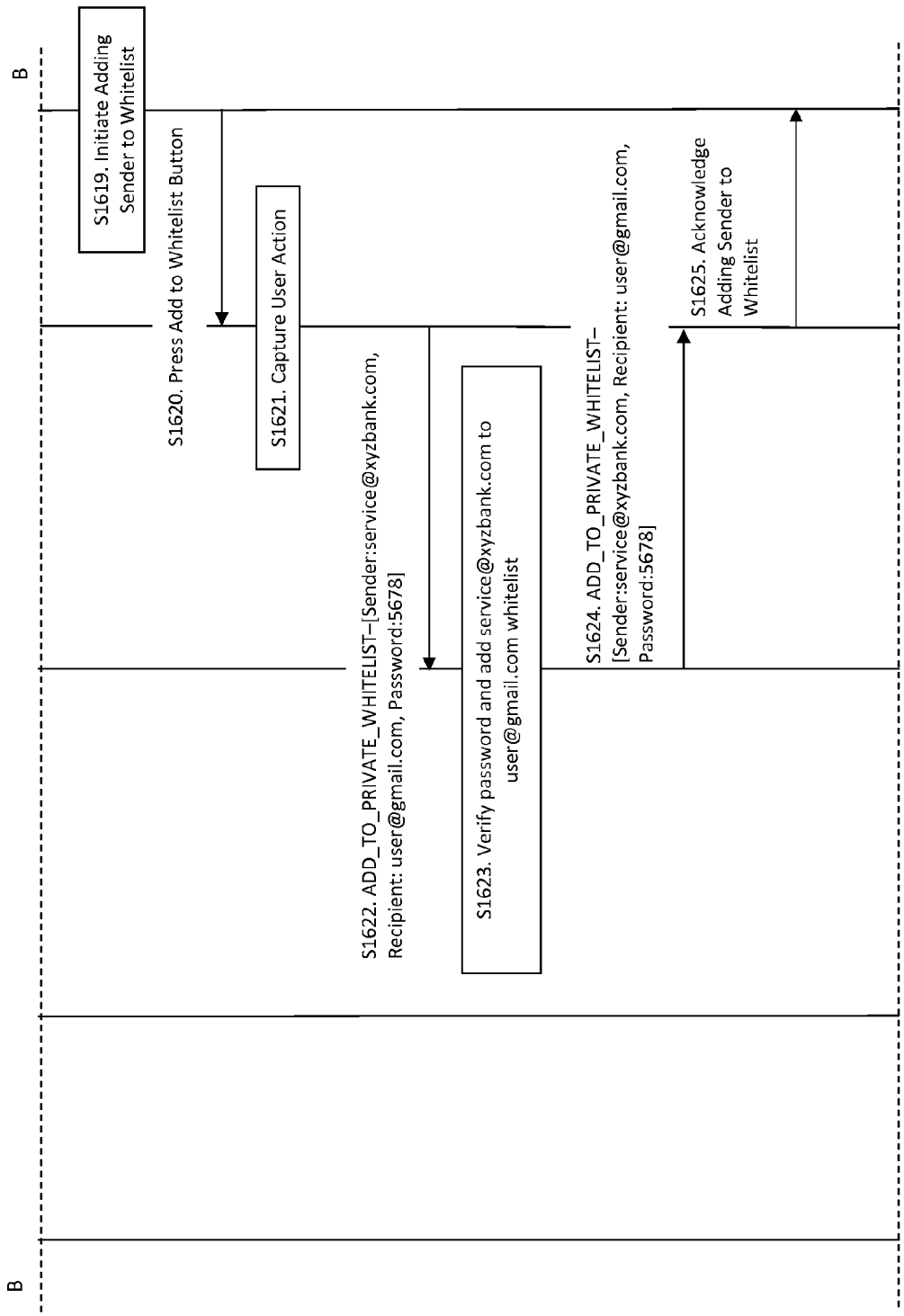

The flowchart and messaging diagram FIG. 16A through 16C, collectively referred to as FIG. 16, illustrates, by way of example, an embodiment of the invention that authenticates email sender address. FIG. 16 shows an email sender 1610 with an email address of "service@xyzbank.com". Such a sender could be the customer service center of a bank. The sender has an authentication device 1611. The authentication device can be implemented at the sender email client, email server, ISP, or through any other means. Preferably, the authentication device is a software program running at the email provider of the sender. The authentication device has access to all emails sent and received by the sender email account 1610, which has the address "service@xyzbank.com". The authentication device is able to extract the "From:" and "To:" fields of such emails. The recipient 1620 has an email address of "user@gmail.com", such a recipient could be the customer of the bank. The recipient also has an authentication device 1621. The authentication device can be implemented by the recipient email client, email server, ISP, or through any other means. Alternatively, the authentication device may be a browser plugin which works in conjunction with an Internet based email provider, such as Gmail. With such a browser plugin, the plugin would be able to determine the user visiting the Gmail site, determine if the user is opening an incoming mail or sending a composed mail, and perform the steps of contacting the authentication server and receive sender address authentication. The results of such determination would be presented to the user as a pop up, through a toolbar, or modifying the Gmail web page presented to the user. In this example, it is a plugin running on the Microsoft Outlook email client. The authentication server 1630 is a server which receives messages from the authentication devices, replies back authentication status, and performs certification of the authentication devices. The authentication server also has integrated private and global lists. The server holds private white and blacklists for each user, and uses these lists in the construction of global white and black lists, which were discussed previously with respect to caller ID. The authentication server can indicate the lists status of the sender address to the recipient, which will not be explicitly shown in this example, but the process would be similar to examples shown previously with respect to caller ID. The authentication server may authenticate more than just emails, for instance, the same authentication server may also be authenticating caller ID's, postal mail, and other forms of communications.

The process first begins by each authentication device certifying itself. Such certification would take place when the user first uses the authentication device, such as when first installing the device or when the user is first allowed to use the email account. In Step S1601, the sender device initiates certification and sends a certification request to the server, as shown in Step S1602. The request can be sent over any communication medium and system, and not necessarily over the medium and system which is being used to send and receive emails. The certification request contains the email address the device is connected to and authenticating sender addresses for. The server receives the request and generates a unique password, Step S1603. The password is sent to the device by the server, Step S1604. The unique password is sent by the authentication server 1630 to the sender authentication device 1611 email address at "service@xyzbank.com" through any communication medium and system that is able to transmit an email to the specified email address. The sender authentication device receives the email at the "service@xyzbank.com" email account, extracts the password and stores the password and presents it to the server in further communications as proof the device resides at and is in possession of the email address "service@xyzbank.com". The password may be a string of characters, an image file, a sound file, an attachment, or any other form of data that is available to be transmitted within an email and which can be sent back to the server by the device as the certification password. The password maybe encoded in an image, such as through a CAPTCHA (Completely Automated Public Turing test to tell Computers and Humans Apart), which would require the user of the authentication device to decode the password from the CAPTCHA image and enter it into the authentication device. Such password techniques maybe used to verify a human is the owner of the email account. The authentication device may intercept the certification email, extract the password, and delete the email and prevent it from going to the sender account. Such a step would make for a more seamless and less confusing process for the user. The authentication device may contact the server with the email address and the just received certification password to indicate that it received the certification password and is now installed and functioning at the email address. In Steps S1605 through S1608 the steps are repeated for the recipient device. In this example, the process of certification serves as the only heartbeat messages and no other heartbeat messages are sent. The certification is recorded by the server as the only heartbeat and verifies that the authentication device is installed for that email address.

In Step S1609, the sender initiates an email to the recipient. In Step S1610, the authentication device of the sender intercepts the mail, and extracts the recipient address. In Step S1611, the email is sent to its destination. In Step S1612, the authentication device of the sender notifies the server of the sent email through an sent status message, The "SENT_STATUS" message contains the email address of the sender and the certification password of the sender.

The delay techniques described with respect to caller ID authentication may also be used similarly in email communications. The authentication device of the sender may intercept and delay the transmission of the email and send the sent status message to the authentication server first. After some delay, the email may then be transmitted to the recipient by the sender authentication device. Such a delay would allow the authentication server to be updated with the sent status message and be ready to reply to the authentication request message. Also, the authentication server may wait a certain amount of time for the sent status message to arrive before replying to the authentication request message. Similar to the technique of server push discussed with respect to caller ID may also be used, such that the server may push the sent status message to the recipient device. Thus, the recipient would not have to contact the server with an authentication request.

When the "SENT_STATUS" message is received by the server, the certification password is compared against the certification password sent to the sender email address, the step not explicitly shown in the figure. If they match, the message is processed, if not, the server notifies the device that the password is incorrect. The message also contains a "Race String" constructed by the sender device from the email. In this example, the "Race String" is constructed by computing the hash of the email and taking the last 4 characters of the hash, which is given as an example as "e717". As was explained, the race string construction can be done through other means, such as generating a random string, and including the string in a predetermined location in the email subject, email body, the email sender address, or any other location in the email. The recipient authentication device would then be able extract the random string from the email. The sent status message also contains the destination of the email. The server then stores the received sent status message.

In Step S1613, the authentication device of the recipient 1621, intercepts the email and determines the email source address by extracting the "From:" field of the email, Step S1614. The email source address may be the address of the sender or it may not. An attacker might have spoofed the email "From" field to be that of another party. Or the email source address might indeed be the sender email address. In Step S1615, the device sends an authentication request with the recipient email address and recipient certification password. The request also contains the "Race String" constructed from the received email. The "Race String" would be constructed identically to how the sender constructed the string, which was taking the hash of the email message and using the last 4 characters of the hash. The rules or algorithms for constructing the "Race String" would be predetermined. The predetermination could be hard coded within the authentication device software or hardware. Alternatively, the predetermination could be the authentication device being informed by the authentication server which rules or algorithms to use for constructing the string. The authentication request also contains the sender address extracted through the "From:" field of the received email. The server receives the authentication request, verifies that the certification password matches the one sent to the recipient email address. Requiring a certification password by the recipient would prevent cases where an attacker might try to determine who has sent an email to the recipient by sending many authentication requests to the server with guessed sender email addresses. Then, in Step S1616, the server compares the authentication request against any matching sent status messages. If there is a matching sent status message with the same sender and same destination, and same race string, the authentication server sends an authenticated message to the recipient authentication device, Step S1617. An authenticated message indicates that the source address of the email is indeed the sender address, and the source address is authentic. In Step S1618, the authentication of the sender address is indicated by the authentication device of the recipient modifying the email by prefixing a "[A]" before the sender address, such that the recipient sees the sender as "[A] service@xyzbank.com" and would know that the email has been verified as coming from that address. Other indications of the authentication status are possible, such as through an icon, pop up, changing the color of the email source address, subject text, etc. If the authentication server did not find a matching sent status message but received a heartbeat from the sender, the server would reply with a "SPOOF_VERIFIED" message. If the sender does not have an authentication device installed, as determined by the missing heartbeat message, then the server would reply with a "IRRESOLUTE" reply. These scenarios were discussed in detail with respect to caller ID authentication.

If the recipient receives an email from a sender that does not have an authentication device installed, the recipient may manually or the recipient authentication device may automatically reply to the email sender and request that she install an authentication device. The email reply may contain a link to the appropriate site that instructs how to install an authentication device, such as a site to download a plugin for an email client or for a browser.

Once the server has determined an email address authentication status, the server may mark the sent status message and authentication request message as old or delete the messages. Such steps would prevent race string collisions where an old sent status message might be used to verify a current authentication request message because they have the identical race string due to random chance. The received messages by the server may be time stamped and be deleted after a certain amount of time residing on the server.

After the user receives and reviews the email, the user initiates adding the sender to her private whitelist, Step S1619. The authentication device of the user might provide for adding the sender address to the whitelist through a button. The button could be part of a toolbar, if the device is implemented as an email client plugin. The button could be a part of the user interface implemented by the email provider. The user presses the button, Step S1620, the authentication device detects the user action, Step S1621, and sends ADD_TO_PRIVATE_WHITELIST message to the authentication server, Step 1622. The message contains the sender address, recipient address and recipient password. The authentication server verifies the recipient address and corresponding password, Step S1623. Once the password is verified, the server adds the sender address to the recipients' private whitelist. The server acknowledges the action, Step S1624, and the device indicates the acknowledgement that the sender address has been added to the user's whitelist to the user, Step S1625. The authentication server would thus indicate the particular email sender is on the recipients whitelist on all authenticated messages sent to the recipient authentication device, which is not shown in this example. The authentication device may then handle incoming mail based on list status, similarly to how incoming calls where handled based on caller ID list status. An email from a whitelisted sender may be shown with a green font or put into a special email folder. An email from a blacklisted sender may be placed in the trash folder or presented with black font.

In addition to the recipient manually placing a sender address to the private whitelist, the authentication server may automatically add a sender address to the private whitelist. The authentication server can keep a tally of the number of times a sender has sent an email to a recipient, and after a predetermined number of sent emails, the server can add the sender address to the recipients private whitelist. And list status of the automatically whitelisted sender can be sent within the authenticated messages.

Similar to the embodiments described with respect to caller ID authentication, the authentication server may push the sent status message to the recipient authentication device. The authentication server may thus send a message to the recipient authentication device in the form of "SENT_STATUS_SERVER-[Senderservice@xyzbank.com, Race String: e717, Destination: user@gmail.com]". The recipient authentication device may then store the sent status message and authenticate the email from the sender once it is received, without the need to send an authentication request to the server. Similar to embodiments described with respect to caller ID authentication, the authentication server may receive an authentication request message and not a corresponding sent status message. Such situations might arise due to network transmission errors, packet loss, or combination of software or hardware issues which prevent the timely delivery of the sent status message. The authentication server may first determine if an authentication device is installed at the sender email address as indicated within the authentication request. The server may use received heartbeat messages or the certification process to determine that an authentication devices is indeed installed at the sender address. The server may then contact the sender authentication device and request a sent status message. The authentication server may thus send a message to the sender authentication device in the form of "AUTHENTICATION_REQUEST SERVER-[Senderservice@xyzbank.com, Race String: e717, Destination: user@gmail.com]". The sender authentication device may then verify that an email was sent to the destination address with the specific race string.

There may be instances where legitimate spoofing of email sender addresses may be desirable, such as a mailing service placing the clients return address on an email to a customer of the client. Legitimate spoofing was covered with respect to caller ID in Section (8) and illustrated in FIG. 8. The process of allowing a spoofing party to legitimately spoof the email address of another party would be performed similarly for email systems. Summarizing such a process, the authentication device of the spoofed party that wishes to allow for another party to spoof it's email address transmits a "SPOOF_ PERMISSION" message with its own email address and certification password, and the spoofing party address which it is allowing to spoof its address. The spoofing party is then granted permission by the server to spoof its email address to that of the spoofed party giving permission. Such a permission is given by the server transmitting a "SPOOF_ GRANTED" message to the spoofing party. The spoofing party may then spoof its email address to be that of the spoofed party. When sending a spoofed email, the spoofing party sends a "SENT_STATUS" message as before, but with the spoofed address as the "Sender" address, and with its own certification password. The authentication device of the sender may automatically realize the mail is being spoofed if the sender address and the stated "From" address do not match. Or the authentication device may be manually set up by the user to indicate that certain sent emails are being spoofed. The server then looks up the email address of the password holder and determines that the owner has permission to spoof the email address given as the "Sender" address. Alternatively, the "SENT_STATUS" message can contain both the sender true address and the email address that it is spoofing. Such a message would make the process simpler for the server to verify the message by comparing the sender address and certification password, and then determine if the sender was given permission to spoof its address to the one stated in the message. Using the example in FIG. 16, such a "SENT_STATUS" message with legitimate spoofing might be in the form of "SENT_STATUS-[Sendennoreply@mailserver.com, Password: 4321, Spoofed Senderservice@xyzbank.com, Race String: e717, Destination: user@gmail.com]". The server would verify the password "4321" is the one which was sent to "noreply@mailserver.com". The server would then determine if "service@xyzbank.com" gave permission to "noreply@mailserver.com" to spoof its email address. If so, the server would store the message. If not, the server may instruct the spoofing party to request permission or check with the spoofed party if it wishes to grant permission. The recipient authentication device would receive the email with the spoofed address and send an authentication request, such as "AUTHENTICATION_REQUEST-[Sender: service@xyzbank.com, Race String: e717, Destination: user@gmail.com, Password: 5678]". The authentication server would then send an "AUTHENTICATED" message back to the recipient, since the spoofed party had given permission for the spoofing party. Thus, it should be clear to those skilled in the art that all aspects of the invention as they have been described with respect telephone communications can be used in any communications system for authenticating sources addresses of such communications. As such, aspects of the invention such as compiling whitelists, blacklists, list based communications handling, active and passive certification methods, legitimate spoofing, blocked source addresses, revealing blocked source addresses can all be applied to and utilized in all forms of communications, such as electronic mail.

14) Summary

Summarizing an embodiment of the invention as it relates to any and all applicable communication systems, an authentication device is installed at both sender and recipient. The sender is transmitting a message to the recipient. The recipient authentication device authenticates the source address of the message. When the sender initiates the transmission of the message, the sender authentication device contacts the authentication server. The contact from the device to the server may be through any communication medium, regardless of the medium used to transmit the message. The sender authentication device notifies the server of the sender address and the message destination. When the recipient receives the message, the recipient authentication device contacts the authentication server, through any communication medium. The recipient authentication device requests that the transmission with a source address contained in the message and received at the recipient address be authenticated. The authentication server compares the received notification by the sender device and compares the sender destination against the recipient address, and sender address against the source address. The authentication server then notifies the recipient authentication device that the source address of the transmission is authentic, spoofed or irresolute.

The authentication devices are certified that they are indeed installed or have access to a particular communication address for a particular communication medium through certification passwords. A certification password is sent by the authentication server to an authentication device by transmitting to the authentication device at its communication address using any communication medium that the address is connected to. The authentication device then receives the certification password transmitted by the server. Thus the certification password can be presented to the server by the authentication device as proof that the authentication device is residing at a particular communication address.

There are three variations of the authentication messaging protocol. The first variation is the sender contacts the server with a sent status message when a transmission is initiated. And the recipient contacts the server with an authentication request when a transmission is received. The second variation is the server notifies the recipient of the transmission a sender has made to the recipient. The third variation where a sent status message is not received by the server and the server upon receiving an authentication request from the recipient contacts the sender and verifies the transmission.

In the variation where the sender sends a sent status message, the recipient need not include the source address in the authentication request, such as where the source address is blocked. Since the authentication server is already made aware of the transmission from the sender to the recipient, the recipient can inquire who the current transmission is from or which senders are initiating a transmission to the recipient. Applications of this concept were explained as they related to authenticating blocked caller ID's and VoIP calls.

Applications of such a system of message source address authentication have been presented in detail as they relate to telephone, email, and postal mail. Also, variations of the system such as of peer-to-peer, server push, and others have been presented. Furthermore, the use of such a system within a whitelist and blacklist handling system has been disclosed. Those skilled in the art can apply the described system of source address authentication and accompanying variations and list handling to any currently known communication system, or communication systems yet to be discovered.

Some parts of the invention has been has been described in language specific to structural features and/or methodological steps, however it is to be understood that those parts of the invention defined in the appended claims is not necessarily limited to specific features or steps described. Rather, the specific features and steps are disclosed as forms of implementing the claimed invention. Those skilled in the art will recognize that the invention can be practiced with modifications and in the spirit and scope of the appended claims.

What is claimed is:

1. A method of caller ID authentication, comprising;
   a. for telephone calls the caller party initiates to a called party,
      I. the caller party authentication device determining the destination telephone number of the call,
      II. the caller party authentication device transmitting to the authentication server a calling status message containing the caller party telephone number and the call destination telephone number,
   b. for telephone calls the called party receives from a caller party,
      I. the called party authentication device determining the source telephone number of the call from the caller ID, the caller ID not having been transmitted by the authentication server,
      II. the called party authentication device transmitting an authentication request message to the authentication server containing the source telephone number of the call and the telephone number of the called party,
   c. the authentication server determines the authenticity of the source telephone number within the authentication request message, the authenticity determination being,
      I. authentic, if the source telephone number is determined to be accurate,
      II. spoofed, if the source telephone number is determined to be falsified,
      III. irresolute, if the source telephone number cannot be determined to be accurate or falsified.

2. The method of claim 1, wherein the authentication server notifies the called party authentication device the authenticity determination of the source telephone number.

3. The method claim of 2, wherein the called party authentication device indicates to the called party the received authenticity determination of the source telephone number through modifying the caller ID presented to the called party.

4. The method of 2, wherein the ringing of the called telephone is delayed by the authentication device.

5. The method of claim 1, wherein the caller party authentication device maintains an internal white list stored on the device and places the call destination telephone number on the internal white list if the destination telephone number has been dialed a predetermined number of times, and the caller party authentication device transmits the telephone numbers contained in the internal white list to the authentication server.

6. The method of claim 2, wherein the called party authentication device receives an authentic determination of the source telephone number from the authentication server and if a call has been received from that source telephone number a predetermined number of times, the called party authentication device places the source telephone number on an internal white list, the internal white list being stored on the called party authentication device and the called party authentication device transmits the telephone numbers contained in the internal white list to the authentication server.

7. The method of claim 2, wherein the called party manually places a source telephone number which has been determined to be authentic on an internal white or black list, the internal white and black list being stored on the called party authentication device and the called party authentication device transmits the telephone numbers contained in the internal white and black list to the authentication server.

8. The method of claim 2, wherein the authentication server stores telephone numbers in a white and black list.

9. The method of claim 8, wherein the authentication server notifies the list status of the source telephone number to the called party authentication device.

10. The method of claim 1, wherein the authentication server determines the source telephone number as authentic by matching;
    a. the destination telephone number of the calling status message with the called party telephone number of the authentication request message, and
    b. the caller party telephone number of the calling status message with the source telephone number of the authentication request message.

11. The method of claim 1, wherein the authentication server determines the source telephone number as spoofed if an authentication device is installed at the source telephone number and did not transmit a calling status message.

12. The method of claim 1, wherein the authentication server determines the source telephone number as irresolute if an authentication device is not installed at the source telephone number.

13. The method of claim 1, wherein each authentication device transmits a heartbeat message to the authentication server.

14. The method of claim 1, wherein each authentication device transmits its network address to the authentication server.

15. The method of claim 14, wherein if the authentication server receives an authentication request message and does not receive a calling status message from the source telephone number authentication device, the authentication server contacts the source telephone number authentication device at its network address and requests a calling status message.

16. A method of caller ID authentication, comprising;
    a. for telephone calls the caller party initiates to a called party,
       I. the caller party authentication device determining the destination telephone number of the call,
       II. the caller party authentication device transmitting to the authentication server a calling status message containing the caller party telephone number and the call destination telephone number,
    b. the authentication server notifies the called party authentication device of the caller party telephone number as indicated within the calling status message,
    c. for telephone calls the called party receives from a caller party,
       I. the called party authentication device determining the source telephone number of the call from the caller ID, the caller ID not having been transmitted by the authentication server,
       II. the called party authentication device determines the authenticity of the source telephone number by comparing it to the caller party telephone number received from the authentication server, the authenticity determination being,
          i. authentic, that is the source telephone number is determined to be accurate if it matches the caller party telephone number,
    d. if the called party authentication device does not receive a caller party telephone number from the authentication server for a telephone call the called party receives from a caller party,
       I. the called party authentication device determines the source telephone number of the call from the caller ID, the caller ID not having been transmitted by the authentication server, II. the called party authentication device transmits an authentication request message to the authentication server containing the source telephone number of the call and the telephone number of the called party, III. the authentication server determines the authenticity of the source telephone number within the authentication request message, the authenticity determination being, a. authentic, if the source telephone number is determined to be accurate, b. spoofed, if the source telephone number is determined to be falsified, c. irresolute, if the source telephone number cannot be determined to be accurate or falsified.

17. The method claim of 16, wherein the called party authentication device indicates to the called party the authenticity determination of the source telephone number through modifying the caller ID presented to the called party.

18. The method of claim 16, wherein each authentication device transmits its network address to the authentication server.

19. The method of claim 18, wherein if the authentication server receives an authentication request message and does not receive a calling status message from the source telephone number authentication device, the authentication server contacts the source telephone number authentication device at its network address and requests a calling status message.

20. A method of caller ID authentication, comprising;

a. the authentication device of the spoofed party, which desires to have its caller ID legitimately spoofed, transmits a permission message to the authentication server with the phone number of the spoofed party and the telephone number of the spoofing party who is given permission to spoof, b. for telephone calls the spoofing party initiates to a called party with a spoofed source telephone number, I. the spoofing caller party authentication device determining the destination telephone number of the call, II. the spoofing caller party authentication device transmitting to the authentication server a calling status message containing, the spoofing party telephone number, the spoofed caller party telephone number and the call destination telephone number, c. for telephone calls the called party receives from a caller party, I. the called party authentication device determining the source telephone number of the call from the caller ID, II. the called party authentication device transmitting an authentication request message to the authentication server containing the source telephone number of the call and the telephone number of the called party, d. the authentication server determines the authenticity of the source telephone number within the authentication request message, the authenticity determination being, I. authentic, if the source telephone number is determined to be accurate, II. spoofed, if the source telephone number is determined to be falsified, III. irresolute, if the source telephone number cannot be determined to be accurate or falsified.

* * * * *